US006269474B1

(12) United States Patent
Price

(10) Patent No.: US 6,269,474 B1
(45) Date of Patent: Jul. 31, 2001

(54) SOFTWARE RE-ENGINEERING SYSTEM

(75) Inventor: Thomas J. Price, Golden Valley, AZ (US)

(73) Assignee: Veronex Technologies, Inc., Newport Beach, CA (US)

( * ) Notice: Subject to any disclaimer, the term of this patent is extended or adjusted under 35 U.S.C. 154(b) by 0 days.

(21) Appl. No.: 09/165,440

(22) Filed: Sep. 30, 1998

Related U.S. Application Data

(63) Continuation of application No. 08/940,813, filed on Sep. 30, 1997, which is a continuation-in-part of application No. 08/910,015, filed on Aug. 12, 1997.

(51) Int. Cl.[7] .................................................. G06F 9/445
(52) U.S. Cl. .......................... 717/1; 717/2; 717/3; 717/11
(58) Field of Search .................................. 395/701, 702, 395/703; 717/1, 11

(56) References Cited

U.S. PATENT DOCUMENTS

| 5,208,765 | * | 5/1993 | Turnbull | 364/552 |
| 5,640,501 | * | 6/1997 | Turpin | 707/507 |
| 5,651,108 | * | 7/1997 | Cain et al. | 395/340 |
| 5,664,183 | * | 9/1997 | Cirulli et al. | 395/614 |

OTHER PUBLICATIONS

Nelson, "Running Visual Basic for Window", Microsoft Press, pp. 1–21, 1993.*
Yang, "The Supporting Environment for A Reverse Engineering System—The Maintainer's Assistant", IEEE, pp. 13–22, Oct. 1991.*
Yang et al., "Extension of A Transformation System for Maintenance—Dealing With Data–Intensive Programs", IEEE, pp. 344–353, Oct. 1991.*
Aho et al., "Compiler Principles, Techniques and Tools", Addison–Wesley publishing, pp. 10–19, 389–431, 506–508, 1988.*

* cited by examiner

*Primary Examiner*—Mark R. Powell
*Assistant Examiner*—Ted T. Vo
(74) *Attorney, Agent, or Firm*—Henry G. Kohlmann

(57) ABSTRACT

An optimization system including an option to convert existing code to a code-less environment or to create a codeless environment by the establishment of all essential application elements in files. The code-less environment is created through a design and analysis step, an environmental step and an installation step. An application map is prepared during the design and analysis step which defines where information enters into the system, where information is used, and where used information is changed. The application map is also used to verify that all information is accounted for. The design and analysis step also includes the generation of default database structures, screen formats, print layouts, file transfer protocols, validation tables and communication specifications. The environmental step includes modifying specifications in accordance with user preferences, simulating performance of the specifications with test data, preparing existing data files for conversion to the code-less system, and implementing parallel processing. The installation step includes final testing of selected hardware platforms and maintenance on a development system.

17 Claims, 85 Drawing Sheets

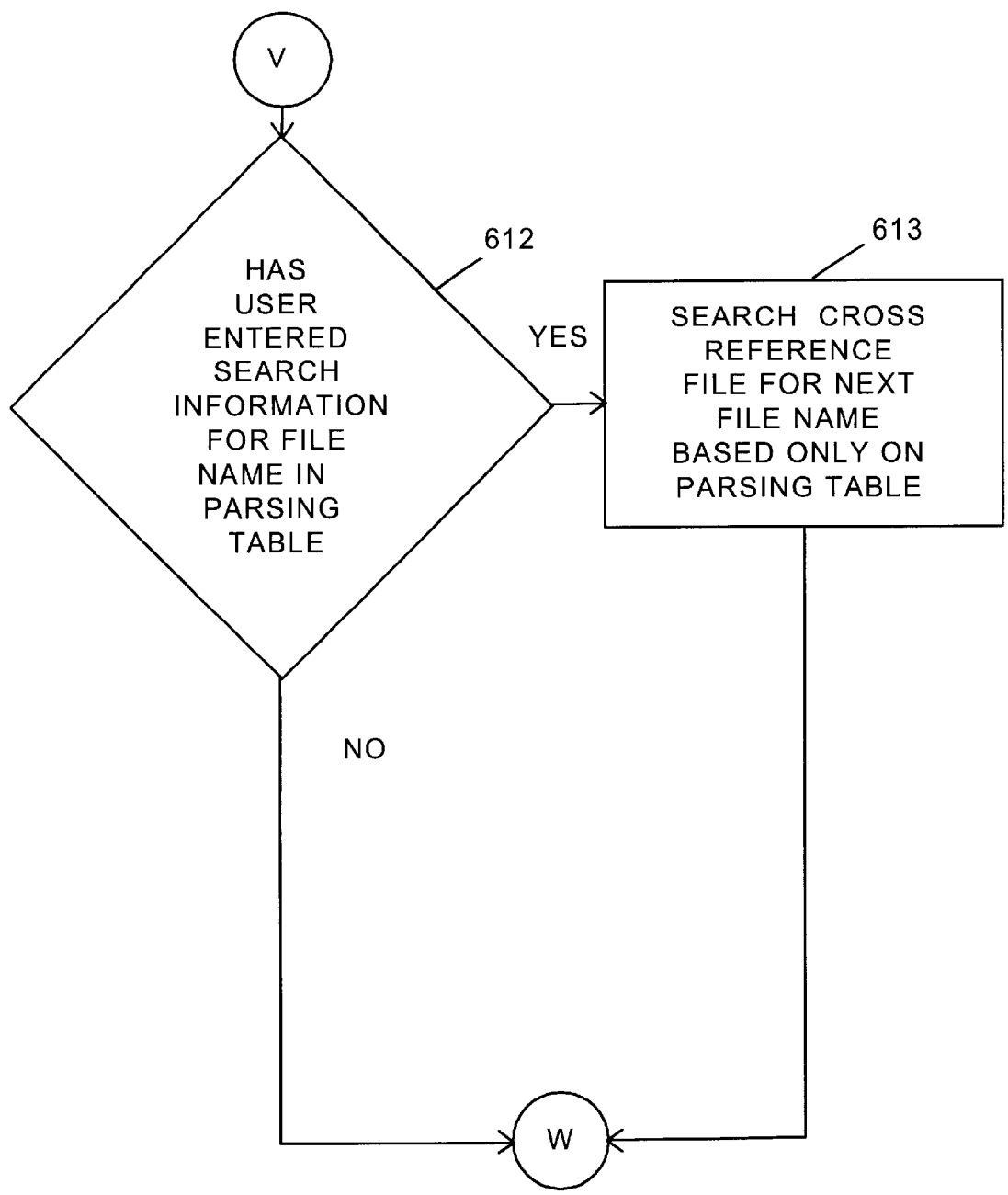
FIGURED 9C

| INDXMAIN - DETAIL I/O ELEMENT RECORD ||
|---|---|
| 'E' | 1 |
| (data base number) | 3 |
| (start position) | 4 |
| (end position) | 4 |
| (element name) | 30 |
| (element length) | 3 |
| (element type) | 1 |
| (element edit) | 2 |
| (new length) | 3 |
| (not used) | 46 |
| (new element name) | 30 |
| (parse type) | 1 |
| (parseid) | 3 |

FIGURE 15A

| INDXMAIN - DETAIL FILE RECORD ||
|---|---|
| 'D' | 1 |
| (system assignment) | 30 |
| (file name) | 30 |
| (record name) | 30 |
| (record size) | 4 |
| (block size) | 4 |
| (label type) | 1 |
| (assigned database number) | 3 |
| (new file) | 30 |

FIGURE 15B

| INDXWKS - DETAIL WORKING STORAGE RECORD ||
|---|---|
| 'W1' | 2 |
| (old 01 number) | 30 |
| (program used) | 8 |
| (sequential number) | 4 |
| (total 01 size) | 4 |
| (sub-level name) | 30 |
| (sub-level number) | 2 |
| (sub-level size) | 4 |
| (new name) | 30 |
| (new size) | 4 |
| (value if any) | 66 |
| (parse type) | 1 |
| (parseid) | 3 |

FIGURE 16A

| COMMON PROFILE WORKING STORAGE FILE STRUCTURE ||
|---|---|
| 'W2' | 2 |
| (total 01 size) | 4 |
| (total line) | 4 |
| (occurrence) | 3 |
| (program used) | 8 |
| (old 01 name) | 30 |
| (sequential number) | 3 |
| (sub-level number) | 2 |
| (sub-level name) | 30 |
| (new name) | 30 |
| (old size) | 4 |
| (new size) | 4 |
| (parse type) | 1 |
| (parseid) | 3 |

FIGURE 16B

| INDXWK3 - WORKING STORAGE SUMMARIZED W2+W1 ||
|---|---|
| 'W3' | 2 |
| (program used) | 8 |
| (new name) | 30 |
| (sub-level number) | 2 |
| (original name) | 30 |
| (new size) | 4 |
| (value if any) | 66 |
| (parse type) | 1 |
| (parseid) | 3 |
| (old 01/77 name) | 30 |

FIGURE 16C

| INDXWK4 - PROCEDURAL LOGIC WORKING STORAGE CHANGE RECORD ||
|---|---|
| 'W4' | 2 |
| (program used) | 8 |
| (original name) | 30 |
| (original size) | 4 |
| (new name) | 20 |
| (new size) | 4 |
| (parse type) | 1 |
| (parseid) | 3 |

FIGURE 16D

| INDXCOM - COMMON FUNCTION RECORD ||
|---|---|
| 'D' | 1 |
| (procedural logic instruction) | 66 |
| (number lines) | 4 |
| (sequential number) | 4 |
| (function number) | 5 |

FIGURE 17A

| INDXS - COMMON FUNCTION RECORD BY FUNCTION NUMBER ||
|---|---|
| 'D' | 1 |
| (function number) | 5 |
| (number lines) | 4 |
| (sequential number) | 4 |
| (procedural logic instruction) | 66 |

FIGURE 17B

| INDXPRGCR - PROGRAM FUNCTION ID FILE ||
|---|---|
| 'D' | 1 |
| (program name) | 8 |
| (function number) | 5 |
| (number lines) | 4 |
| (beginning line number) | 8 |
| (ending line number) | 8 |

FIGURE 17C

| INDXFUNCTCT - FUNCTION USED FILE ||
|---|---|
| 'D' | 1 |
| (function number) | 5 |
| (program name) | 8 |
| (number lines) | 4 |
| (beginning line number) | 8 |
| (ending line number) | 8 |

FIGURE 17D

| PARSE TABLE | |
|---|---|
| (parse type) | 1 |
| (partial parse word) | 20 |
| (edit word) | 16 |
| (length) | 2 |

FIGURE 18

SOFTWARE RE-ENGINEERING SYSTEM

CROSS-REFERENCE TO RELATED APPELLATION

This application corresponds to U.S. patent application Ser. No., 08/940,813 filed Sep. 30, 1997 which is a continuation in part of U.S. patent application Ser. No. 08/910,015 filed on Aug. 12, 1997 which corresponds to PCT/US98/16131 filed Jul. 31, 1998.

BACKGROUND OF THE INVENTION

1. Field of the Invention

The Field of this invention relates to a computer program optimization system which results in code reduction and standardization. More specifically, the instant invention relates to a computer system which evaluates existing software and performs vertical, horizontal and sequential synchronization on the source code, utilizing an interim pseudo code to create new systems library and a program source code file.

2. Related Art

Prior art systems relate to code conversion systems, including compilers and language translators. However, such programs take data as it is and in sequence without an evaluation of the use of individual variables. Usually such conversions are performed in sequence one program at a time. Thus, there is no evaluation of the several programs used in a systems group against each other.

It is an object of the instant invention to provide a computer program optimization system which evaluates multiple program source code files as a whole.

It is a further object of this invention to provide a computer program optimization system which generates uniformly named variables which occupy the same physical location or possess the same value profile.

It is a further object of this invention to provide a computer program optimization system which permits interactive modification of element attributes during the optimization process.

It is a further object of this invention to provide a computer program optimization system which consolidates all repeated program code segments into a library.

The instant invention addresses the usage of various elements, variables and structures in an entire software system and consolidates all redundant information. In addition, other elements are identified by physical location and uniformly named.

The instant invention generates a code-less application which provides rapid analysis, development, documentation and implementation of an organization's functions.

BRIEF DESCRIPTION OF THE INVENTION

The instant invention reads existing program source codes which may be initially stored in computer memory, hard disk storage devices, on floppy disk storage device, diskettes, or virtually any other computer readable medium. A table lookup may be used to convert the native source code into a into a pseudo code form for writing out of such code as an interim source code file into virtual memory to be used for conversion and manipulation. The source code in the pseudo format is processed in five (I–V) phases resulting in a new program source code with appropriate instructions to call library common functions for the new system stored in the system library as created by the optimization system. In addition, various files, data elements and work space allocations each of which occupy the same space with other such files, elements and work space allocations are normalized, i.e. referred to by the same names by all source code. During the optimization process, the user may interactively change the names of files, any of the attributes of the data elements which will be reflected for all occurrences of the element and workspace definitions. In addition, work space allocations are given a unique name by the system.

The first phase of the computer optimization system is a vertical synchronization process which identifies all individual file name references, data element references and workspace allocations within every record type, within every file representative of program source code. A common name is assigned to each file, element or workspace by physical position within a record within each of the files. The process also creates various cross-reference files that are structured to be accessed either sequentially or randomly as required. The file, common element and workspace names replace the original names used in the original program source code.

During vertical synchronization a user may interactively specify specific file names and definitions for a particular element which then becomes the standard for all the source codes examined by the system. If no specific designation is made, the system automatically selects the first unique name it encounters within the software to identify the physical position of a file or specific data element as the new standard definition. The system then generates a file name, cross-reference file and an element cross-reference file to identify each file and data element and the assigned name.

Work space allocations are also identified and each unique location assigned a specific name.

In phase II the system implements a horizontal synchronization process which formats all program instructions in the interim code into standard syntax format. This permits an exact match between given instructions within the source code according to a uniform or standard syntax format. The program source code written in the standard syntax of the interim format is temporarily stored in virtual memory for later use during the optimization process.

In phase III, a sequential synchronization process scans all interim program source code instructions to determine if there are at least two or more source code instructions in any program source code that qualifies as a potential common function. Potential common functions are identified as that code which resides between program labels although it is clear that other designations could be used, such as instruction sequences that are bounded by instruction pairs, e.g. start and end of a conditional statement. Codes so identified are qualified as a potential common function, and then matched against other potential common functions within a potential library common function file. If not present, the functions are then stored in the Potential Library Common Function File with all other potential library common functions.

In phase IV, the temporary copy of each of the modified program source codes for each program source code file in the system is written into new files with all redundant instructions as stored in the potential library common function file replaced with a call to the particular function in the common library file. The particular potential library functions so identified are then stored in a current systems library file. The selection of which potential common library functions are to be replaced with a call and stored in the current systems library file is accomplished by comparing the function against a Function Sequence File to determine if the particular common function being analyzed is used more than once. A Program Function Identification File contains data which determines where duplication occurs in a program and, more particularly, at what position within the program such duplication occurs. Thus, the location of the call and removal of the code segment can be accomplished for all segments which are used more than once. Segments which are not used more than once remain in place and are not moved to the current library.

In Phase V, when the modified source code has been restructured, and it is vertically, horizontally and sequentially standardized, redundant program functions are identified and added to the new system library file. This results in source code which has no redundancy. That is, no two or more instructions that are identical exist more than once anywhere within any program in the system.

A significant increase in efficiency and reduction of code are achieved. Similarly, all of the various data elements which occupy the same location use a common identifier in each of the various source code files in which they are referenced. Phase V concludes with a conversion of the interim program code into its native format.

Alternatively, the user may automate the change of element attributes. That is the user may command the system to automatically make the changes input by the user and automatically post the changes to the interim source code or automatically make its own name changes as determined by the System. As to those elements where the user has not made any changes the system automatically selects the attributes of the first occurrence of the element and posts that elements attributes to all other references to the same location. If an interim code was used, the system then automatically converts the interim code to native code and an audit trail report of all changes made during the automatic change process is printed.

On completion of the optimization of the computer code, database screen, file transfer, communication print specifications, and conditional logic specification from the interim source code are determined and these specifications are stored in separate databases.

The system provides additional options, including a review of file and element definitions and the option to selectively convert, scan or repair programs analyzed.

In addition, once the various database files have been established, a Rapid Application Development (RAD) computing environment may be created which does not utilize application program code, that is a code-less environment.

In the code-less environment, the code-less system provides rapid analysis, development, documentation and implementation of computer software applications the system allows rapid software development, additions, changes and execution by non-programmers (industry specialists) without regard to the final computer hardware;

the code-less system allows development, debugging, user testing and documentation on cost efficient personal computers. Designers may be located anywhere there is communications capability.

The ability to build the code-less system applications on cost effective personal computers keeps Designers from "trying out programs" on production systems which exposes the production system to unexpected corruption. The code-less system software applications can on the other had be added to and/or changed "dynamically" (i.e., that is, the new software upgrade can replace the old version even while personnel use the computer) without danger of data corruption.

A System Analyzer Module (SAM) allows existing COBOL source programs, for example, (as well as other source languages, as required) to be converted to the code-less system which also corrects the Millennium type problem i.e., lack of a four digit year and faulty leap year computations by correcting the software obsolescence that initially caused the problem. The code-less system also provides accurate "on demand" documentation to system developers and users.

The ongoing obsolescence of the traditional software application is resolved by combining a library of commonly used routines as noted above with an application "specification." The specification may be transferred to any computer on which there is a Code-less System Manager (CSM) operating. The specification will then perform the same computing functions as the original application whether it is on a mainframe, mini or microcomputer. In fact, new applications may be generated for use with the CSM and can likewise run on any system which includes a CSM.

Conceptually, all business systems created regardless of the industry, application, volume of data, hardware or programming languages are functionally the same. Further, any business system must be flexible, that is, its design will need to be changed in the future for reasons of oversight during development, or functional obsolescence caused by expansion, or changing of application requirements.

Although there can be no substitution for foresight and vision when designing business applications, anticipation of change is paramount in initial design. In consideration of this philosophy, the code-less system uses a library/dictionary construct that structures all system functions as universal functions which are by design common to all computing environments, and which can therefore be changed or expanded as dictated by individual application requirements. The CSM can operate a totally integrated software application that can include up to 99 other subsystems. The generation of a code-less system eliminates the necessity of learning any programming language because it does not generate program code. Since it does not generate program code, a compiler is not required.

Only one copy of the CSM is required regardless of the number of users, customers, and/or applications that are sharing a computer. Limitations are dictated only by availability of disk storage and main memory. Disk storage is used only for storing significant information, all blanks and leading zeros are removed from data prior to being written to disk and returned only when the information is displayed, printed or transferred to another computer. This compression of data, along with disk space not being used to store programs, results in better utilization of available disk space.

Program and logic errors are eliminated using simple objects, Universal Simple Objects (USO). These are functions that have been tested through system design efforts with a view toward achieving optimum applications results. As each new application is built with the code-less system platform, new features are added to the USO library. Once a new feature is added to the USO library, it is immediately available to any existing application. Thus, any additions, changes and/or corrections to the code-less system platform do not affect existing applications making upgrade an easy task and making new functions available to the existing applications. Enhancements and/or augmentation of the USO library in the code-less system does not require changing, nor outmode, previously created applications.

The code-less system operates concurrently with and shares computing system with other applications whether created with the code-less system or not. The code-less system will process data from, or forward data to, other common programs such as word processing, spreadsheet, and database programs resident on the computing system. This transferring of data can also be performed remotely with a modem to other computers operating with or without the code-less system.

All the code-less system developed software applications automatically include record and file lock where appropriate, permitting multiple users and/or printers to use an application at the same time and without corrupting the database. A computer terminal may be direct connected, or remotely connected through a modem. Printers used may be serial or parallel, direct connected, or through a modem, and shared by all users.

Code-less system applications can be modified while the software application is operating in a production mode. This feature permits designers to modify or enhance software applications at any given time on or off premises.

The code-less system is also self-documenting producing both user and technical documentation. The code-less system automatically documents all, or part of, the software application it creates at any time. Automatic documentation production ensures that the content is always current. Documentation can also be used for presentations, and the creation of user manuals, and proposals.

The code-less system offers enhanced system performance because the "program" is always loaded into the computer's main memory.

The CSM includes both "real-time" and sophisticated "batch" processing modules. The "real-time" processing module allows multiple interactive terminals to be connected either directly or remotely. The terminals operate in a true multi-user, multi-tasking environment with file and record locking (i.e., credit authorization terminals).

The CSM "batch" processing module allows multiple events to be put on "autopilot." Batch processing tasks occur interactively or as a series of scheduled events.

For example, a computer operator can select a particular time of day, such as 5:00 p.m. for the computer to commence collection of all of the transactions processed between 8:00 a.m. and 4:30 p.m. that day; sort and accumulate such transactions; print a report: update various customer account files; communicate with one or more host computers; and download or upload the information as required.

The task list illustrated above would take place automatically at the designated time with no operator interaction; all of this batch work can be accomplished utilizing an IBM Personal Computer ("PC") or any other platform.

The code-less system comprises over 950 separate functional modules. Each module performs a separate task (e.g., adding, changing and/or deleting a record from the database).

If a new function is required it is merely written in the most effective language and added to the functional library. Once complete, the new module is available to every user of the code-less system. If a module fails to perform or has a "bug," the library version is corrected and the corrected version is immediately available for anyone using the function.

The CSM supplies the designer with an electronic "spreadsheet like specification." Input and output information is entered into the spreadsheet specification and an element conflict and redundancy analysis is conducted. The CSM also produces the information required to create all databases, screens, reports, file transfers and conditional logic indicating which USOs to use.

A System Environment Module (SEM) provides the code-less system platform with basic system information such as location of required files, number of printers, accounting/activities such as number of transactions occurring, etc.

A System Database Module (SDBM) provides for the creation and maintenance of databases and their elements. The SDBM incorporates the ability to define database elements, special functions such as mathematical formulas (in a LOTUS like spreadsheet structure), operating system defaults (such as date, time, user defined and application user information) and other default values, if these have not already been created by scanning the source program, as in the case of new automation of a manual system.

An Editing Module (EM) provides system wide formatting for both user screen and report output (i.e., dollar signs, commas and periods).

A System Selection Module (SSM) defines universally available selection criteria for reports, file transfers and communications transfers.

A Validation Module (VM) checks data entry and includes the ability to supply validation comparisons through a validation list to insure the information input correct.

A System Screen Module (SM) provides the tools required to create, edit, and link user screen and windows. The SM is where a user defines the screen and user interaction interface.

The Report Module (RM) supplies the tools necessary to create both "real-time" and "batch" reports. Reports may be fixed or selected by the user. The Report Module allows the following report types: page print (read one record and print one page), summary print (read many records and print a summary) or detail print (read one record, print one line). Other specialized Reports may also be created where one to one, one to many, many to one, or many to many relationships exist An example of one to many is for example a report which includes a Customer Name (one) and a list of all items ordered (many).

A File Transfer Module (FTM) permits import or export of information databases in any format that the designer selects. Both "real-time" and "batch" modes are supported in the Transfer Module.

A System Communications Module (SCM) permits information exchange utilizing "dialup" or "direct" connection as appropriate. The SCM allows exchange of information to take place via any "real-time" or "batch" mode function. In addition, the (SCM) allows interactive communication with other remote, networked or foreign computers.

Because most systems evolve or require modification, a System Duplication Module (SDBM) allows designers to copy all or part of any other the code-less system application. The SDBM gives designers the ability to copy and edit one of the existing code-less system applications, and save as a new file, thus creating an entirely new application.

A Documentation Module (DM) provides both user and/or technical written information regarding any code-less system software application. Documentation is available at any time during, or after, the code-less system application is created and/or modified.

Once the code-less system specifications are functional, they are immediately operational upon whatever computer hardware is desirable via a SAM. Should a client need to upgrade to another computer hardware system, the code-less system's modular structure permits a transfer of the code-less system application from a personal computer, for example, to a mainframe. This requires rewriting the SAM for use on the mainframe, if no previously existing SAM is on the mainframe. Once the SAM is implemented on or ported to the mainframe, the code-less applications created on the personal computer will operate on the mainframe hardware without modification.

The SAM operates in "real-time" utilizing the code-less system software specification/application. The SAM incorporates all of the USO routines necessary to run the code-less system application in a single user multi-user and/or, multi-tasking environment Batch processing options are incorporated into the (SAM) module to perform "batch" jobs as is required by the application specification created by the code-less system. The SAM incorporates when needed all the library/dictionary routines necessary to run the code-less system applications that require "background" processing or delayed processing.

In summary, the code-less system provides non-technical personnel (designers) with the ability to quickly and accurately analyze, design, modify, document and implement high quality, custom software application. The code-less system also provides critical Millennium project analysis, cost, and resource estimation. Additionally, the code-less system can manually or automatically correct the Millennium type problem. The code-less system has the following unique features:

The code-less system performs a detailed analysis of the organization's functional requirements prior to implementing the design. The functional analysis is printed and reviewed with all managers prior to design implementation. Detailed analysis and review ensures that the code-less system will be complete, of high quality, and authorized by management prior to its development and implementation.

There is no program language in the code-less system to restrict portability or salability.

The code-less system applications are non-hardware dependent because they do not generate programs. A SAM is a generic program that can be made operational on any hardware platform or network environment that is suitable to the business. The SAM includes a collection of menus, which indicate the various functions set forth herein and against which element it is to operate, i.e. screen, report, database, etc. As in any program selection of a menu item causes a link to another portion of the program. On selection of a menu item, the CSM identifies the element, its location and any computational or other requirement against which it is to operate. If a screen is selected, then a screen is displayed based on its attributes. If a price is to be determined for a particular purchase order screen, for example, the computation will execute any computational attributes associated with the price field or element on entry of the necessary data into related fields such as quantity and unit price fields. The computational attribute for price would include unit price * quantity, for example. Other attributes for screens could include mandatory entry of certain fields, and optional entry for others dependent upon the requirements of the organization.

Since only one copy of the CSM is required regardless of the number of users, any number of CSM applications or other applications may run together sharing a computer. Limitations are dictated only by hardware configuration, network requirements and respective capacities.

Code-less CSM system applications can operate concurrently and share a computer with other code-less and non-code-less system applications that utilize generative (compiled) or interpretive programs.

The code-less system will process data from, or forward data to, other common programs such as word processing, spreadsheet and/or database programs. This transferring of data can also be performed remotely via modem to other computers operating with or without the code-less system.

CSM Applications created by the code-less system are "Smart Applications" that automatically monitor and assign tasks to be performed in the application and reports any pre-specified conditions to management.

Specifications developed by the code-less system allow concurrent users and/or printers. The code-less system users are connected via a PC, terminal or modem.

As there is no generative process, the code-less system applications are modifiable while operating by modification of the specification.

The code-less system automatically produces general, technical and user specific documentation on demand which supplies management and users with information regarding all functions and features of the application including its manner of use.

Optional the code-less system includes security features such as an on demand audit trail of any information update that is performed, on any file, by any user of the code-less system. All code-less system security audit trail reports can be printed in their entirely, or on a selective basis at any time.

Finally, the code-less system software applications incorporate phone messaging, electronic mail, personal calendar, appointment scheduling, task management and computer initiated warning capabilities which are available to all users at all times.

BRIEF DESCRIPTION OF THE DRAWINGS

FIGS. 9A through 9K are flow charts of the manual repair of file, element and workspace element definitions.

FIGS. 15A through 15B are schematics of I/O Records.

FIGS. 16A through 16D are schematics of working storage Records.

FIGS. 17A through 17D are schematics of common function Records.

FIG. 18 is a schematic of the Parse Table.

PREFERRED EMBODIMENT

Overview of Preferred Embodiment

All software programs comprise three basic parts. These include an I/O Area, Working Storage Area's and Procedural Logic. Within each of these there are various elements used by the programming Program. In each of these parts there are logical file names, work area allocations, and data elements such as variables and constants which are stored in data files, temporarily stored in Working Storage Area's, and referenced in the procedural logic. The instant system standardizes names of files, data elements and work storage references and stores common procedural program code segments in a library. The instant invention is implemented on an IBM P.C. with disk storage and memory. It is distributed on diskette or other computer readable memory.

Figure 1:
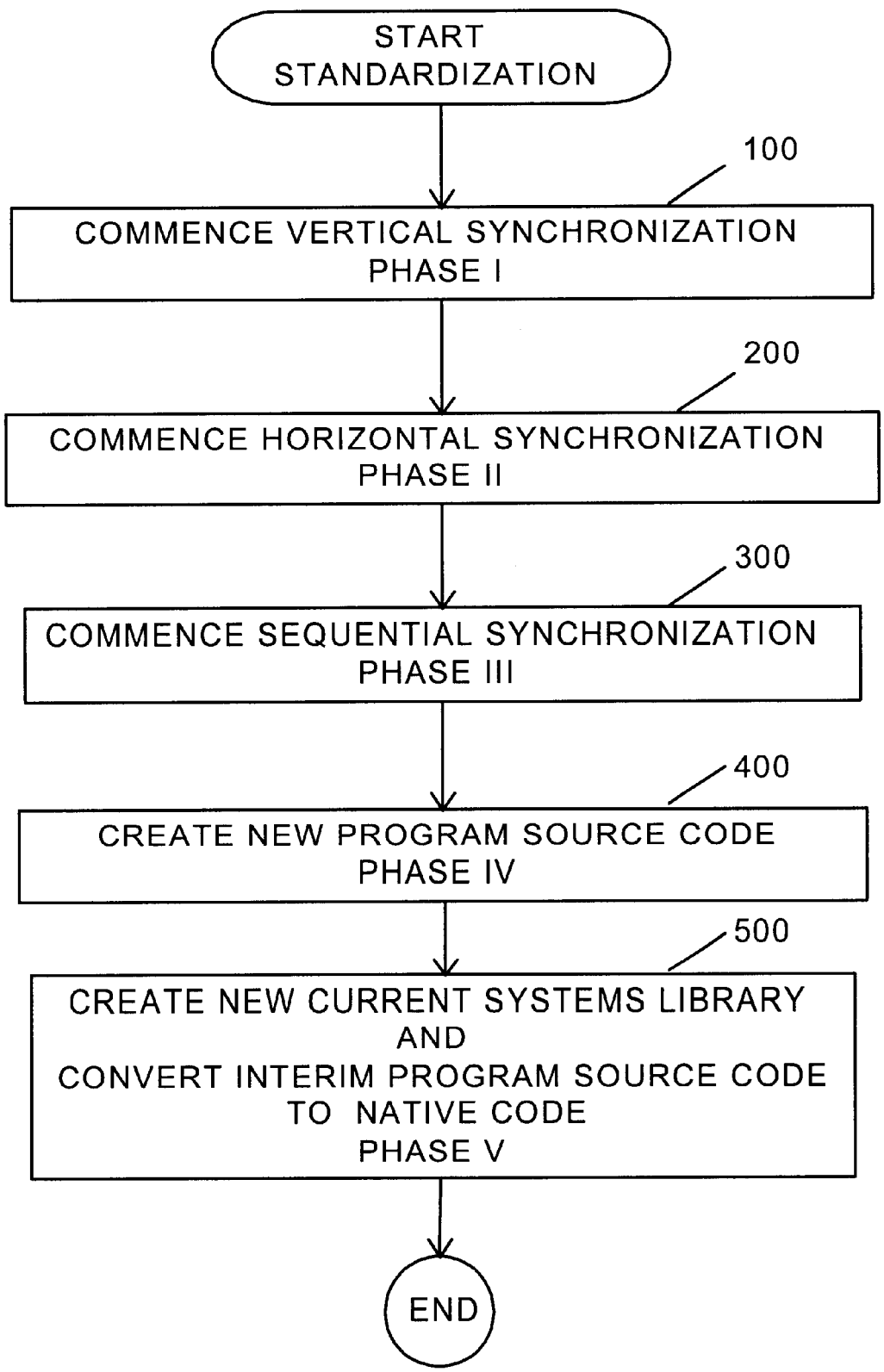
FIG. 1 is a flow chart of the overall optimization system.

With reference to the drawings, FIG. 1 is a flow chart illustrating the various phases of operation of the preferred embodiment of the invention. There are five basic phases of operation commencing with vertical synchronization, step 100, Phase I. On completion of Phase I, Horizontal synchronization, step 200, Phase II, is commenced. On completion of Phase II, Sequential Synchronization 300, Phase III is commenced. On completion of Phase III, new program source code is created 400, Phase IV. On completion of Phase IV, a new current systems library is created 500, Phase V, and new program source code is stored as new native code.

Figure 2A:
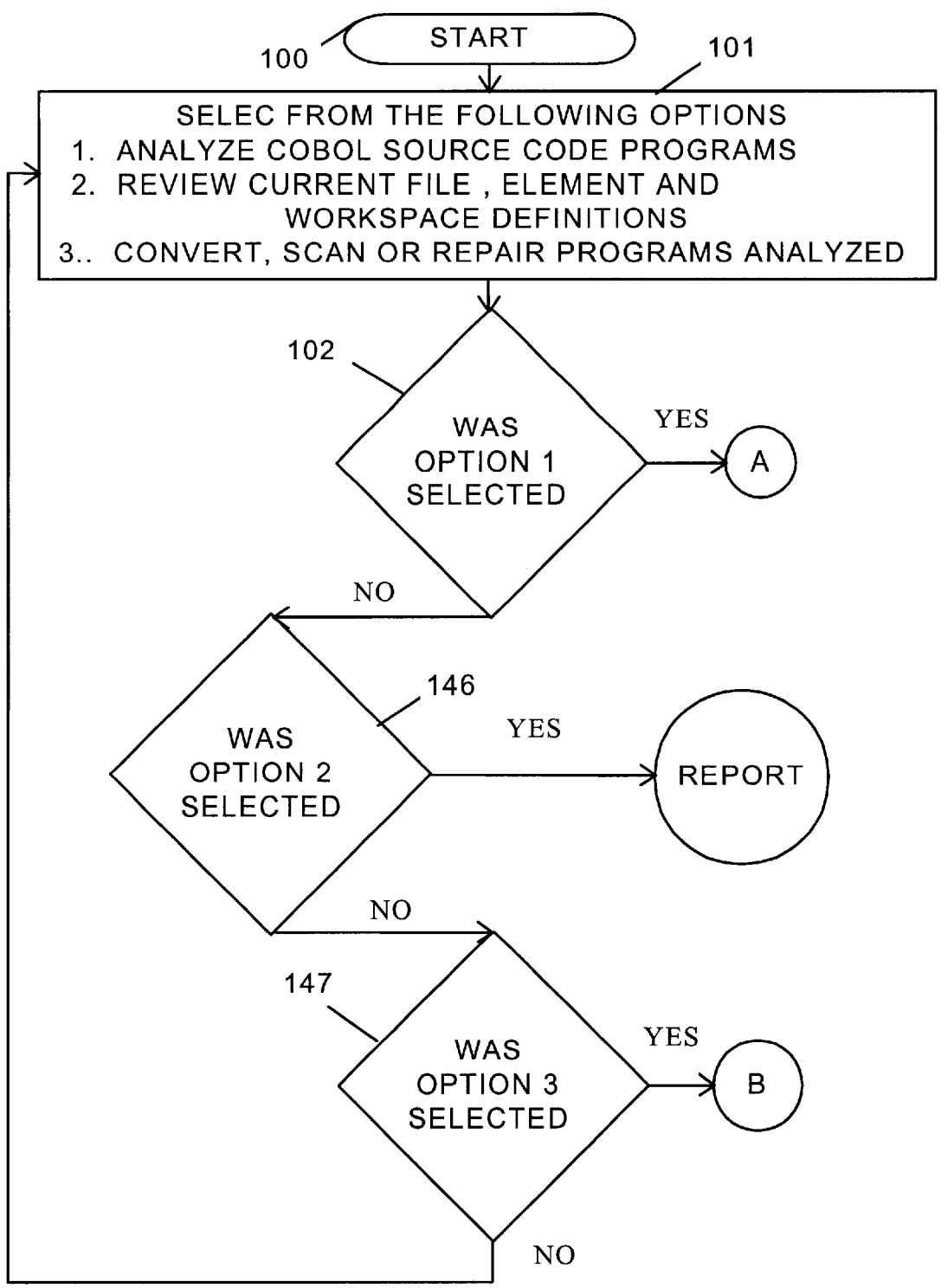
FIGS. 2A through 2L are a flow charts of the Vertical Synchronization System.
Figure 2B:
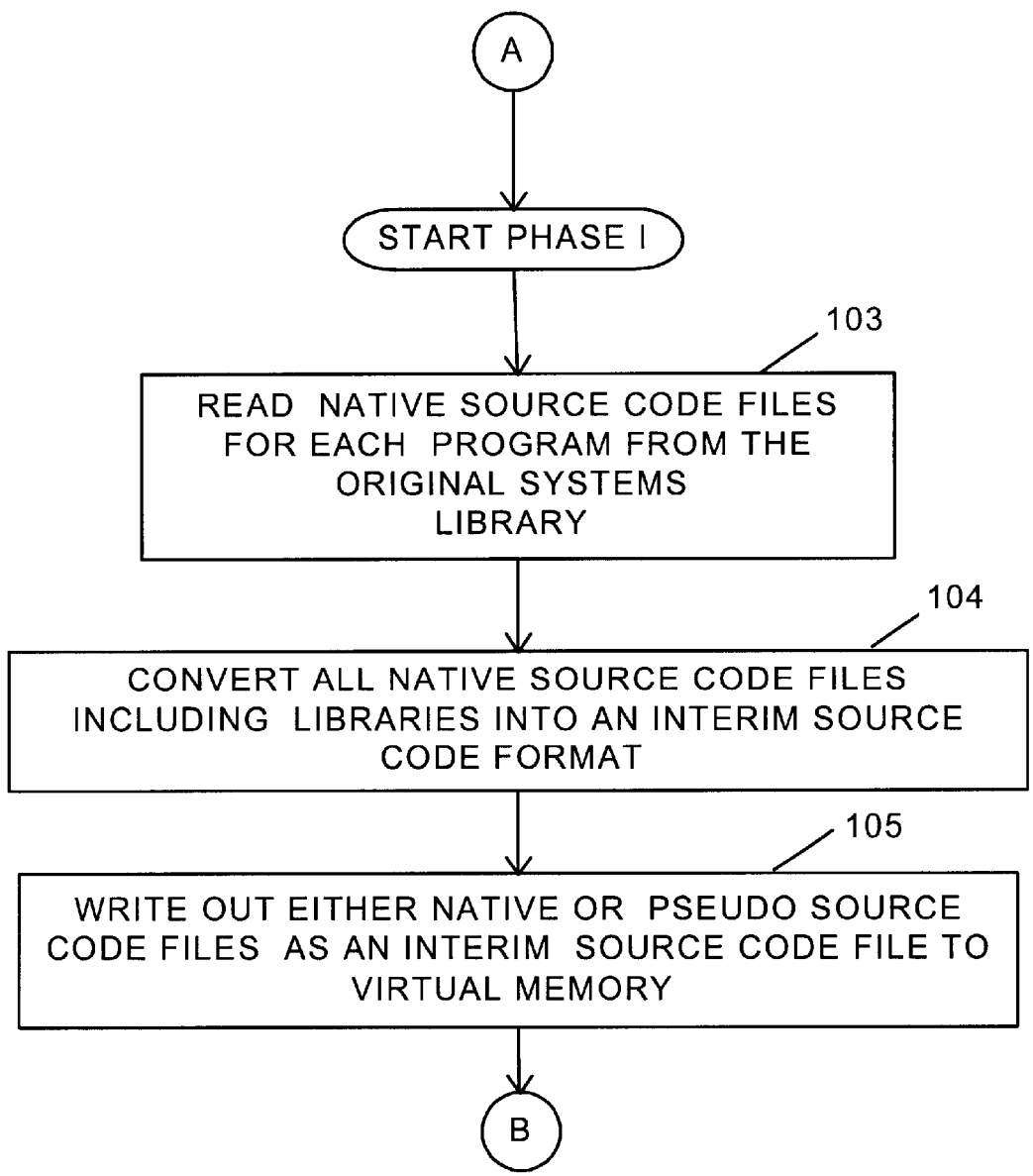

FIGS. 2A through 2L illustrate in more detail the various steps of Phase I. The system operates on program source code files which are related in some manner, such as a financial management system which includes an accounts payable module, an accounts receivable module and so on. The relationship exists in that each of the program source code modules access common data files or use identically formatted work areas. These common data files can include client data files, customer data files, inventory data files, and the like each of which contains various data fields and the defined work area structures. The programs access data elements by defining variables and constants by name and by various attributes such as length, type and so on. In the case of working storage, formatting may also be included such as when a display or printout of data is required. The optimization commences by selecting an option as shown in FIG. 2A, step 101. If Option 1 is selected, step 102 the optimization process commences by reading the program source code files from the current system library for the related group of program files, step 103. Each of the source code files including the function libraries are converted into an interim code which may be in either a native or a pseudo format, step 104 as shown in FIG. 2B.

A pseudo format has been selected in the preferred embodiment as an interim step to simplify the program code for the instant invention. This permits the software of the instant invention to read different program languages convert the instructions to the pseudo code and perform the optimization on the pseudo code without the necessity of rewriting the instant software for the optimization of different program code languages. It should be noted that the invention disclosed herein can operate directly on the native source code without the need to convert to a pseudo code by simply writing the software to include operations on the native language reserved words.

The pseudo code is code which substitutes the keyword or reserved words of any language instruction with a token word. For example a MOVE instruction is converted in the pseudo code to MV. Several different kinds of MOVE instructions are converted sequentially in order of complexity as MV1, MV2, etc. It is clear that a corresponding token must be established for each instruction keyword or reserved word and placed in a table for use in the conversion from native to pseudo code for the target native code. This is accomplished by simply replacing each reserved word on reading the native code with the corresponding pseudo code word for that function and writing the revised code as a new file. In the event the pseudo code is not used, the original source code is written out to a new interim file in the native code for optimization to avoid corruption of the original native code during the optimization process.

As shown in FIG. 2B, the system writes out all pseudo code files into an interim source code file into virtual memory, step 105. This places all source code instructions and data in a specific physical location in such memory which is accessible either sequentially or randomly.

Figure 2C:
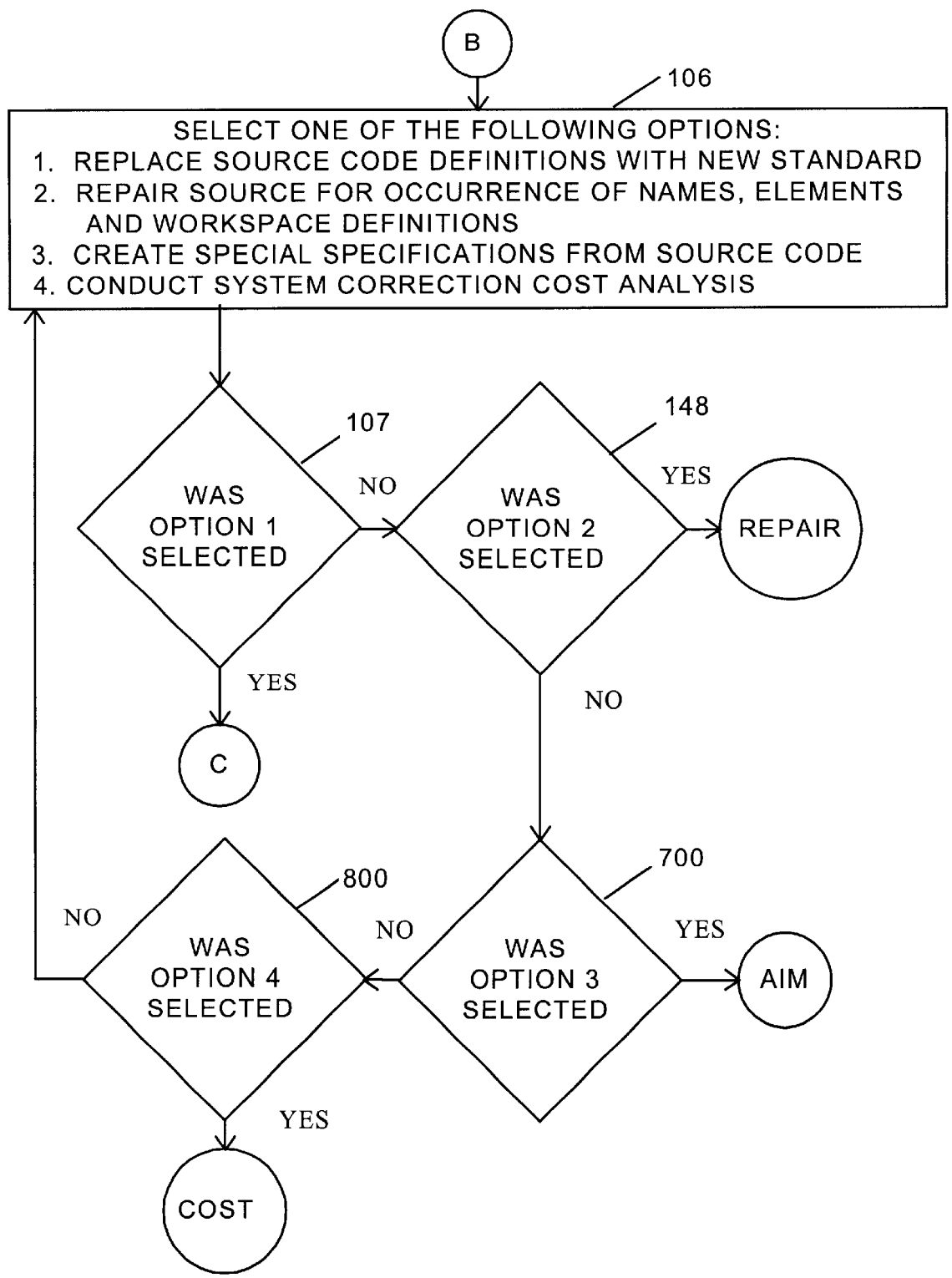
Figure 2D:
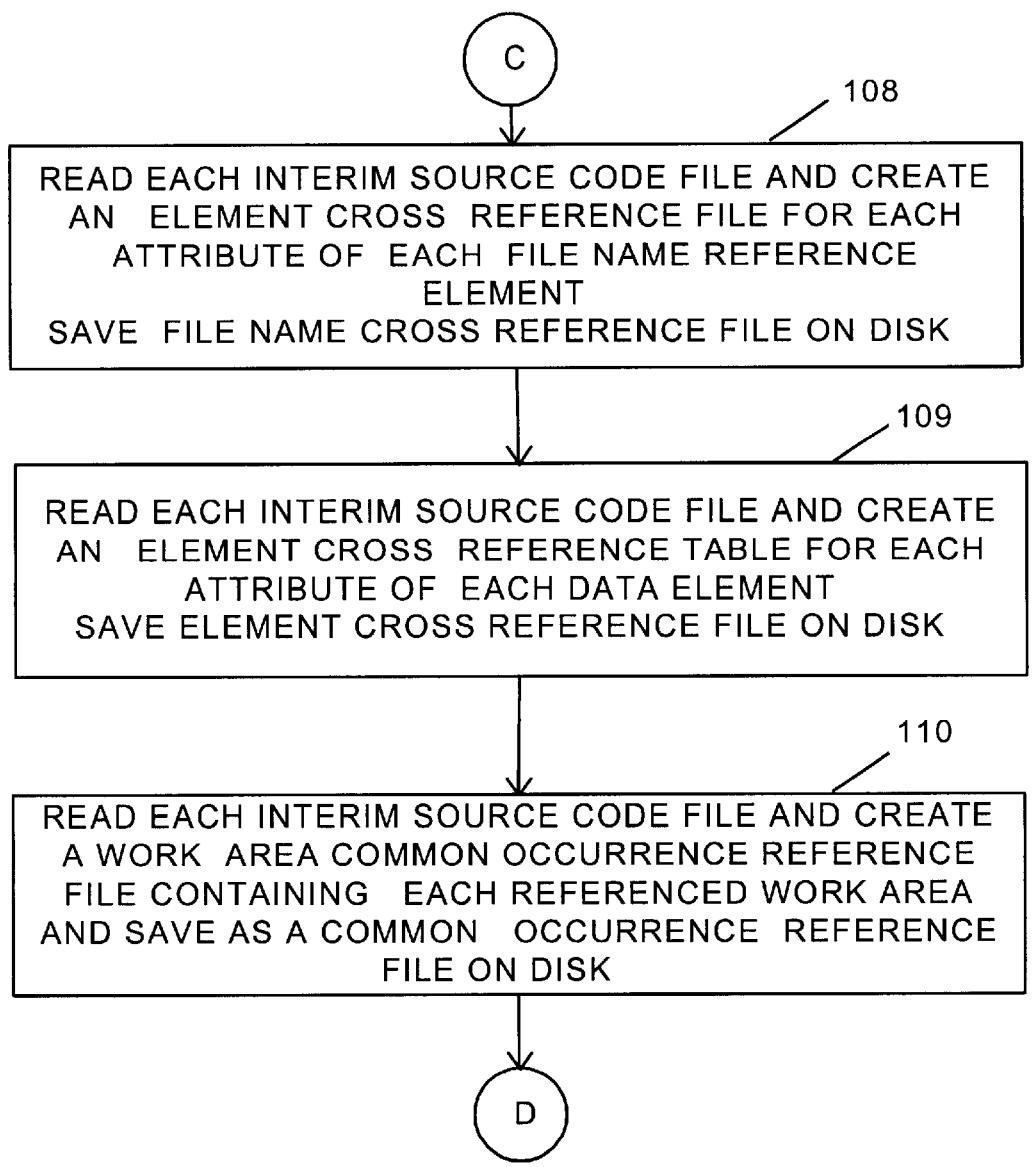

After converting all source code files the user is presented with the additional options as shown in FIG. 2C, step 106. Option 1 is a continuation of the Optimization process. The remaining options permit the user to select an intermediate option as will be discussed hereafter. If Option 1 is selected, step 106, the system commences reading the interim source code files, steps 108–110. Referring to FIG. 2D, the system reads the source code files and determines the logical file name used to access each file and creates a File Name Cross Reference File of logical names and related physical file names. The File Name Cross Reference File is stored on disk, step 108. The user may as an option modify the logical name used by the system for any file. This modified name is stored as the logical name for the first occurrence of the reference to the physical file as set forth in the File Name Cross Reference File.

Each instruction in each source code file or module is again read from the interim source code files and its type determined. Those instructions which operate on a data element are analyzed and the data element identified. The name and other attributes of the data element are determined and an Element Cross Reference File containing each data element by name and its associated attributes is created, step 109. The Element Cross Reference File is stored on disk and contains at least the following information regarding each data element:

1. SOURCE FILE NAME
2. RECORD TYPE
3. ELEMENT NAME
4. ELEMENT LENGTH

Each instruction in each source code file or module is again read from the interim source code file and its type determined. Those instructions, which define work space allocations are analyzed and the work space identified. The workspace is analyzed by structure and a Work Space Common Occurrence File for each workspace definition is created, step 110. The Work Space Common Occurrence File contains at least the following information regarding each work space allocation:

1. THE OCCURRENCE NUMBER
2. THE SIZE OF THE WORK SPACE IN CHARACTERS
3. THE NUMBER OF LINES ALLOCATED FOR THE WORKSPACE
4. THE SEQUENCE OF EACH IDENTICALLY DEFINED WORK SPACE
5. ANY SPECIAL FORMAT INFORMATION

The system provides for interactive communication with a user, who may indicate that a Where Used Report is or is not to be generated.

Figure 2E:
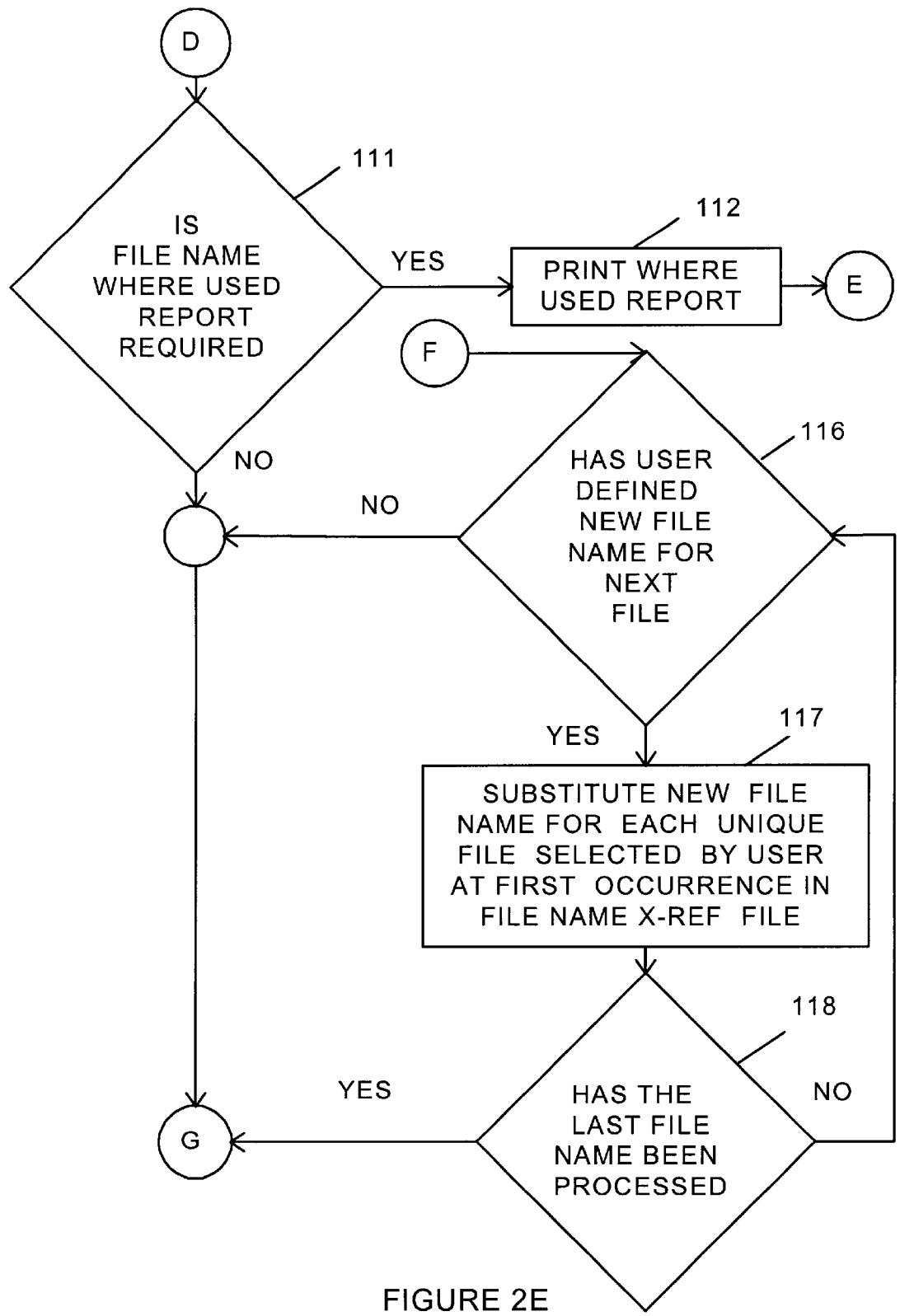
Figure 2F:
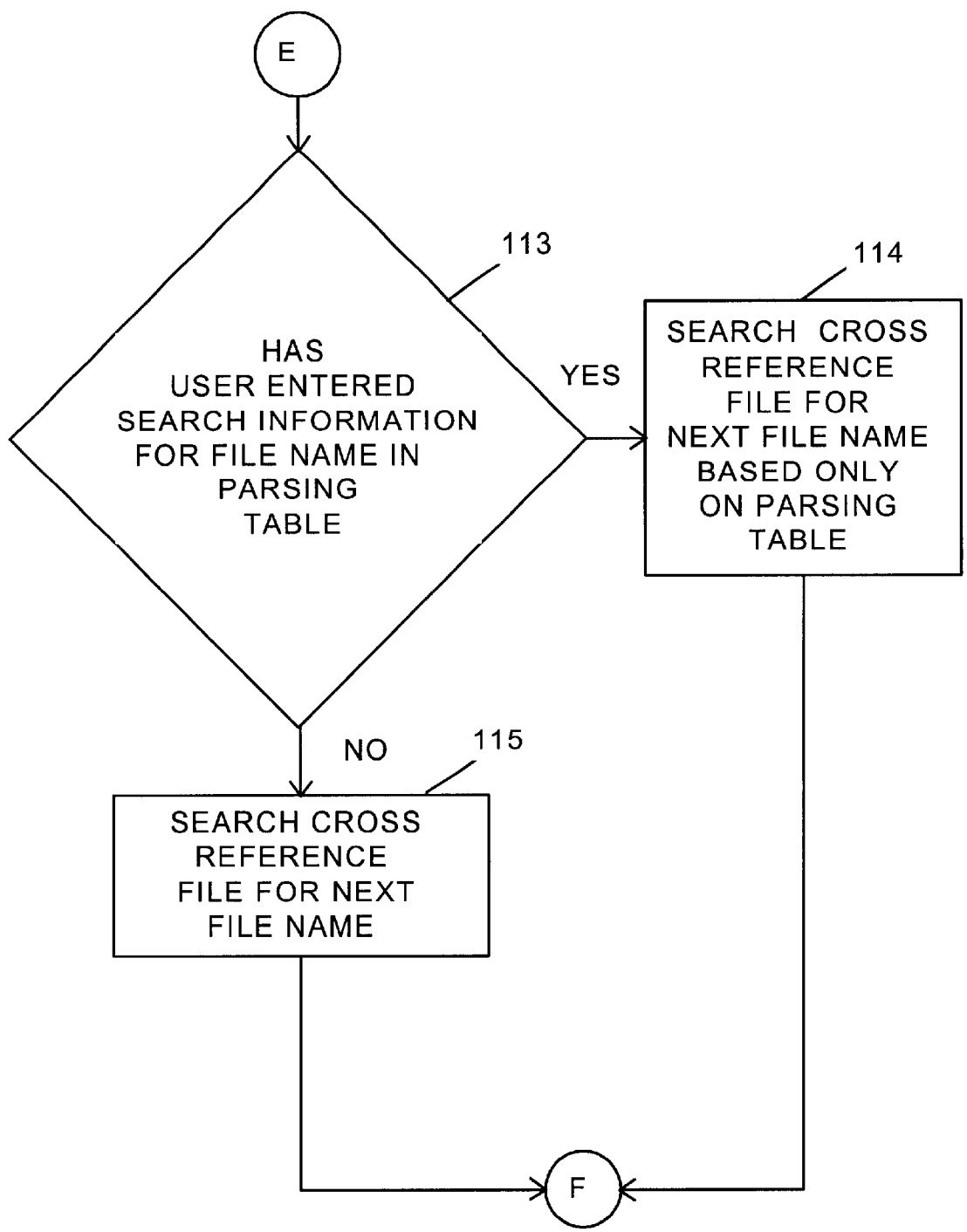

With reference to FIG. 2E, a File Where Used Report for logical file names, may be selected for display or print by the user. A File Where Used Report is a report of the contents of the File Name Cross Reference File with information sorted by physical location. This permits the user to evaluate which of the various logical file name references refer to the same physical file. If the user indicates that such a report is required, step 111, the system prints out a report, step 112. The user may then examine the report and define new logical names for selected physical files. On review of the File Name Where Used Report the user may enter search information in a Parse Table, FIG. 2F. If such information, step 113, is entered the system searches for files matching the Parse Table, step 114. The system also searches for files by name for those files which are not selected by the Parse Table, step 105. If the user defines a new logical name, step 116, the new name is substituted for the first occurrence of each unique file in the File Name Cross Reference File, step 117. Uniqueness is determined by the actual name of the file referred to by the logical file name. Multiple unique logical file names may be selected by the user for change and the user is given the opportunity to change the next physical file name step 118. On processing the last file name, the system goes to the next stage, step 118.

Figure 2G:
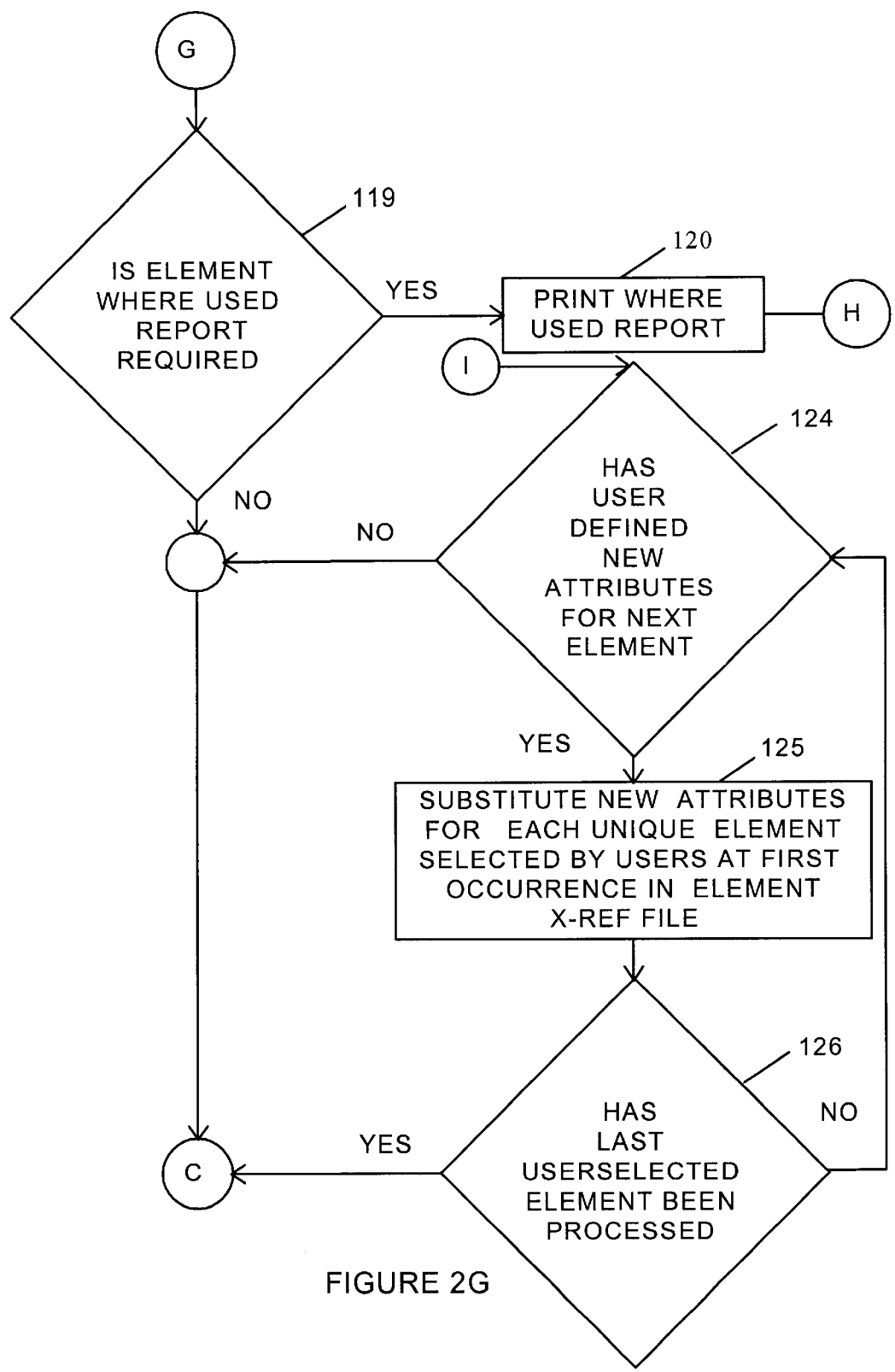
Figure 2H:
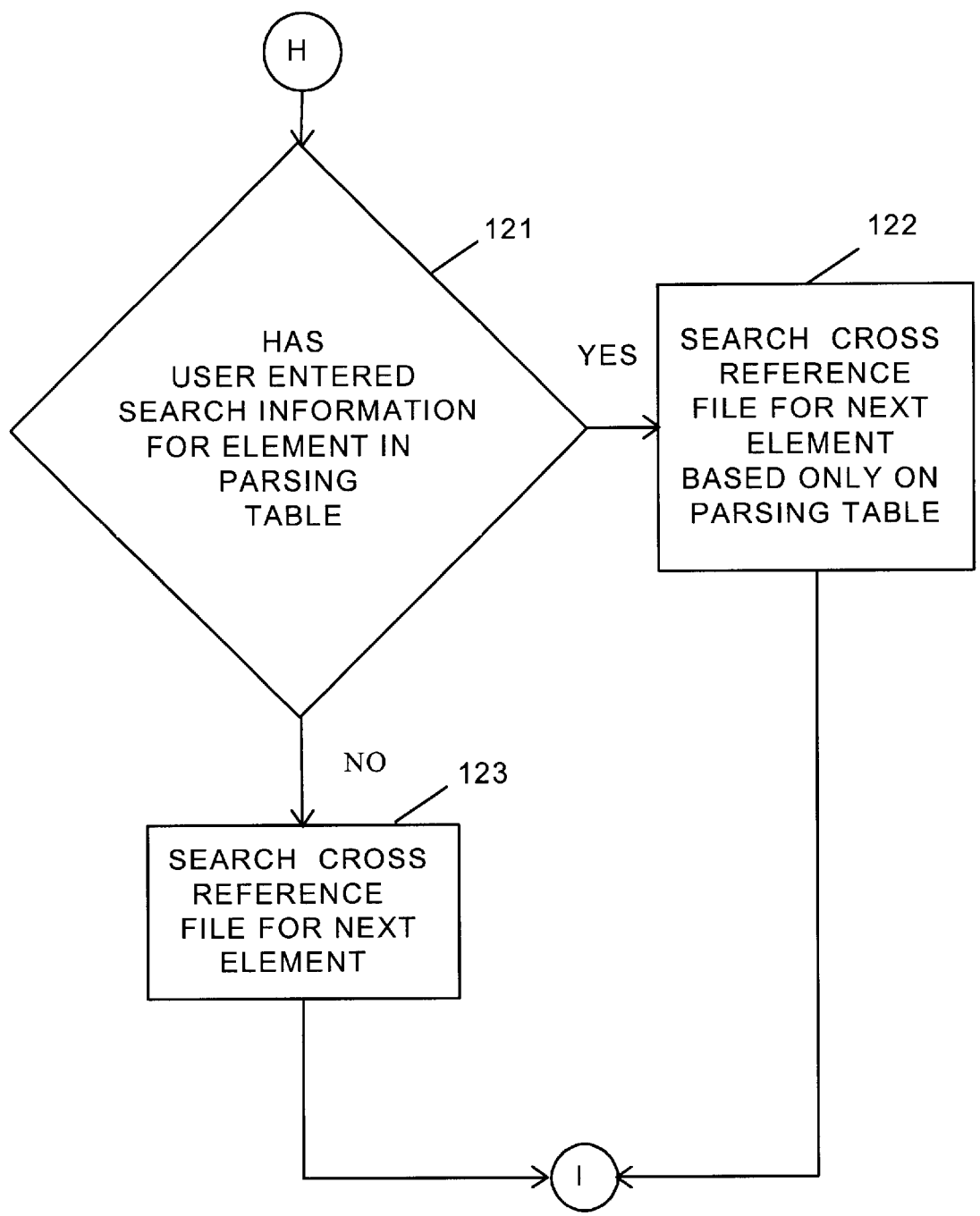

An Element Where Used Report, FIG. 2G, may be selected for print by the user, step 119. An Element Where Used Report is a report of the contents of the Element Cross Reference File with information sorted by physical location. This permits the user to evaluate which of the various data elements are stored in the same physical location. If the user indicates that such a report is required, the system prints out a report, step 120. The user may then examine the report and define new attributes for selected variables. On review of the Element Where Used Report the user may enter search information in Parse Table, step 121, as shown in FIG. 2H. If such information is entered, the system searches the Element Cross Reference File for the data elements which match the Parse Table, step 122. The system also searches for any data elements for which no selection was made by the user, step 123. These element definitions may be a change by the name, type or length or any other attribute of the data element In the case of a six byte date, for example, the user may wish to change the length to eight bytes in order to accommodate a four byte year such as the year 2000. If the user defines a new name or new attributes, step 124, the new data is substituted for the first occurrence of each unique data element in the Element Cross Reference File, step 125. Uniqueness is determined by the physical location of the data element in the virtual memory. Multiple unique data elements may be selected by the user for change and the user is given the opportunity to change the next element name or attributes, step 126. On processing the last file name, the system goes to the next stage, step 126.

Figure 2I:
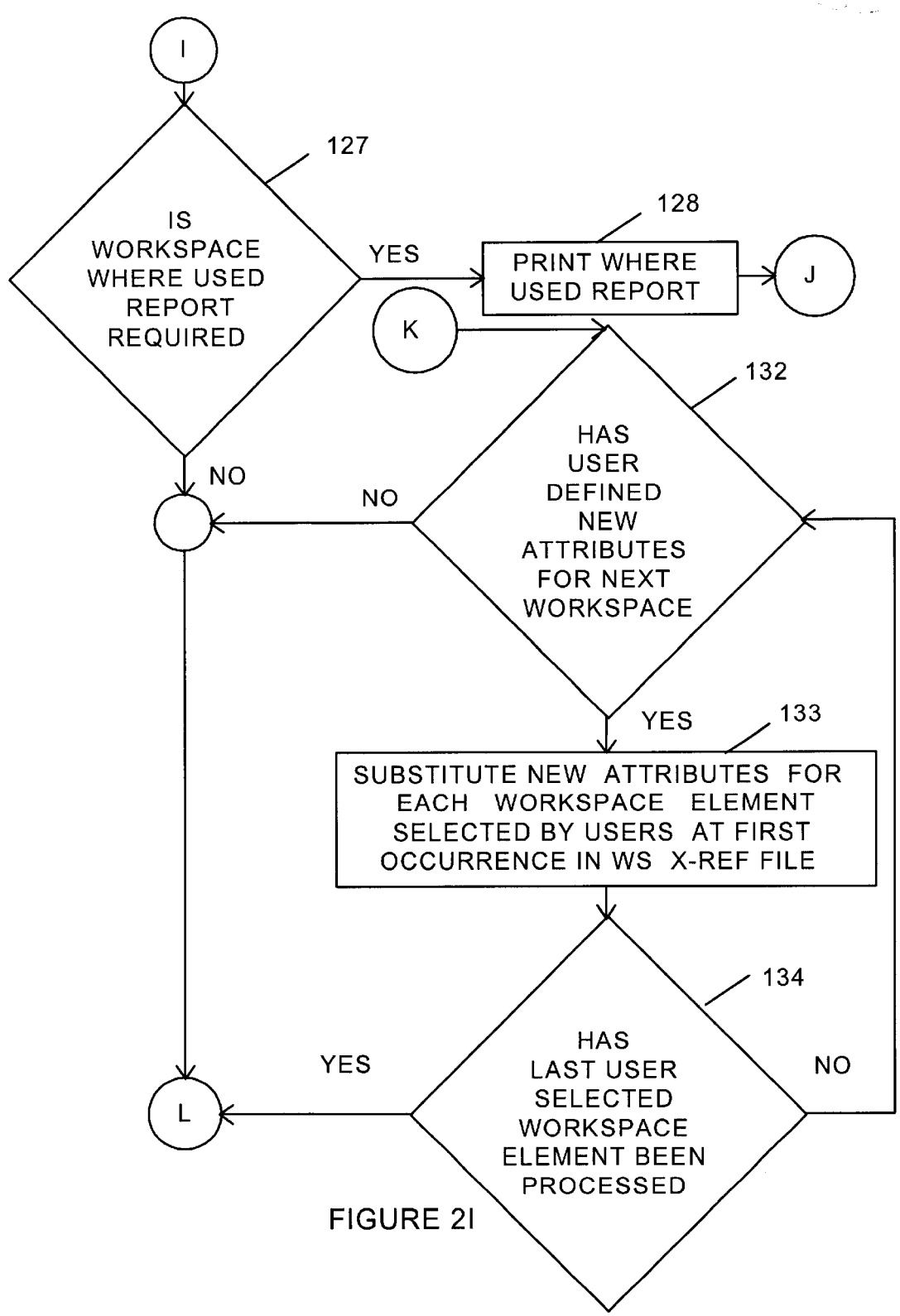

As shown in FIG. 2I, a Work Space Where Used Report for work space information, may be selected for display or print by the user, step 127. A Work Space Where Used Report is a report of the contents of the Work Space Common Occurrence File with information sorted by physical location. This permits the user to evaluate which of the various work space allocation parameters require change. For example, if a data element size is changed, the corresponding size of a work space may also require change.

Figure 2J:
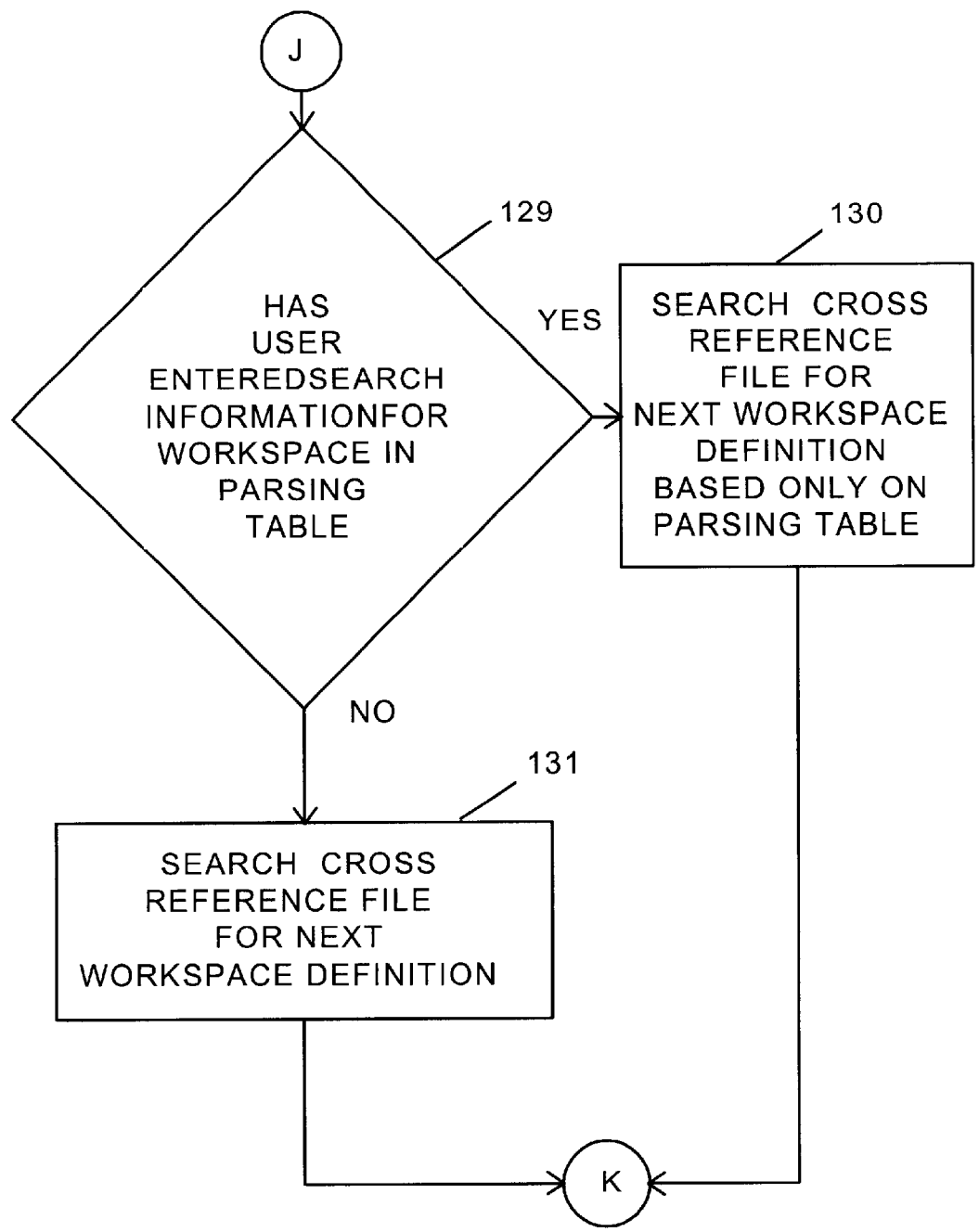

If the user indicates that such a report is required, step 127, the system prints out a report, step 128. The user may then examine the report and define new attributes for selected workspace parameters. On review of the Work Space Where Used Report the user may enter search information in a Parse Table, step 129, as shown in FIG. 2J. If such information is entered, the system searches the Work Space Common Occurrence file for common work spaces which match the Parse Table, step 130. The system also searches for any other Common workspace definitions for any workspace allocations for which no selection was made by the user, step 131. The essential difference is that work space is searched by its profile. These new definitions may be a change in the format, type or length or any other attribute of the workspace parameters. If the user defines a new name or new attributes, step 132, the new data is substituted for the first occurrence of each unique work space in the Work Space Common Occurrence File, step 133. Uniqueness is determined by the form of the workspace allocation. Multiple unique workspace definitions may be selected by the user for change and the user is given the opportunity to change the next work space definition, step 134. On processing the last work space definition, the system goes to the next stage, step 134.

Figure 2K:
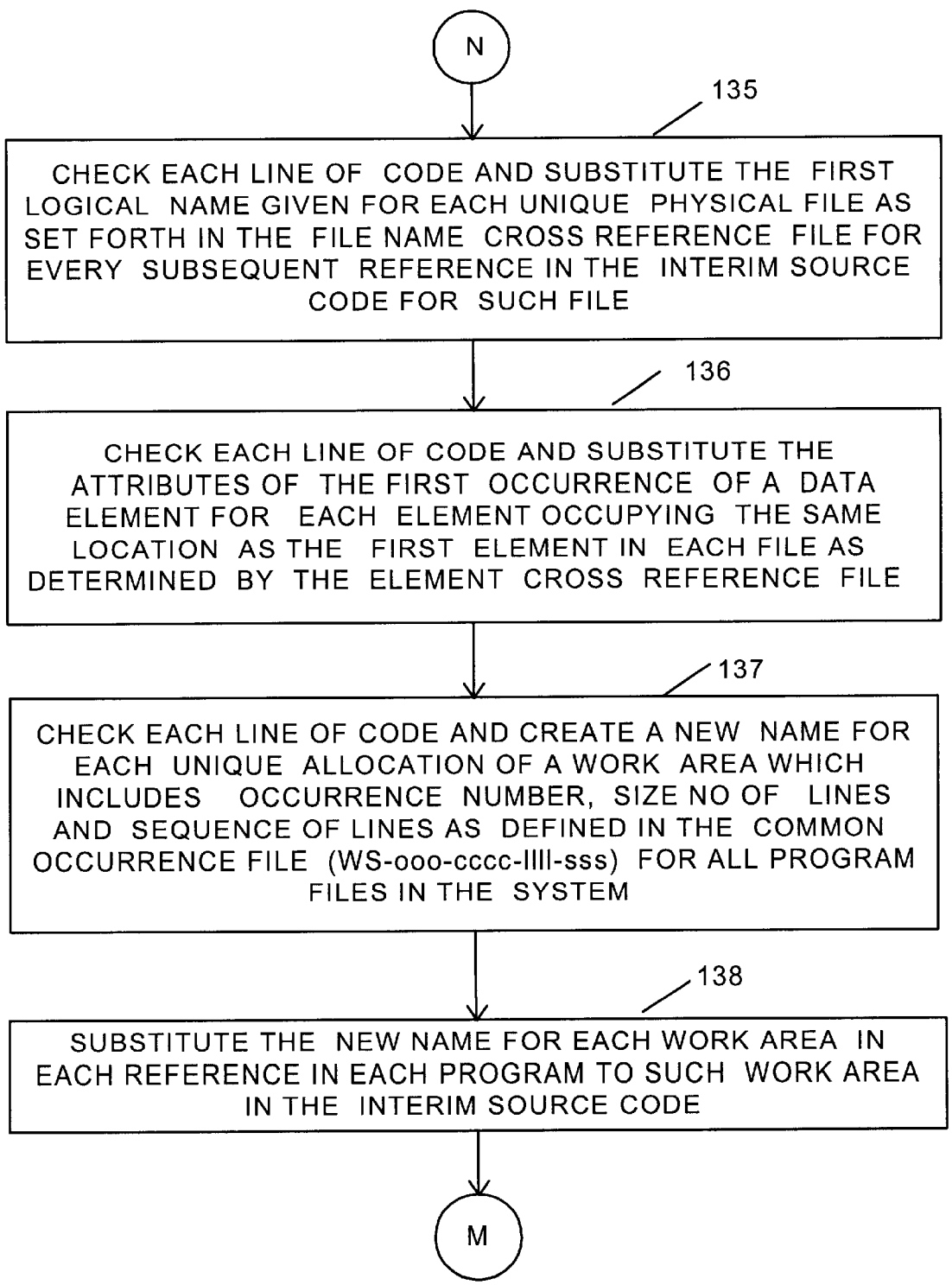

Referring to FIG. 2K, the interim source code is checked and each logical file name is compared with the File Name Cross Reference File. Each reference to the same physical file name is changed to the logical name of the first occurrence of the logical file name associated with the same physical file as set forth in the File Name Cross Reference File, step 135, as determined by the system or selected by the user.

The interim source code is again checked and each data element name is compared with the Element Cross Reference File. Each reference to the same element in the same physical location is changed to reference the name and attributes of the first occurrence of the data element as set forth in the Element Cross Reference File, step 136 as determined by the system or selected by the user.

The interim source code is again checked and each work space allocation is compared with the Work Space Occurrence File. Each reference to the same work space in the same format is changed to reference the parameters of the first occurrence of the work space definitions as set forth in the Work Space Occurrence File, step 137 as determined by the system or selected by the user.

However, the user cannot select a new workspace name. The system creates a new reference name for each unique Work Area, step 137, in the following format: WS-ooo-cccc-llll-sss, where "ooo" is the occurrence number, i.e., the first occurrence of the same work space allocation (ooo=001 and so on), "cccc" is a four digit number representing the size of the work space in characters, "llll" is a four digit number representing the number of lines of work area, and "sss" is a three digit number representing the sequence of lines of workspace allocated. That is, the order of identical work space allocations defined in sequence. The information required regarding the format of the Work Area is derived from the Work Space Common Occurrence file which defines each such area. The maximum sequence number is an indication of the largest number of work space allocations in any program sequence. Certain programs may overlap in all or part of the Work Area allocations. This means that if program 1 uses work space allocated in sequence 001 through 006, and program 2 uses workspace allocated in sequence 001 through 003, each program will utilize the same physical space in sequence 001 through 003. Program 1 of course uses additional space 004 through 006. Since the programs run at different times this use of the same work area does not create any conflict, but simplifies the code with standard definitions with equivalent work space used by different programs. The name created is substituted for each reference allocating the work area in sequence within each program step 138. This means that each work space name has the attributes of the work space built into the name and makes future maintenance less confusing.

The user is provided an option to reprint the File Name Where Used Report for the revised file names, step 139. On an affirmative selection, the revised File Name Where Used Report is printed, step 140, as shown in FIG. 2L.

Figure 2L:
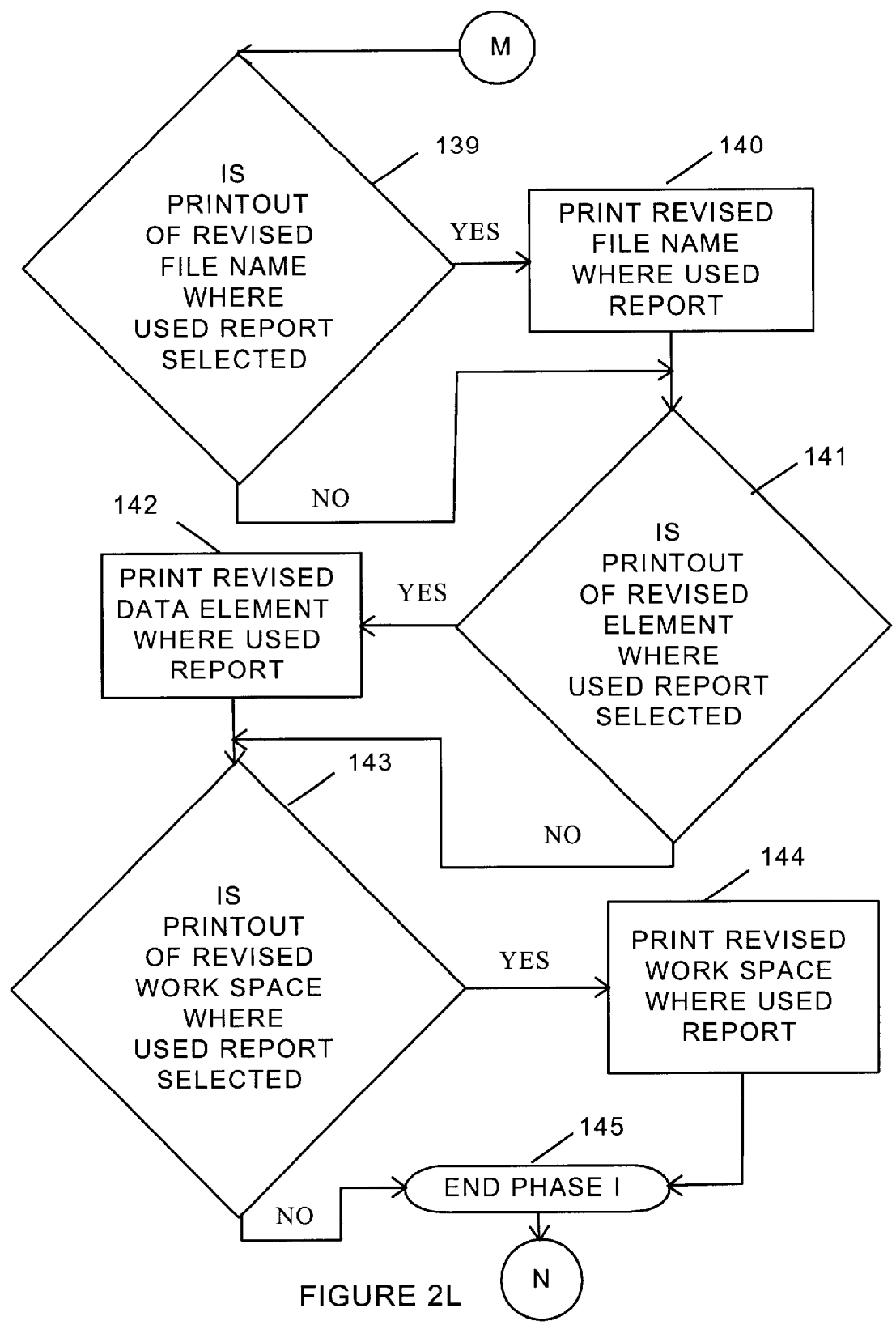

In FIG. 2L, the user is then provided an option to reprint the Element Where Used Report for the revised data element names and attributes, step 141.

On an affirmative selection, the revised Element Where Used Report is printed, step 141.

The user is also provided an option to reprint the Work Space Common Occurrence Report for the revised workspace allocations, step 143. On an affirmative selection, the revised Work Space Common Occurrence Report is printed, step 144, and Phase I ends, step 145.

While each Phase is indicated as sequentially following the other, this need not occur at the same time. That is, each Phase may be executed independently as indicated in options to be discussed hereafter. However, to the extent that each independent phase requires data generated by a previous phase, they should be executed in sequence. However, a user could elect to only make the names uniform throughout the programs and thus terminate at Phase I. Alternatively, perhaps only the size of certain variables is to be changed and this can be accomplished by making the appropriate attribute changes in Phase I.

Figure 3:
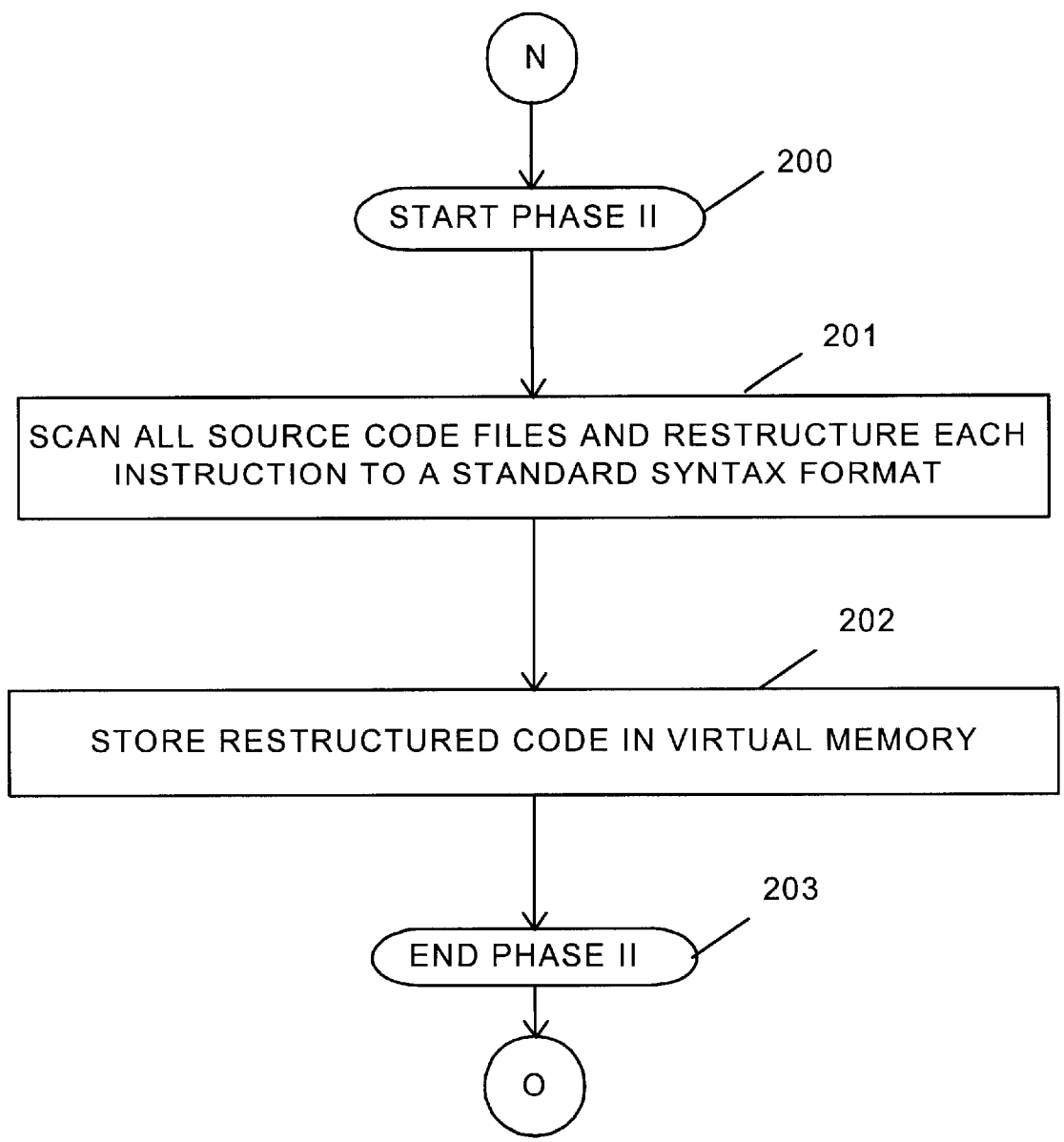
FIG. 3 is a flow chart of the Horizontal Synchronization System.

In Phase II, FIG. 3, all source code files are scanned and restructured to a standard syntax format, step 201. In the preferred embodiment, that format is a single space between instruction words and no spaces between parenthesis and words bound by the parenthesis. Accordingly, excess or multiple spaces are removed so that space formatting is consistent for all words in the source code instructions. This makes comparison of instruction lines faster as syntax need not be examined at each line. The restructured interim code is then stored in virtual memory, step 202. The interim code now has uniform logical file names for the same file, data element names for the same data location, and the same reference name for workspace allocations.

Figure 4:
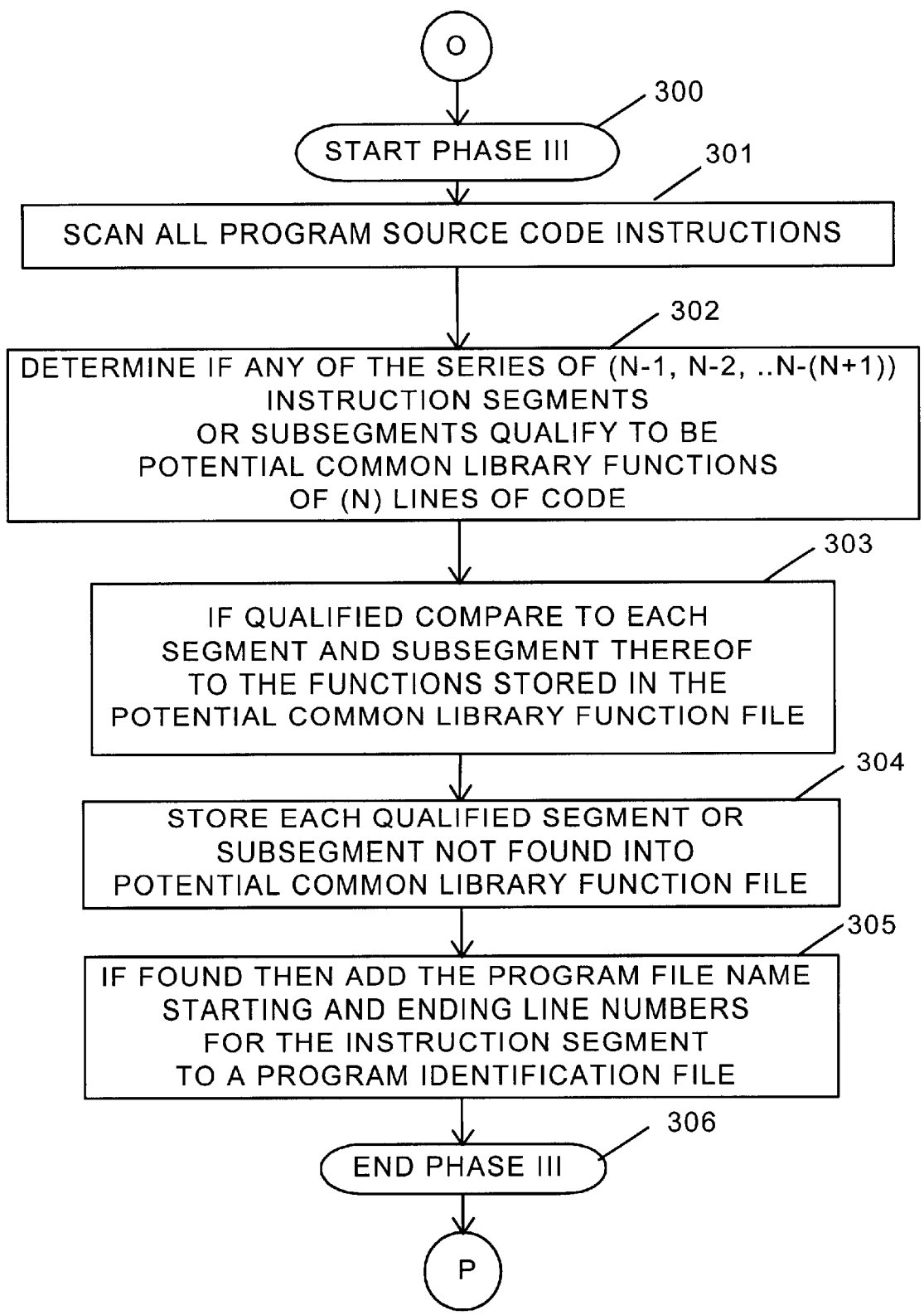
FIG. 4 is a flow chart of the Sequential Synchronization System.

In Phase III, as shown in FIG. 4, all interim program source code instructions are again scanned, step 301. Selected segments of code are examined to determine if the segment or any sub-segments qualify to be potential common library functions, step 302. In the preferred embodiment, the particular code segments examined are all segments which are positioned between program instruction code labels. Such code is parsed into sequential segments based on the series (N−1+N−2. . . +N−(N+1)) where N is equal to the number of code lines in the original segment and the result is a positive number greater than 0. This includes all sequential lines of code of at least two lines each, that is, as shown in FIGS. 7A through 7D. If a segment of code between two program labels is two instructions long, then one segment 1 qualifies to be a potential common library function, FIG. 7A. If three lines of code are between program labels, then there is one three line segment 2, two of the two line segments 3 and 4, for a total of (2+1) three segments which qualify to be potential common library functions, FIG. 7B. If four lines of code are between program labels, then there is a four line segment 5, two three line segments 6 and 7, and three two line segments 8, 9 and 10, for a total of (3+2+1) six code segments each of which qualify to be potential common library functions, FIG. 7C. Finally, if five lines of code are between program labels, then there is a five line segment 11, two four line segments 12 and 13, three of the three line segments 14, 15 and 16, and four two line segments 17, 18, 19, and 20, for a total of (4+3+2+1)ten segments which qualify to be potential common library functions, FIG. 7D. All code segments must be sequential.

Referring again to FIG. 4, on determination of the various segments which are potential common library functions, each such segment is compared against the segments already stored as potential common library functions in the Potential Common Library Function File, step 303. Each segment which has not been previously stored as a common library function, that is, it is not already present in the Potential Common Library File, is stored in the potential common library file, step 304. Phase III exhibits significant storage activity and the system tends to slow down initially. As more potentially common functions are stored in the library, the speed of the system increases in proportion to the number of segments found in the library.

For each segment which is found, the program file name and the starting and ending line numbers for the instruction segment are determined and stored in a Program Identification File, step 305 and Phase III ends, step 306.

Figure 5A:
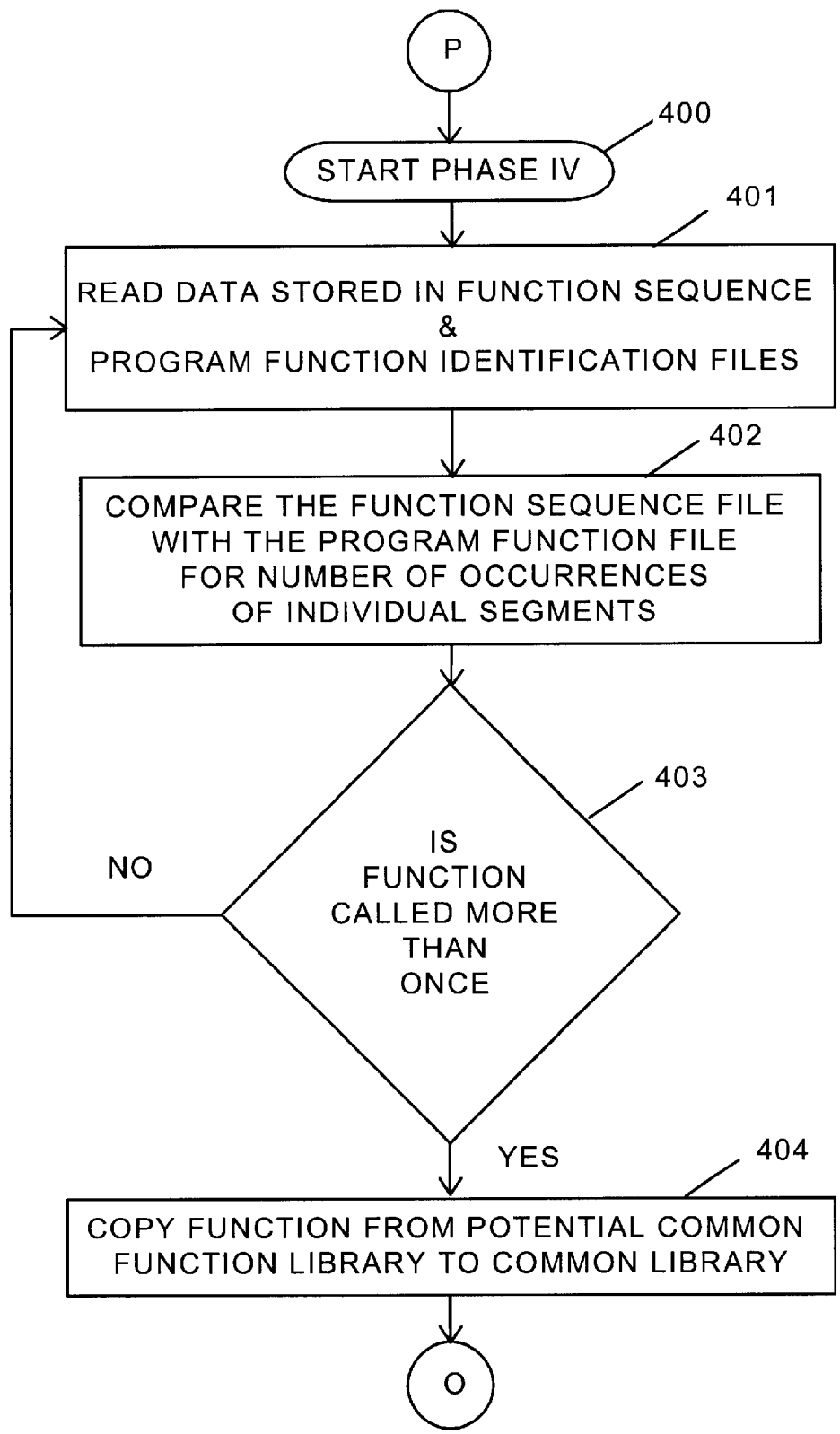
FIGS. 5A and 5B are flow charts of the library common function evaluation.

Phase IV commences, as shown in FIG. 5A, by reading data stored in the Function Sequence File and the Program Function Identification File, step 401. The Function Sequence File is compared with the Program Function Identification File for the number of occurrences of segments which are located in the Potential Common Library Function File, step 402, and a determination made as to those segments which are called more than once. If any segment is called more than once, it qualifies as a common function, step 403.

All common functions are copied from the Potential Common Library Function File to the Common Function Library, step 404.

Figure 5B:
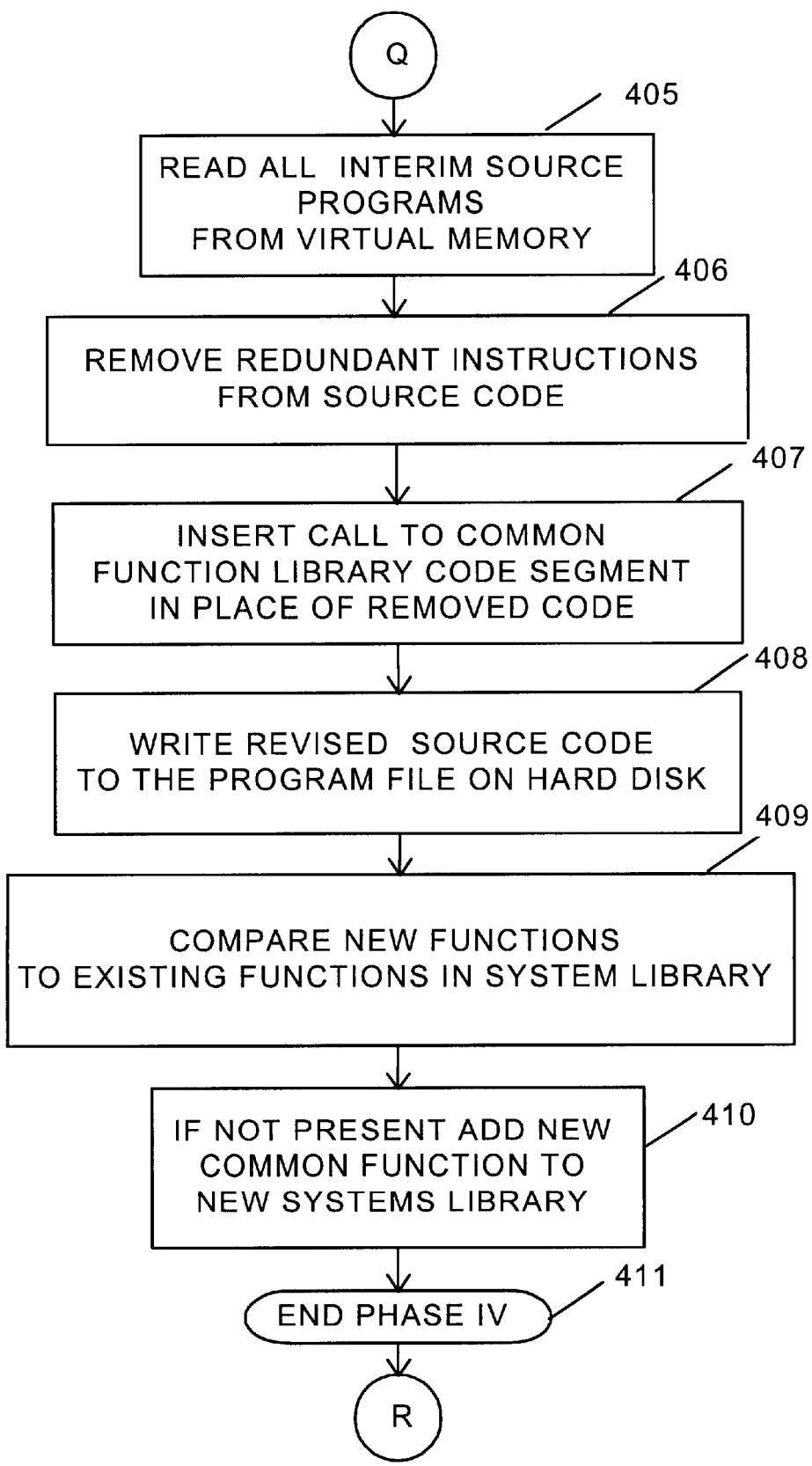

In FIG. 5B, all Interim source code is read from virtual memory, step 405 and redundant instruction segments (i.e., that which are used more than once) are removed from the source code, step 406. A single line of call code is inserted in the place of the removed code to call the respective code segment from the systems library, step 407.

The revised program source code is then written to the program file on hard disk, step 408. The common functions are compared to the system library to determine if the segment was previously saved as a common function, step 409. If not, it is stored in the system library, step 410 and phase IV ends, step 411.

Upon completion of Phases I, II, III and IV, all redundant program source code has been eliminated and only one copy of any unique set of instructions which is used more than once has become a "common library function" and has been stored in a new system library which is resident on disk. Calls to the functions in the system library have replaced redundant code in all interim source code files.

Figure 6A:
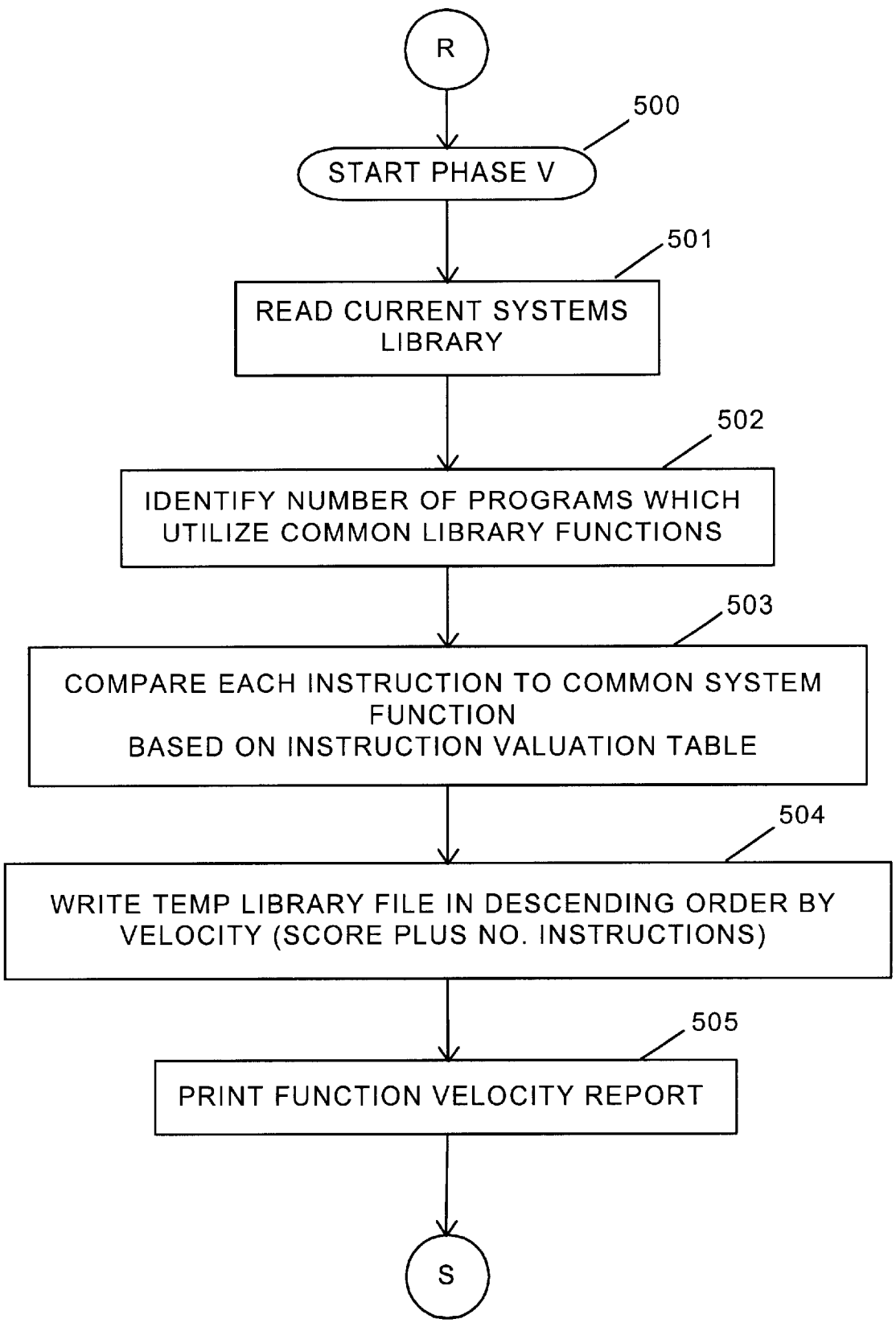
FIGS. 6A and 6B are flow charts of the conversion of the optimized code into native format.
Figure 6B:
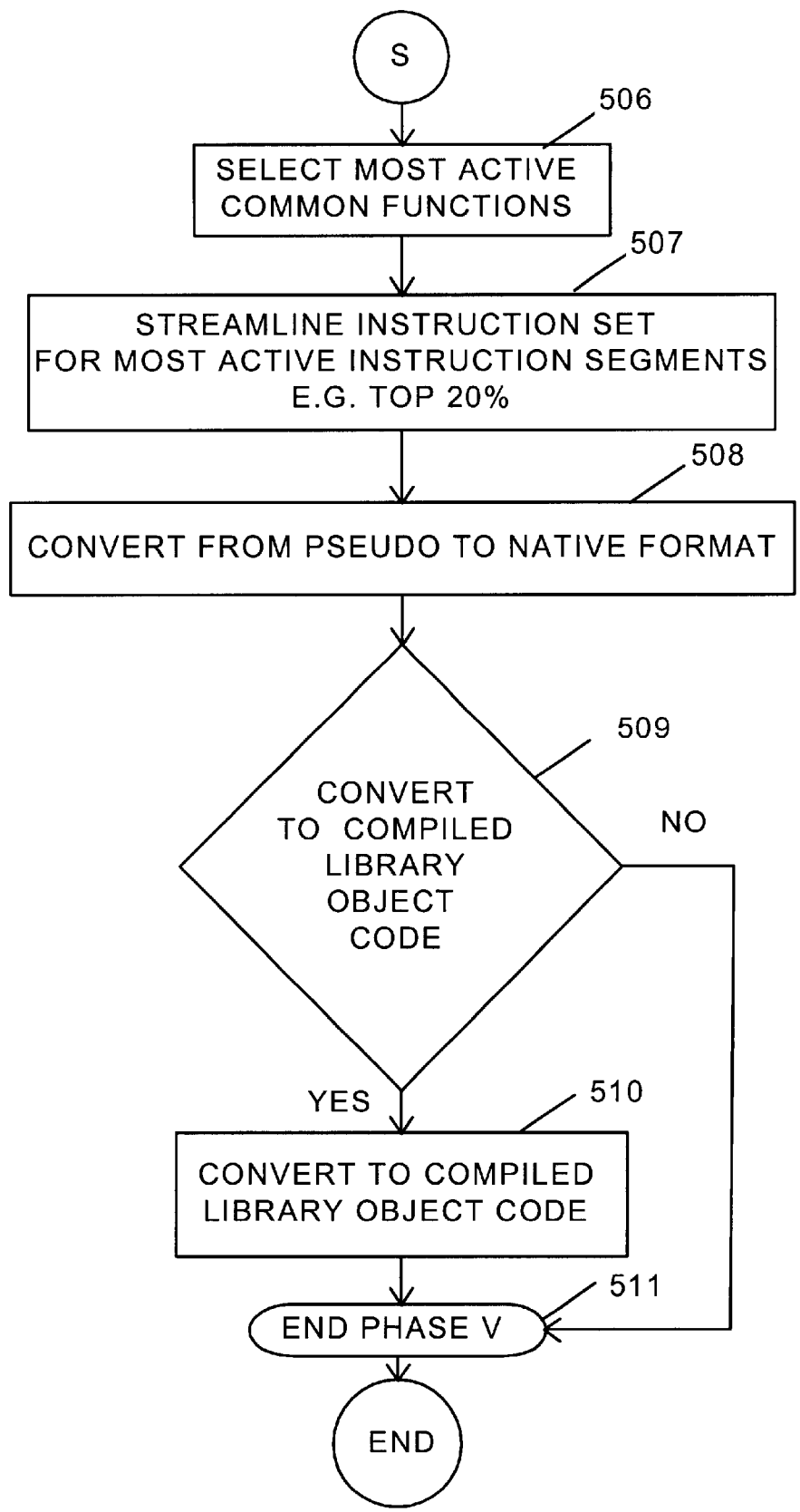
Figure 7A:
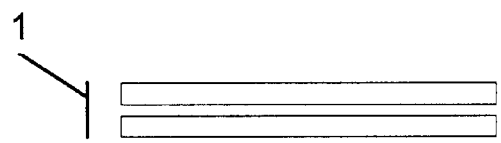
FIGS. 7A through 7D illustrate library common function segmentation.
Figure 7B:
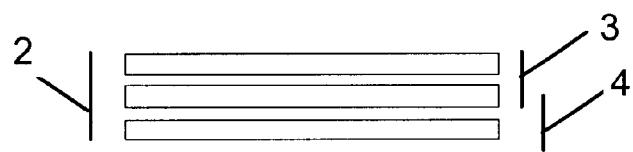
Figure 7C:
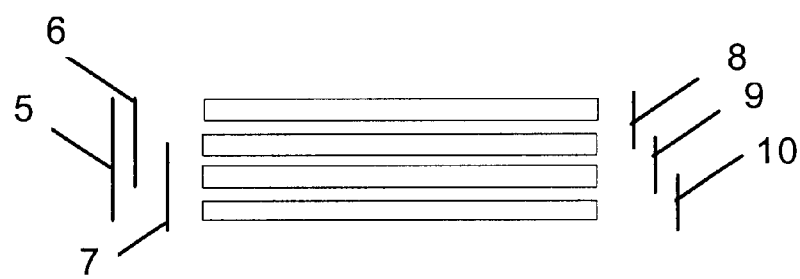
Figure 7D:
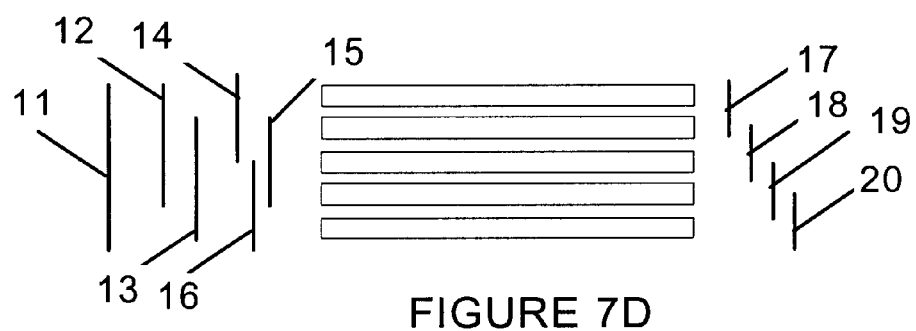

In phase V the systems library is read into memory, step 501, as shown in FIG. 6A. The number of programs which utilize common library functions are identified, step 502. Each instruction is compared to a common system function based on an Instruction Valuation File score, step 503. The score is assigned based on the instruction type. The scale is arbitrary with the more complex instructions having a higher score. A Temporary library file is created and each instruction segment stored by name and velocity (score plus number of instructions per segment), in descending order by velocity, step 504. The Temporary Library File is stored in a Temporary Library File. A velocity report is printed listing each individual library code segment by name and velocity, in descending velocity order, step 505. As shown in FIG. 6B, a user interactively selects the highest rated common functions based on the value of the velocity set forth in the velocity report, step 506. The instruction set for each of these most active common functions may then be manually optimized by the user, step 507. Thereafter, the system converts all of the interim source code from the pseudo to native code in which it originally existed, step 508. Optionally, the user may elect to compile the library to compiled library object code, step 509 on an affirmative election, the system converts the new source code instructions to call compiled library objects, step 510. In either case Phase V ends, step 511.

Use of the optimized source code as provided by this invention is enhanced not only through the streamlining and optimization of code as described herein, but also due to the fact that the various library objects, once called, remain resident in memory and as such increased speed of operation of the programs is enjoyed due to called portions of the program being accessible at RAM memory speeds.

DETAILED EXPLANATION OF PREFERRED EMBODIMENT

Figure 8A:
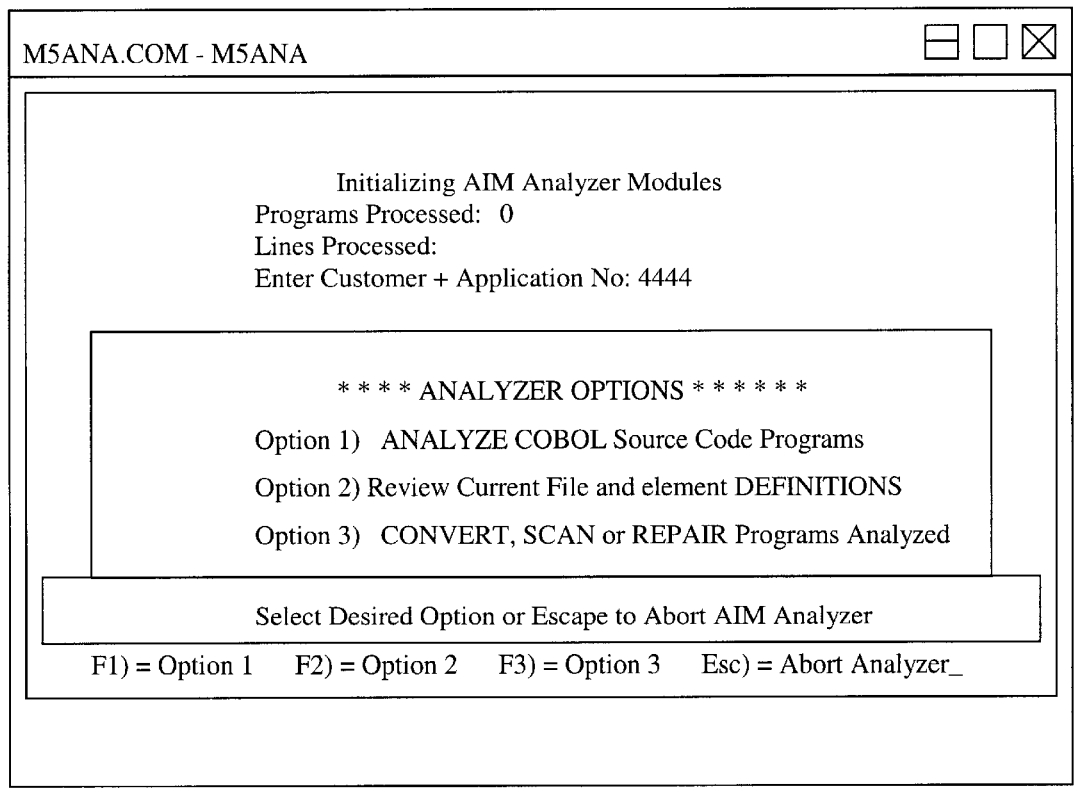
FIGS. 8A through 8Z are selected user screens for the Analyzer option.
Figure 8B:
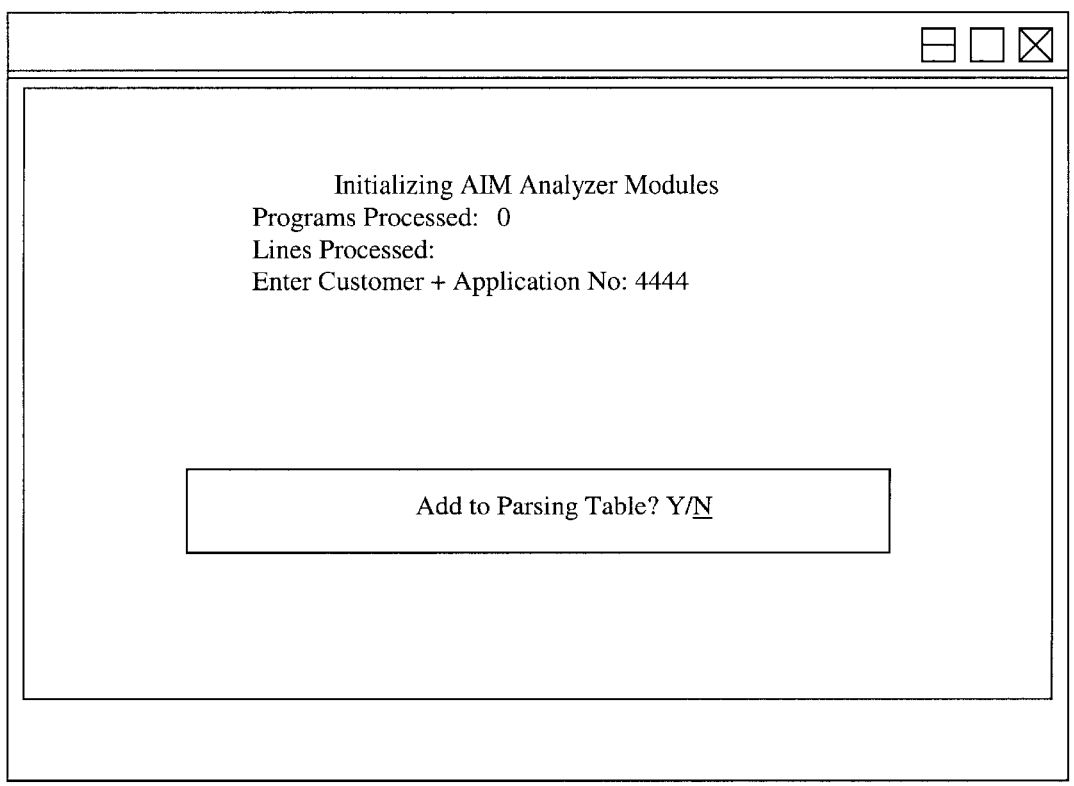
Figure 8C:
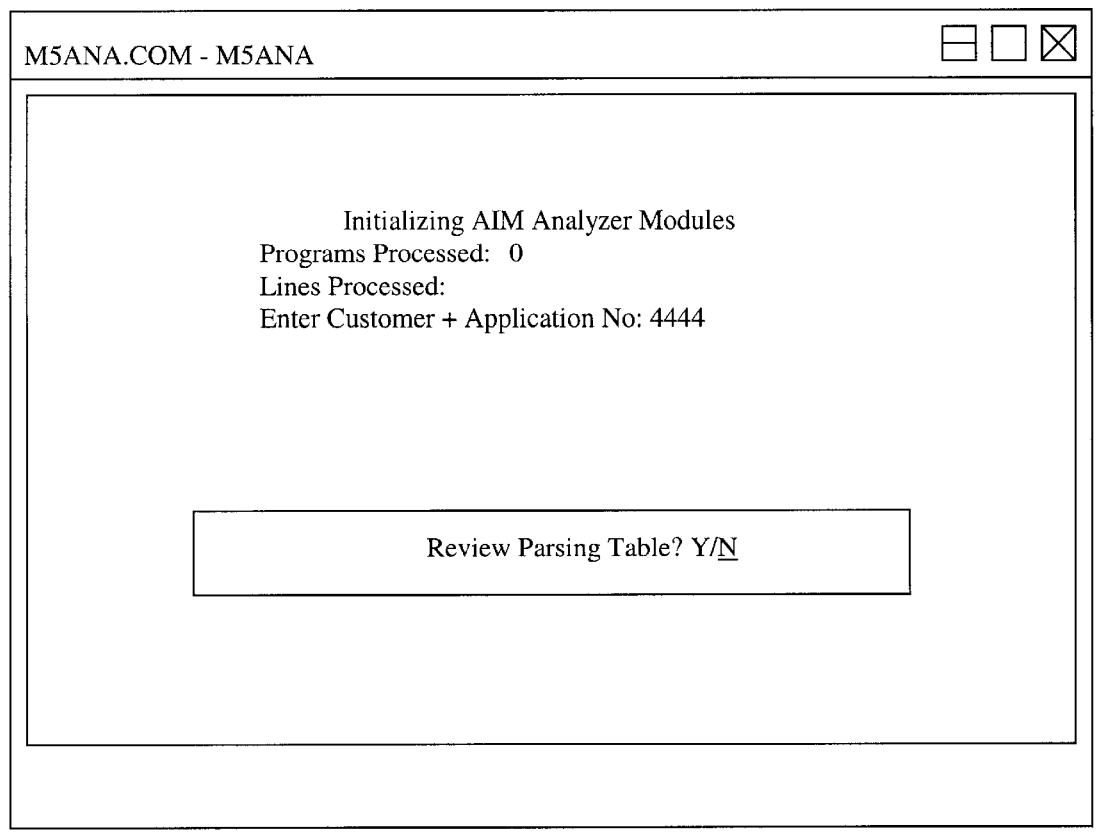
Figure 8D:
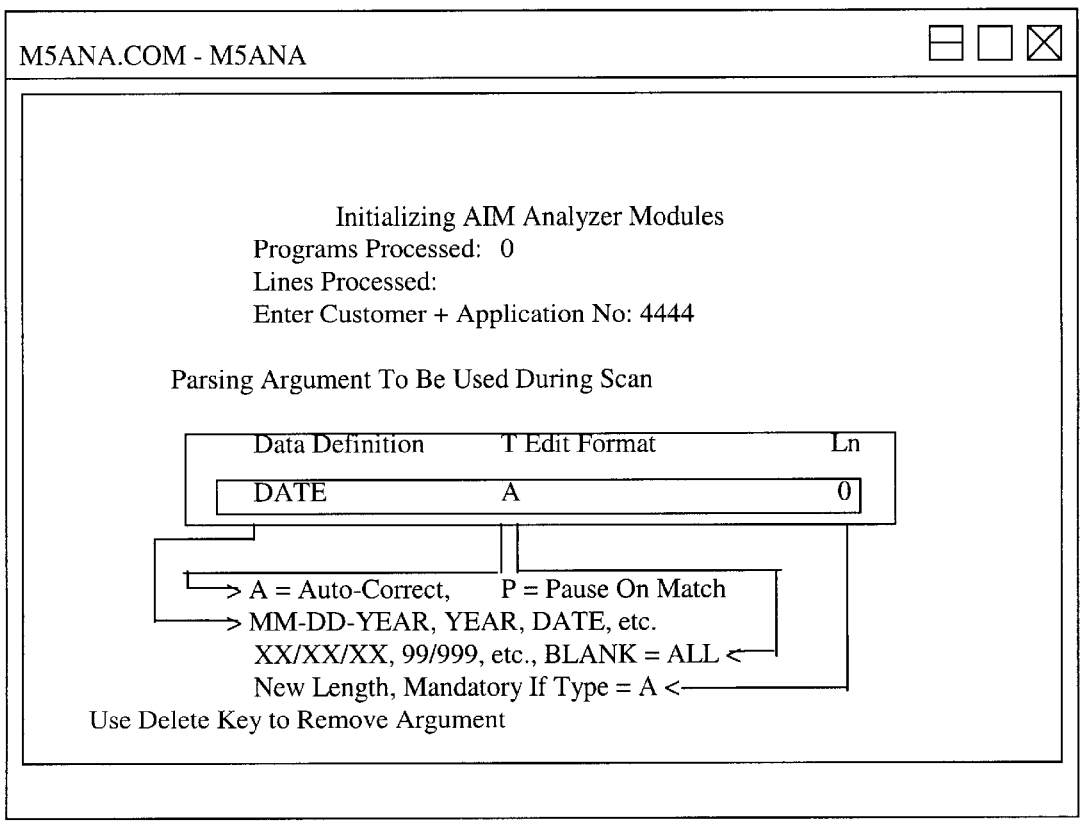
Figure 8E:
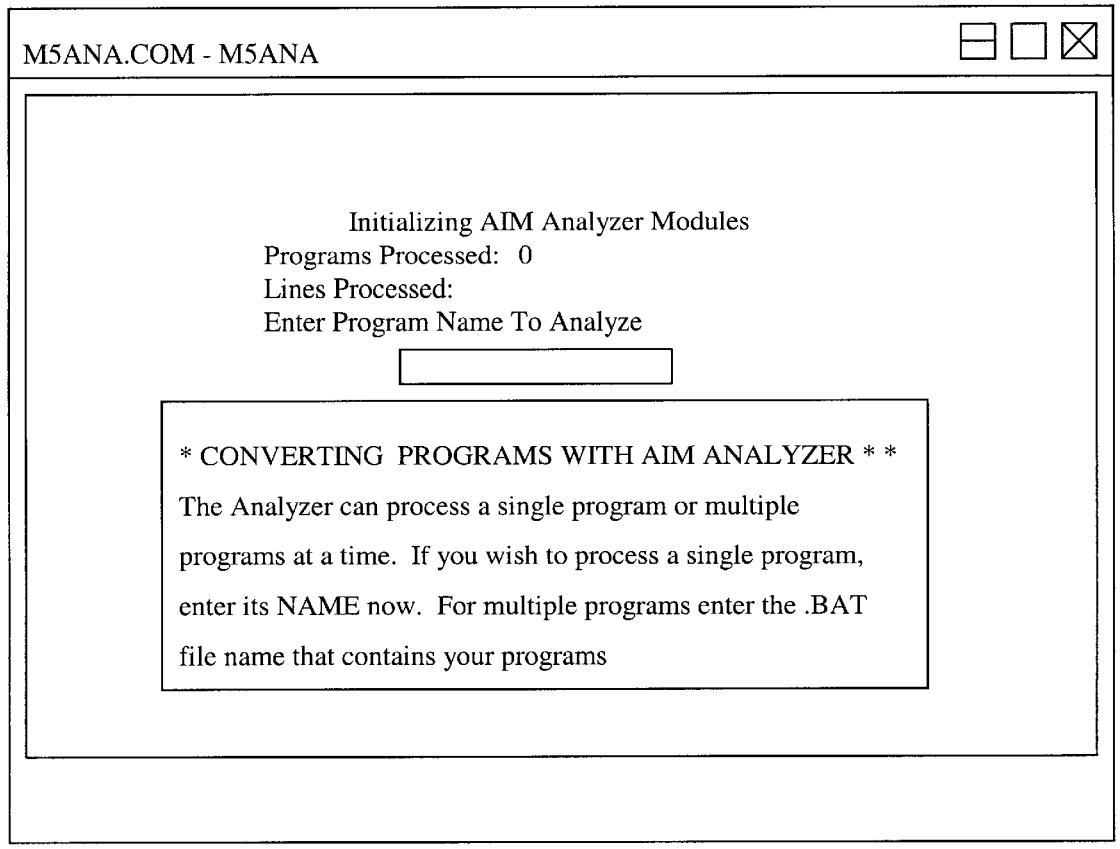
Figure 8F:
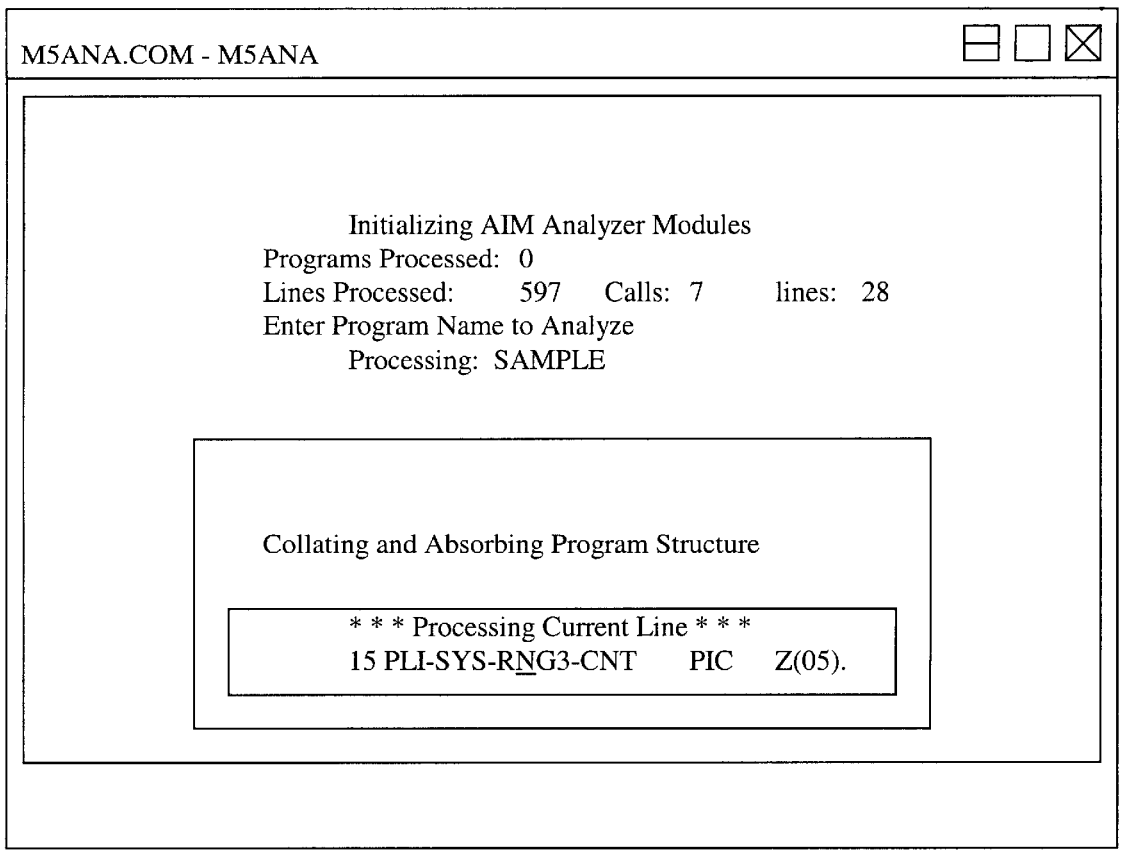
Figure 8G:
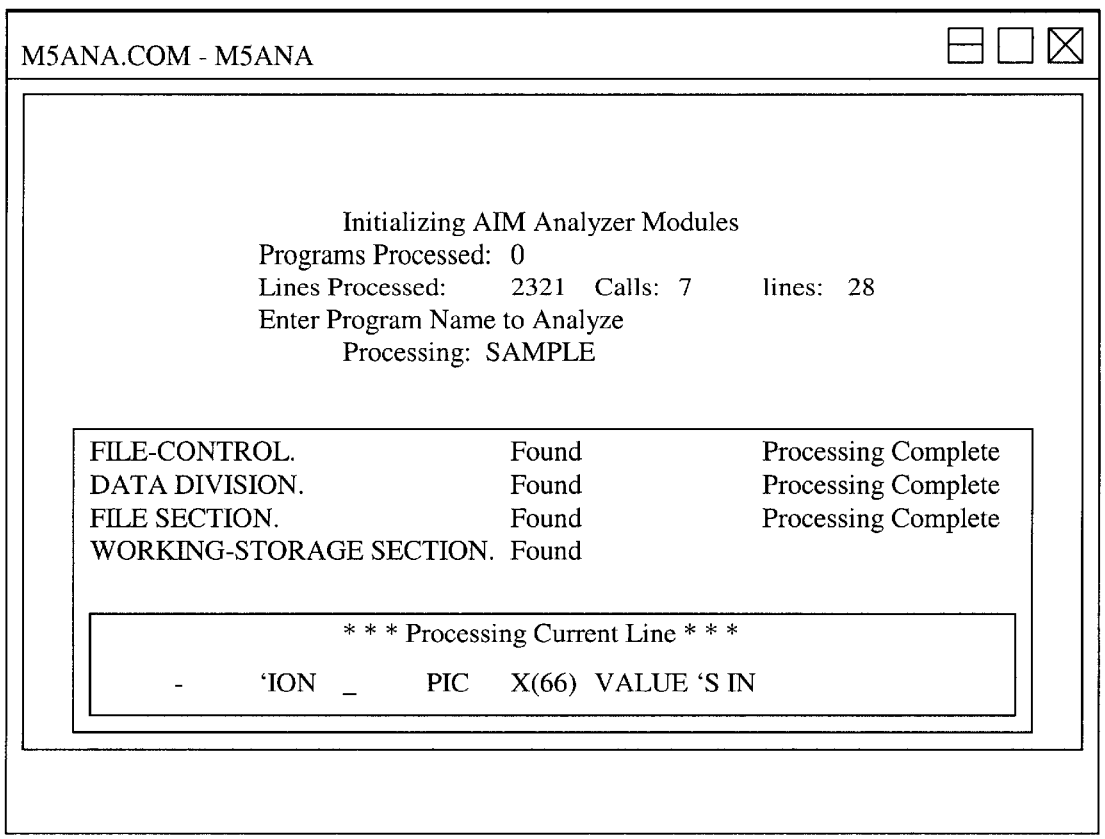
Figure 8H:
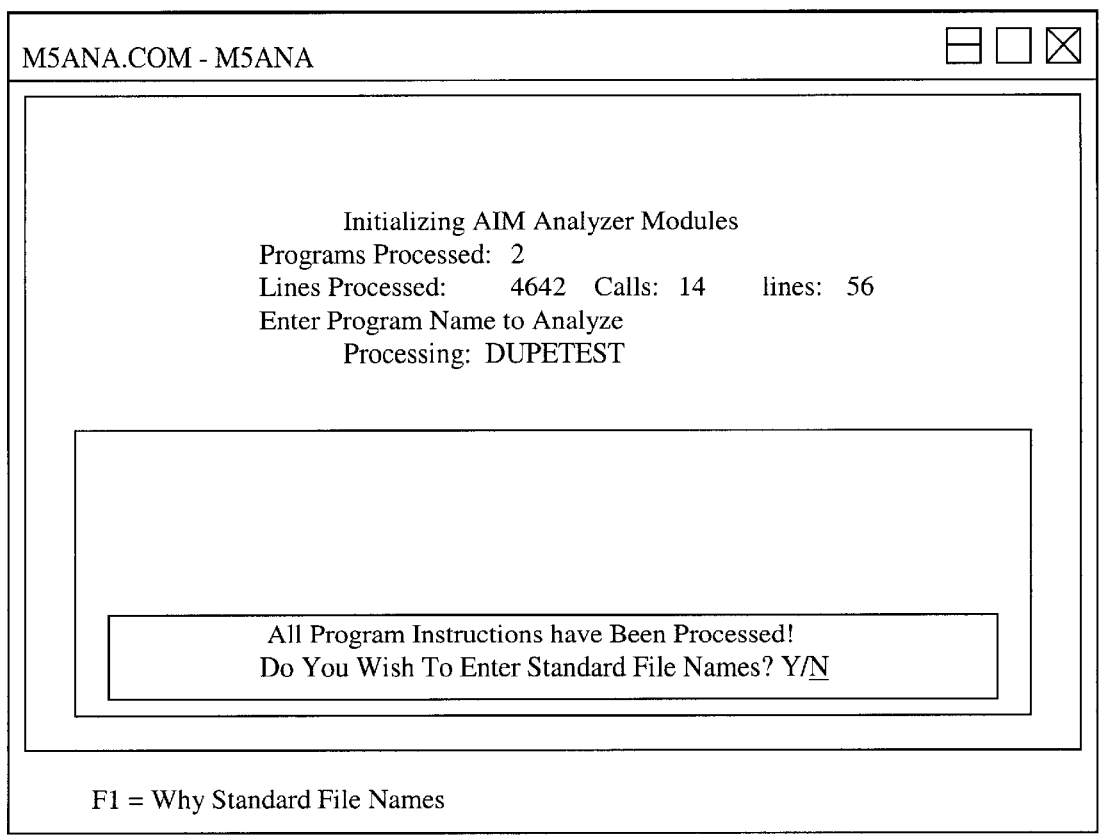
Figure 8I:
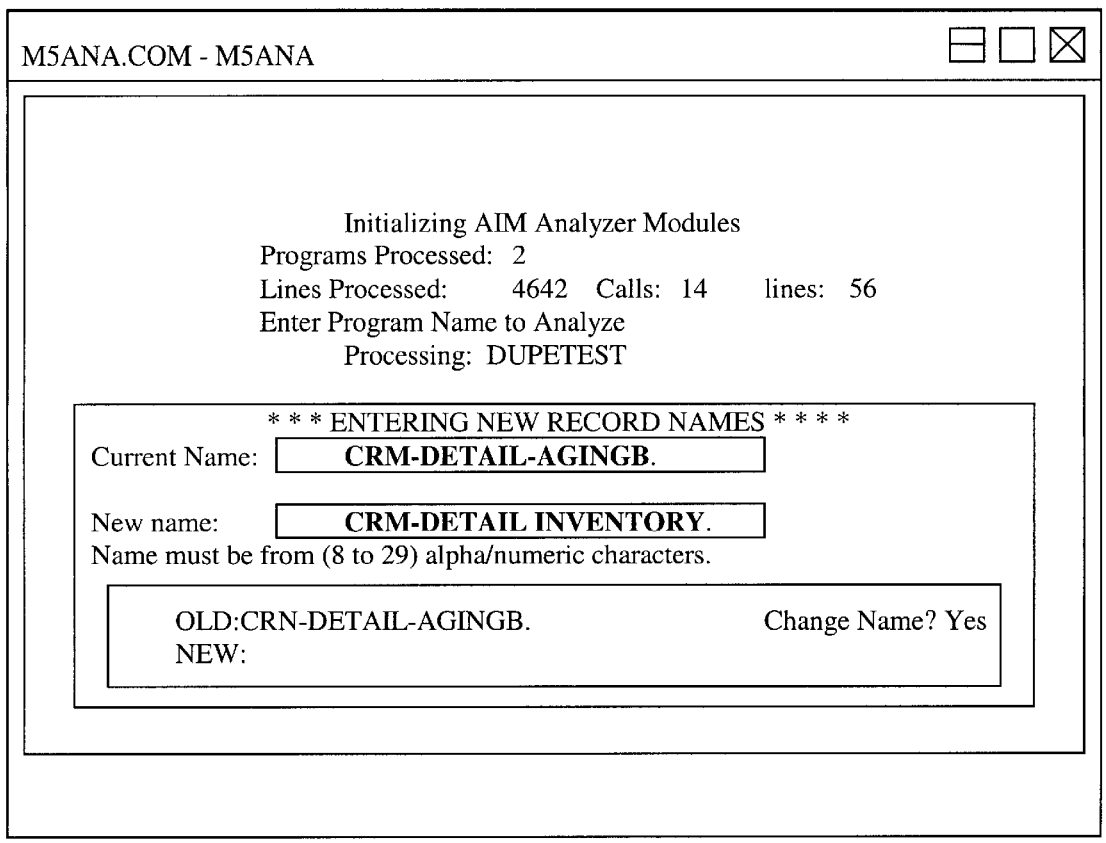
Figure 8J:
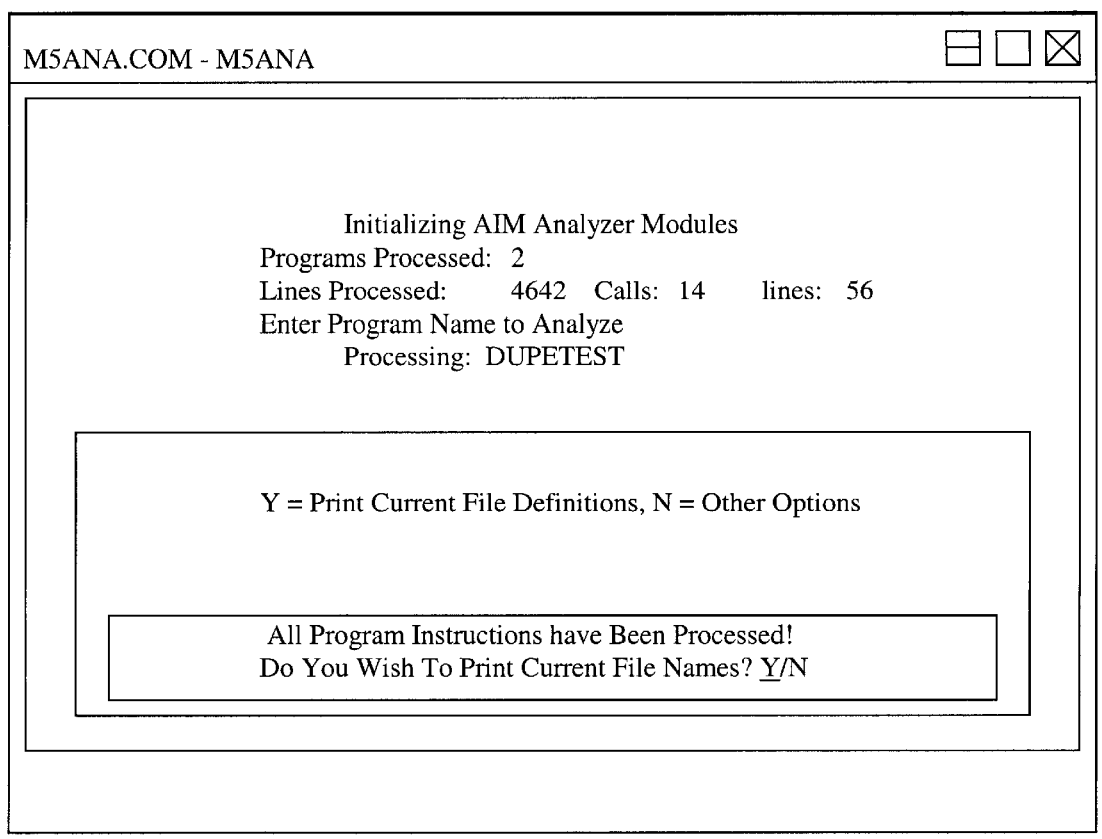
Figure 8K:
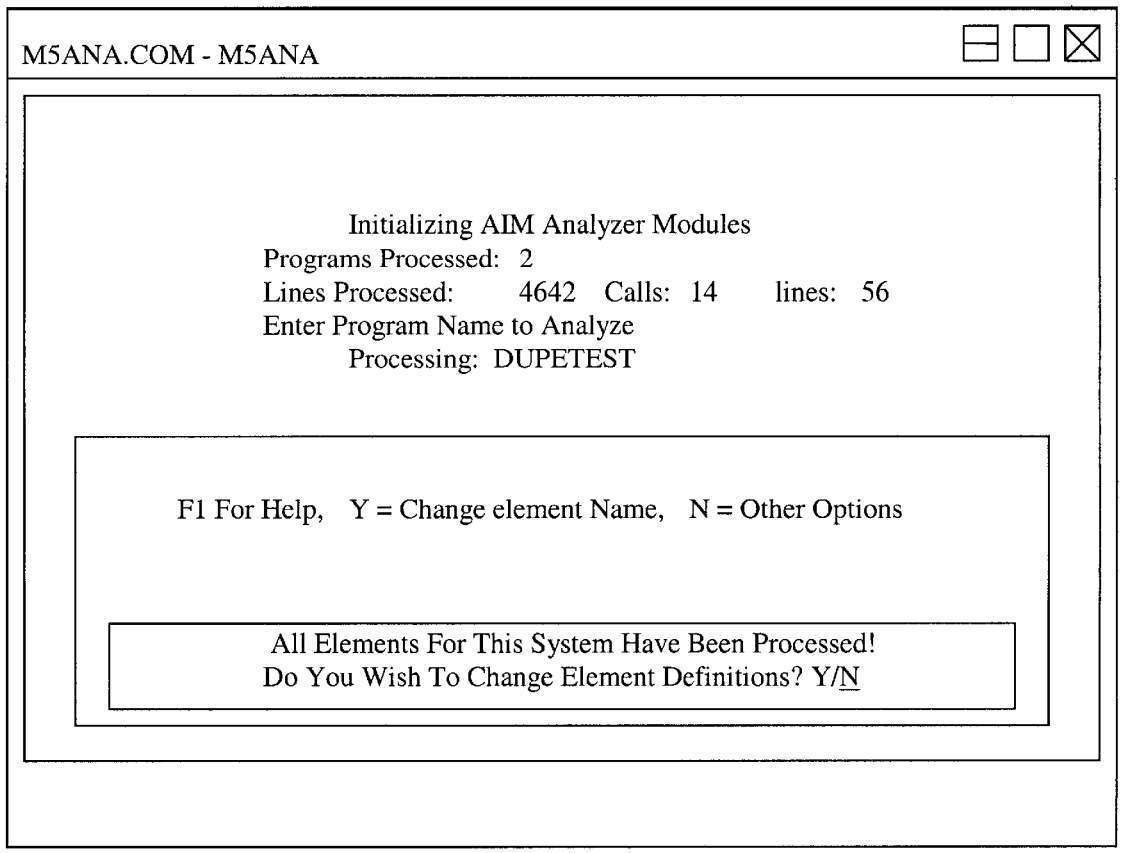
Figure 8L:
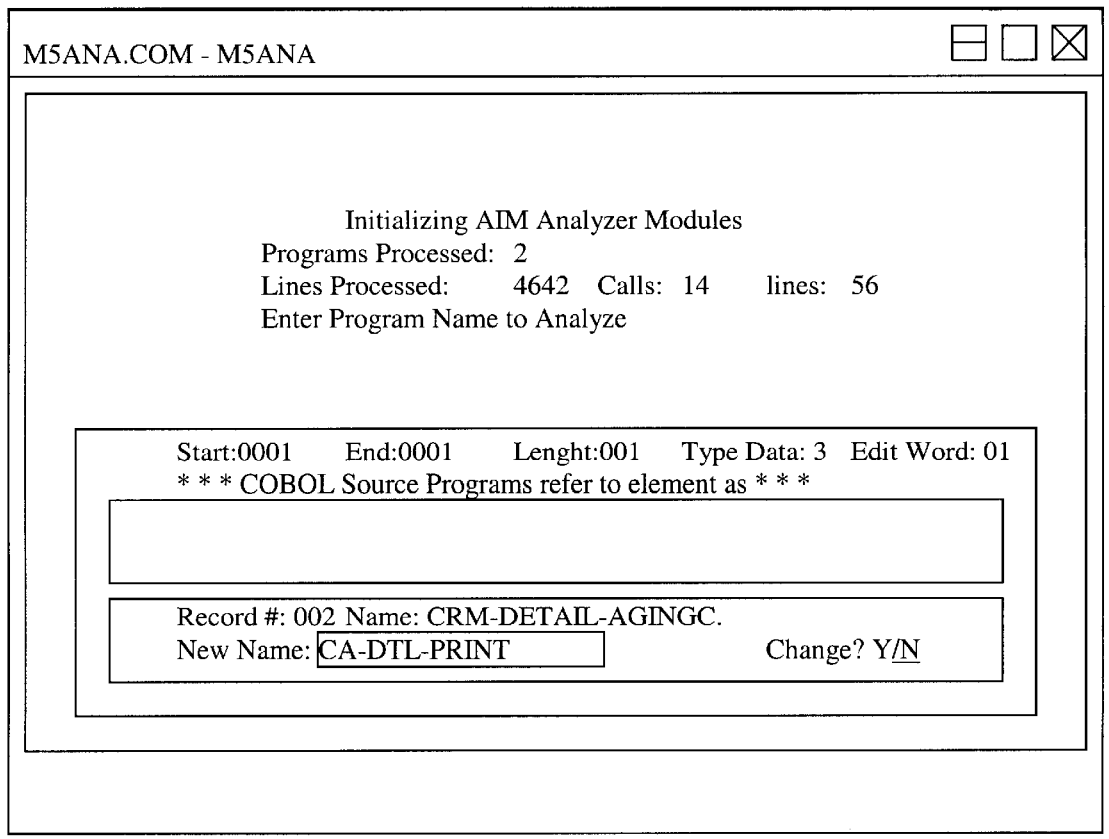
Figure 8M:
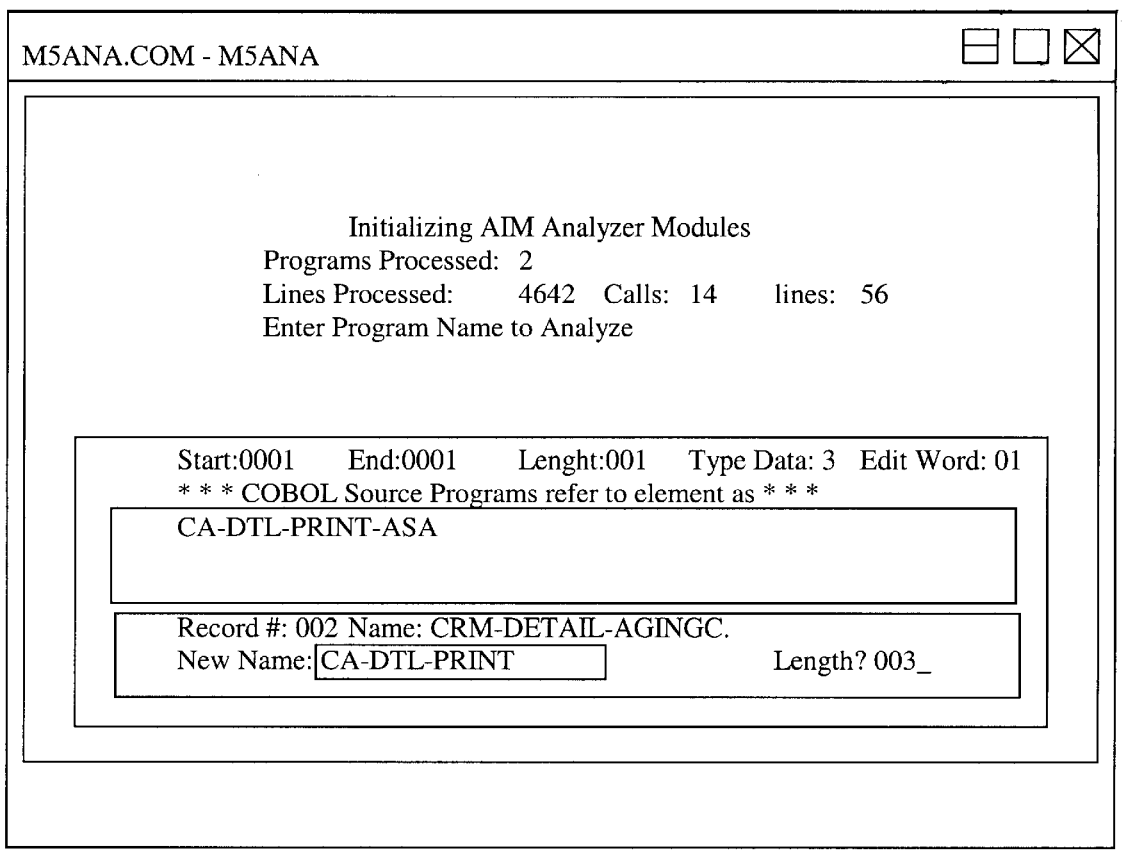
Figure 8N:
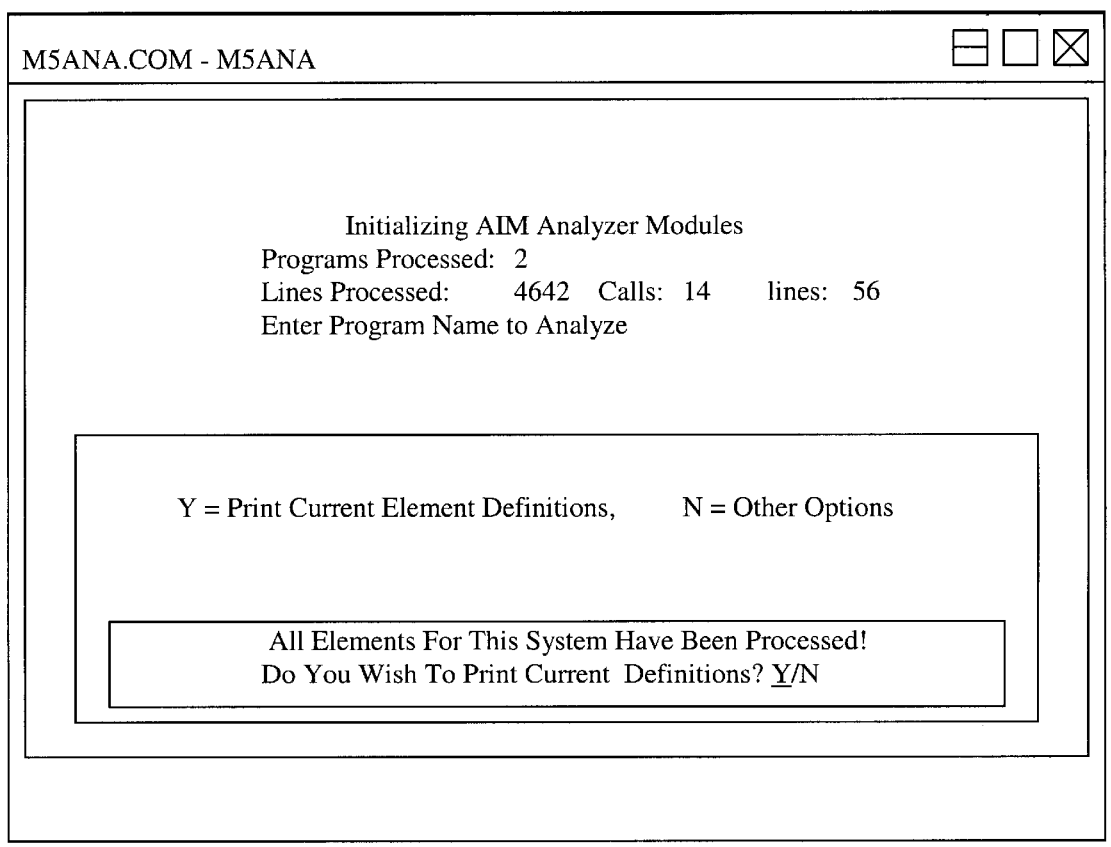
Figure 8O:
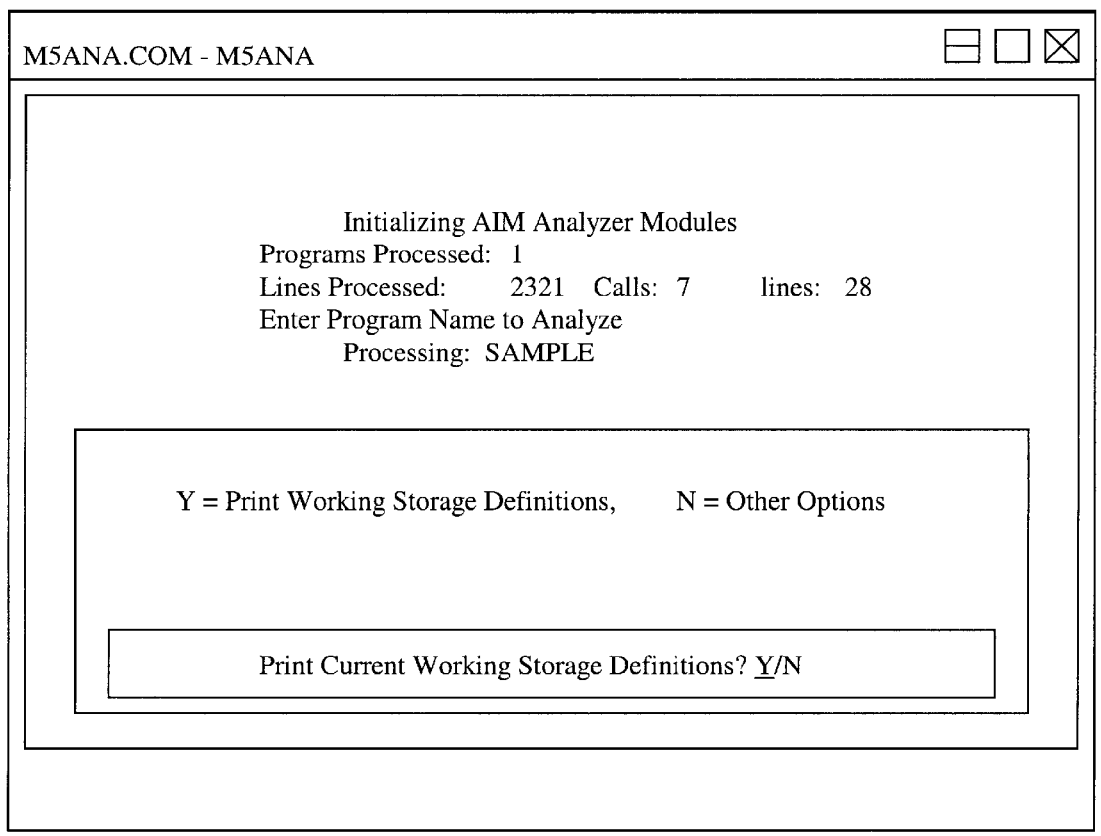
Figure 8P:
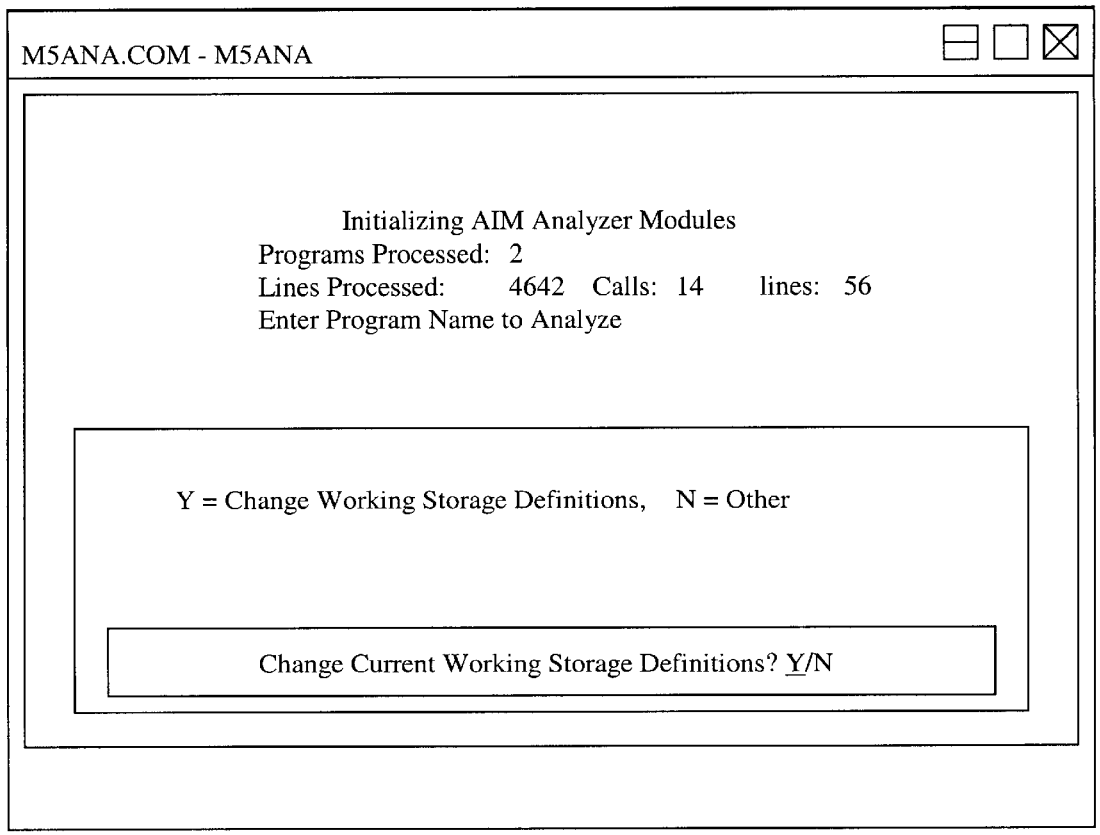
Figure 8Q:
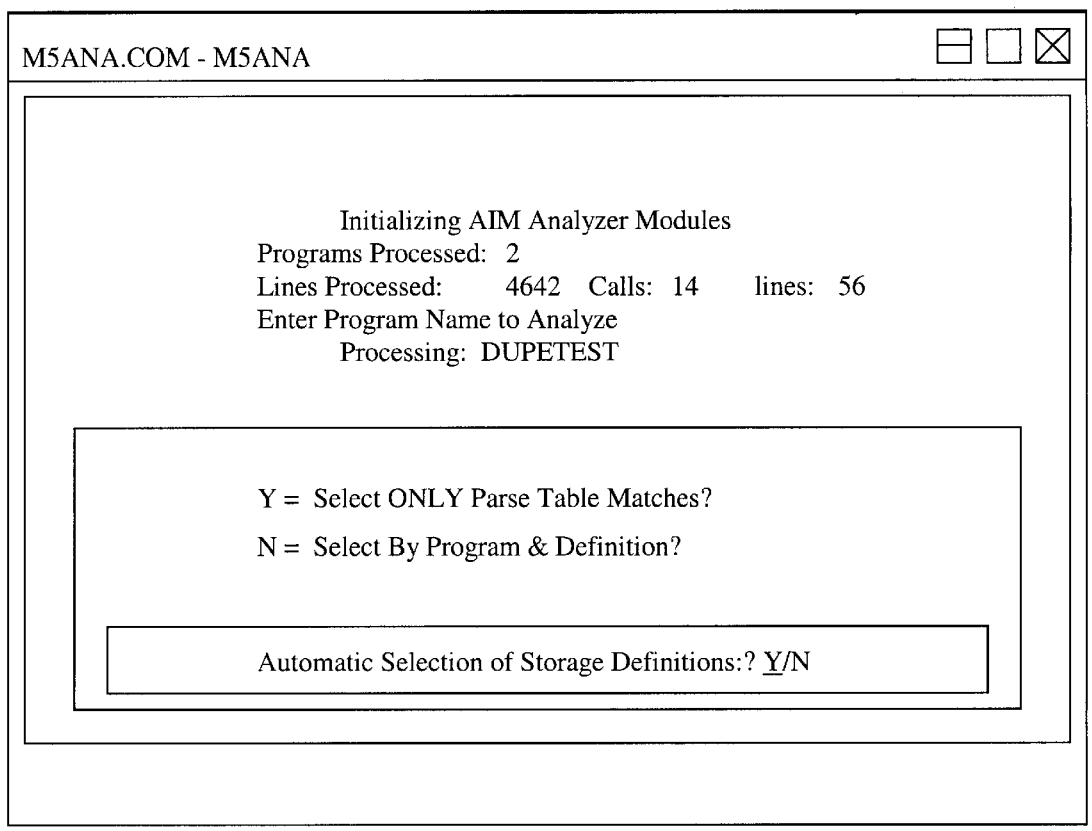
Figure 8R:
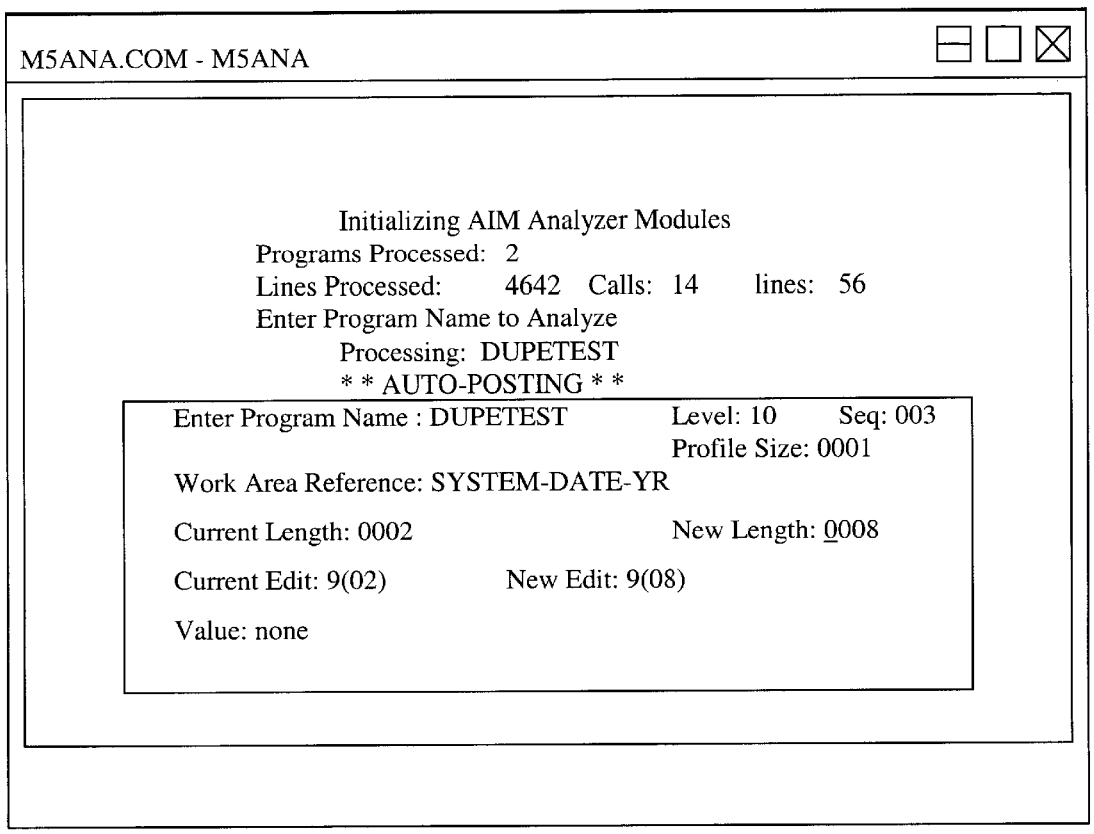
Figure 8S:
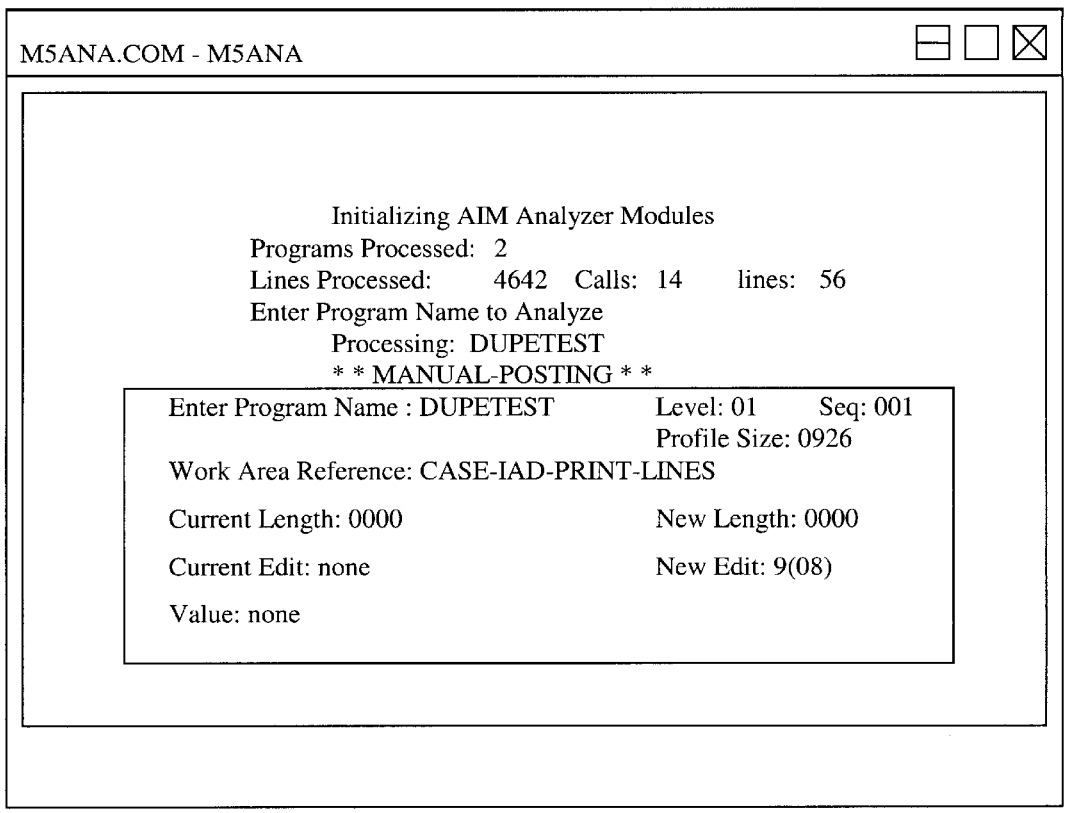
Figure 8T:
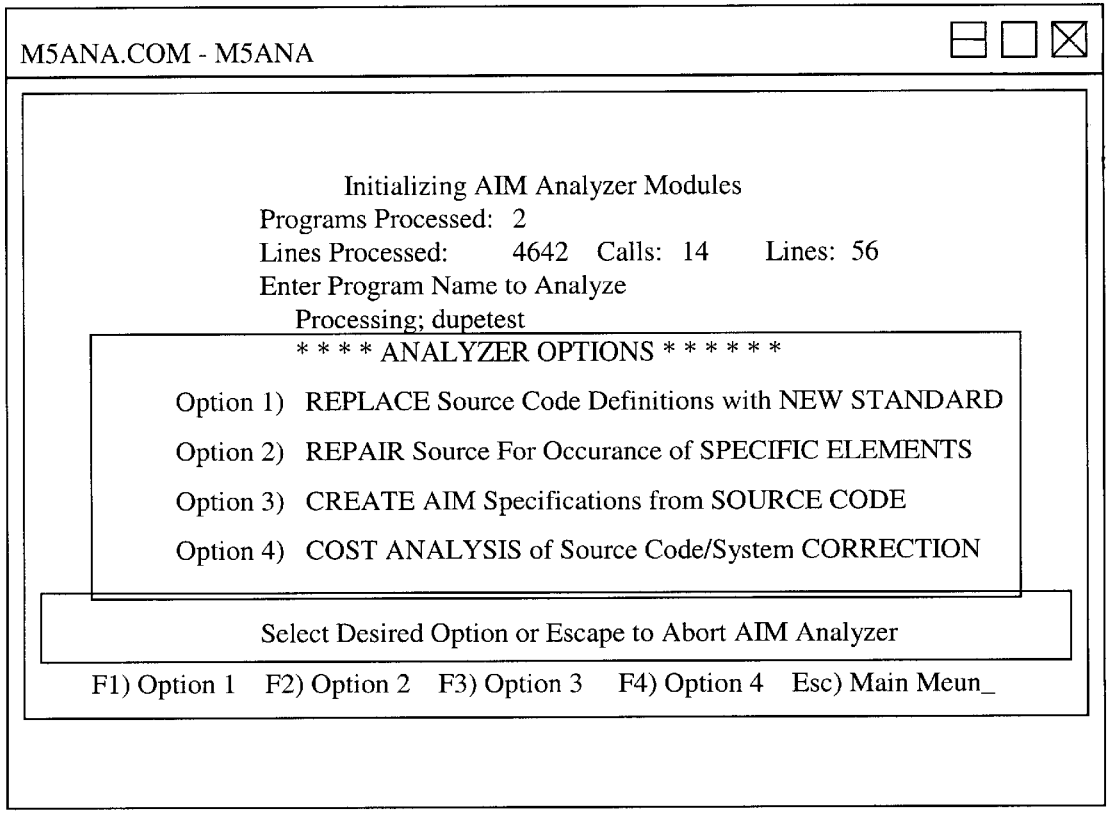
Figure 8U:
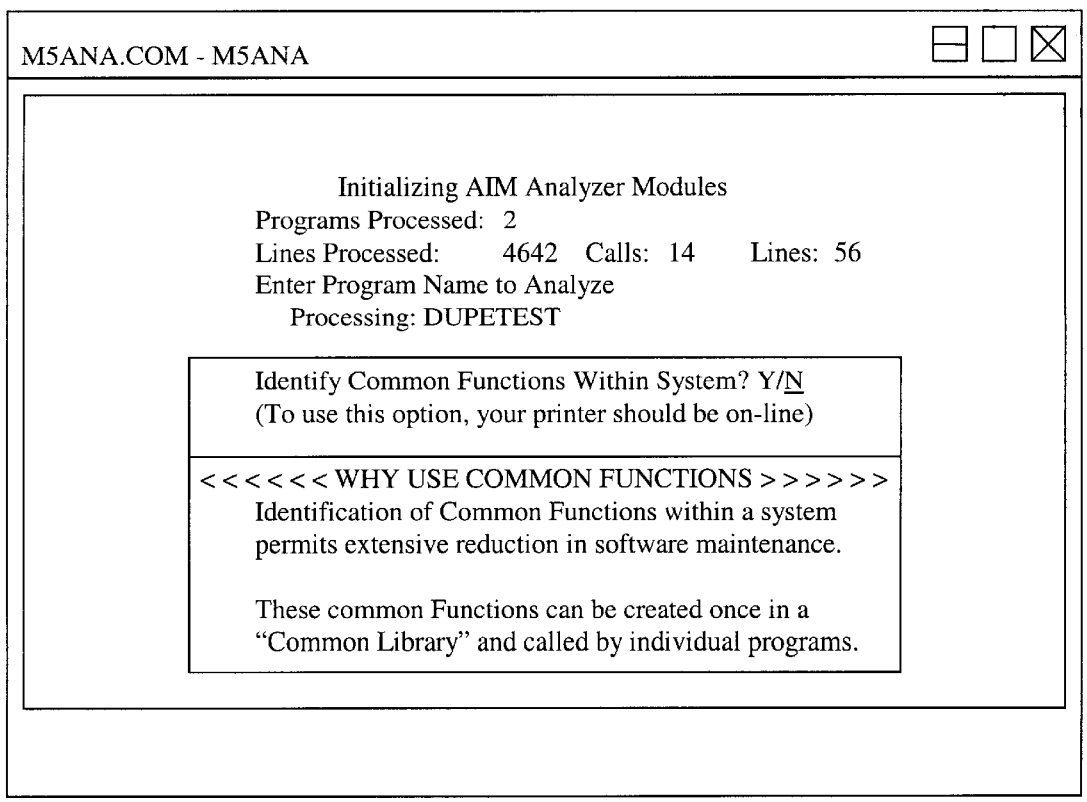
Figure 8V:
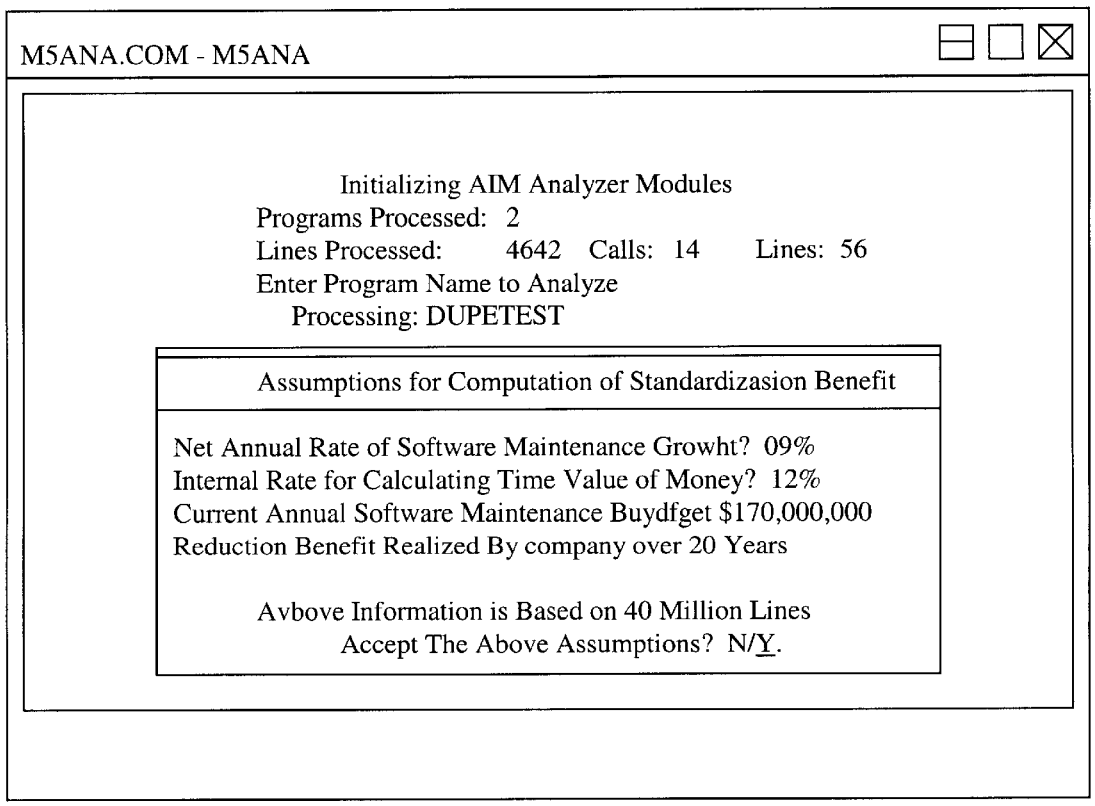
Figure 8W:
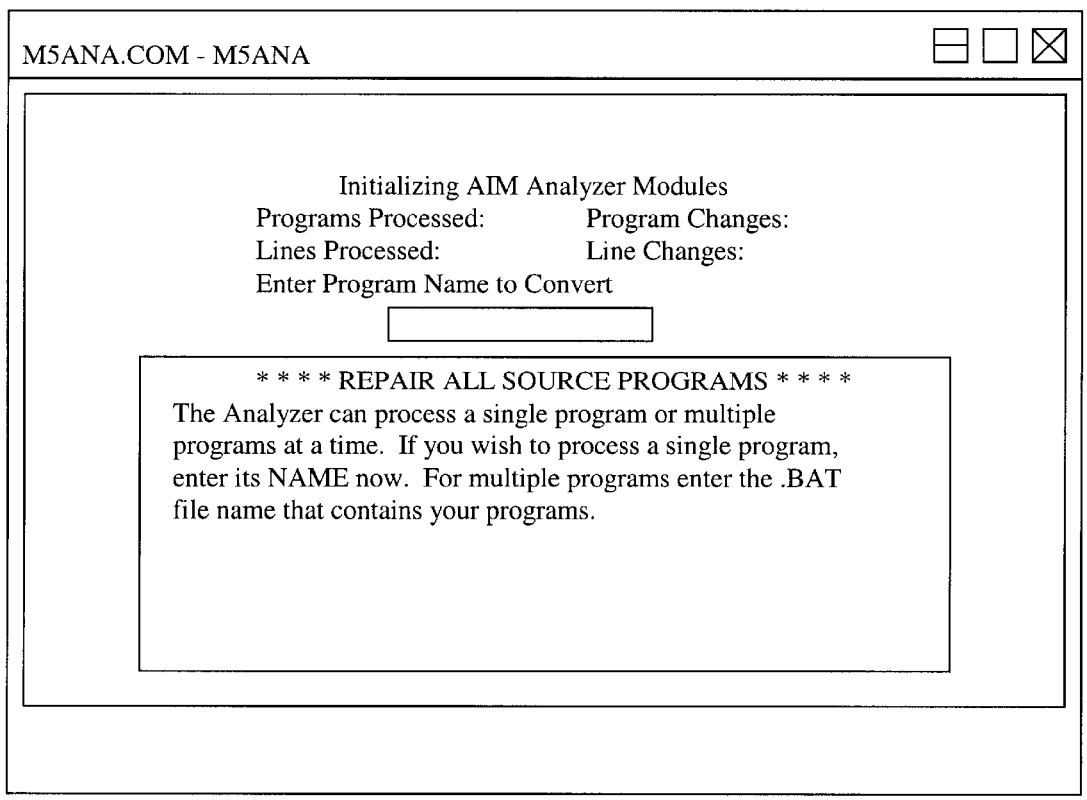
Figure 8X:
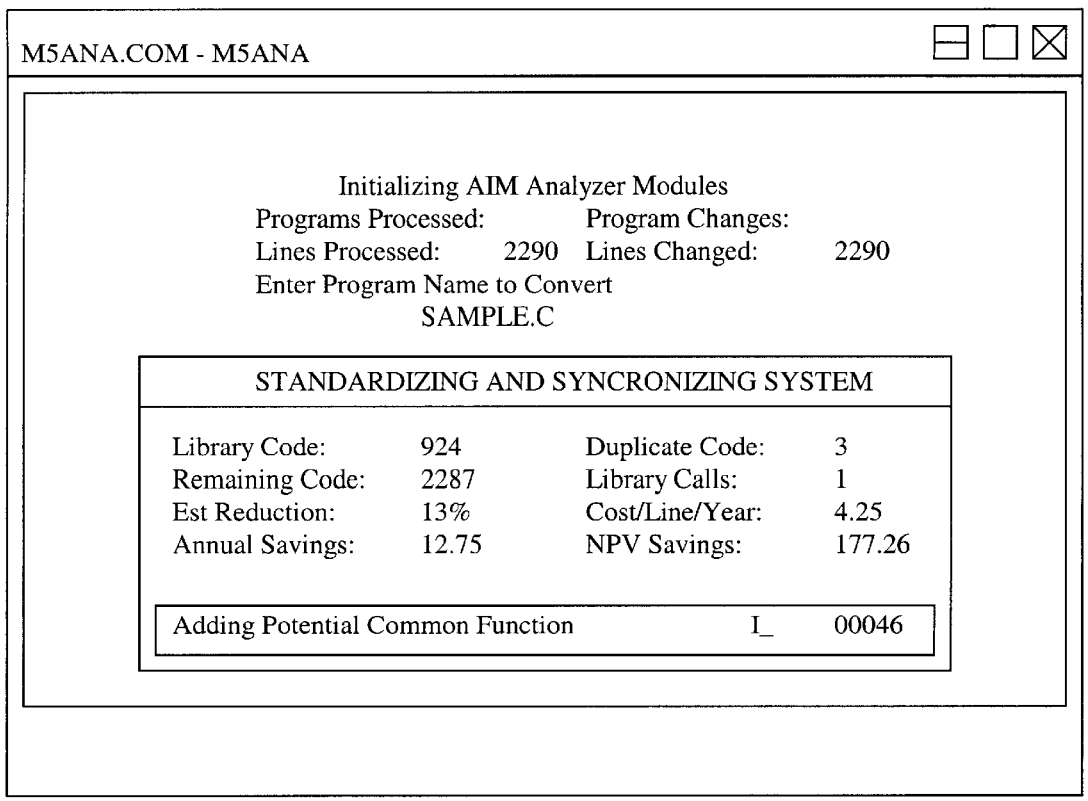
Figure 8Y:
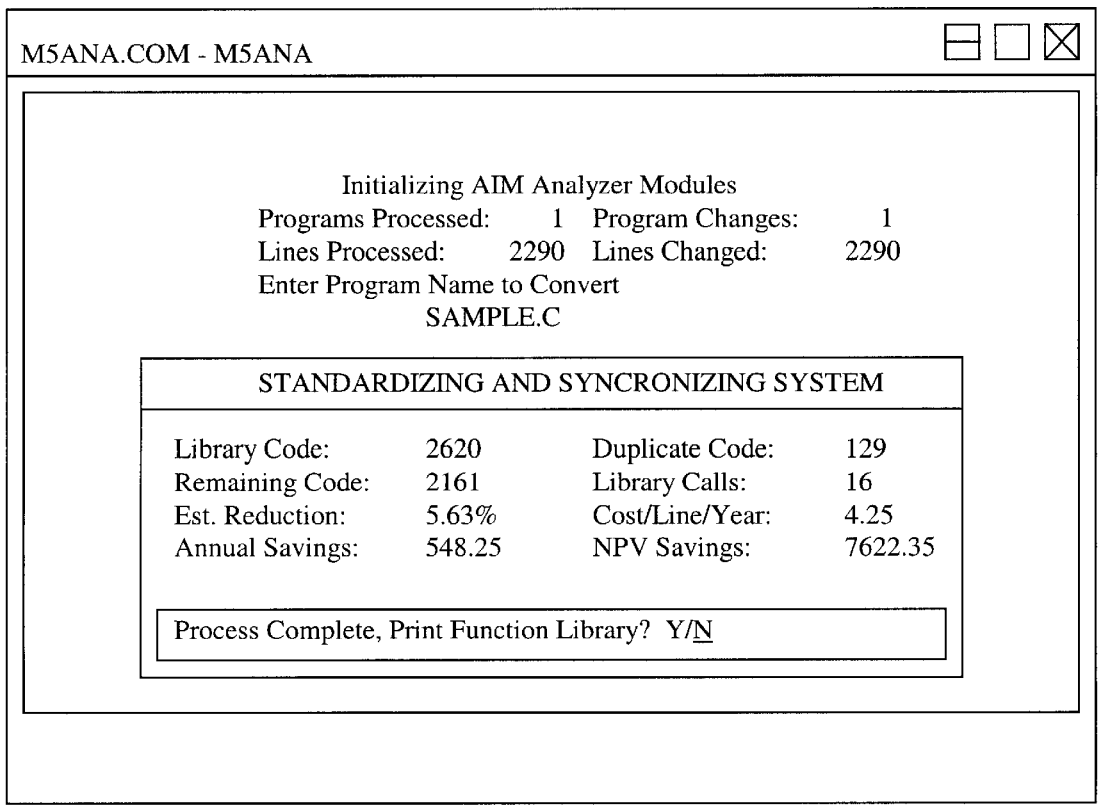
Figure 8Z:
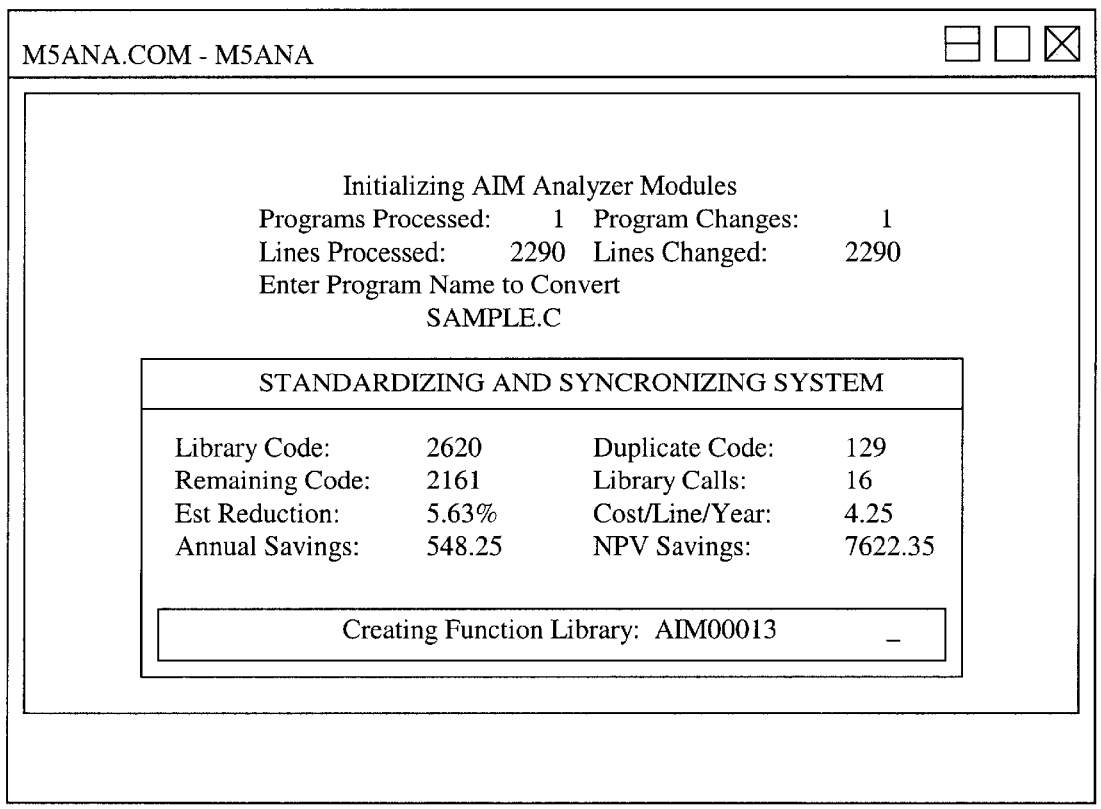

Having thus described the overview of the invention as set forth above, FIGS. 8A through 8Z illustrate by way of selective menus the operating sequence in more detail.

FIG. 8A shows the initial function screen presented to the user. The user is provided with three initial options. In Option (1), the user may select the Source Code Program analysis function. In Option (2), the user may select a review of current File and Element Definitions. In Option (3), the user may Convert, Scan or Repair Programs which have not previously been analyzed.

On selection of Option (1), the user is presented with the screen set forth in FIG. 8B and requested to enter Customer/Application Data in the form of a number (this number is an arbitrary 4 digit number the first two digits representing a customer number and the last two representing the number of the specific group of applications source code to be processed for that customer). The user is also prompted to select whether or not to add search information to a Parsing Table. This could be information regarding a name, or part of a name, or any other data which the system is to present to the user for an examination of its attributes. For example, the user could request the system to find every data element which contains in whole or in part the letters "DATE" and to store the same in the Element Cross Reference File. This would permit the user to examine the date length of each such field and to permit change from a six byte field to an eight byte field, if necessary to accommodate the year 2000. Alternatively, the user may let the system seek out and examine every data element for inclusion in the Element Cross Reference File automatically as described above. On selection of the Parsing Table addition option, the user is prompted by the screen of FIG. 8C to enter Parsing Arguments to be used during the scan process. In the example screen of FIG. 8D, the data element in the parse table is the term DATE-. The resulting Element Cross Reference File will contain every data field with the term DATE- in its name. If left blank every data field will be placed in the Data Element Cross Reference File. In addition, the letter A indicates that an Auto-Correct Parsing Type for the date is to take place although the option to cause the system to Pause on Match is also available (Parsing Type "P"). If the system Pauses on match, the User may manually make the correction, in this case a length correction, or continue. In the case of Auto-Correct as is indicated in FIG. 8D, the new length is mandatory and is automatically entered. In this case, the length is set to 08 characters, which accommodates the entry of years through the year 9999, which obviously, permits correction of the millennium problem of concern at the present time.

The user is then prompted by screen of FIG. 8E to enter either the name of a single program or a .BAT file or batch file containing the names of multiple related programs for processing by the system. On selection of the program or the programs, Phase I as described above commences and the user is continually advised of the status of the program by a status screen as shown in FIG. 8F. The status screen, includes information which identifies the current program being processed and shows the historical data being collected by the system such as Programs Processed, Lines Processed, the number of Calls established and the number of lines called. FIG. 8G shows the same processing screen at an intermediate stage of processing and identifies the various sections of the program being processed. Some of these include FILE-CONTROL, DATA DIVISION, FILE SECTION AND WORKING-STORAGE SECTION.

In FIG. 8H, the user is given the option to Enter Standard File Names.

The help function under F1 advises the user that Standard File Names are important because the source code allows logical referencing of any file by any name. Therefore, the same file may be accessed in different programs in the same group by different logical names. This step permits the correction of the name to a uniform name in a manner similar to that provided for in data element names which eliminates confusion where maintenance is required.

On an affirmative selection the user is provided with a data entry screen 8I to select a new name. In the current example, the name CRM-DETAIL-AGINGB has been changed to BWS-DETAIL-INVENTORY. It may be that the logical file name CRM-DETAIL-AGINGB is actually an inventory file with inventory age information. The change helps avoid the misconception by maintenance programmers that it is related to accounts receivable.

After selection of the logical file names, the system scans the source code files and restructures each instruction into a standard syntax and stores the restructured interim source code in virtual memory. (steps 201 and 202 of FIG. 3.)

FIG. 8J illustrates the screen provided to the user on completion of the system analysis to prompt for the option to select Y or N as an option for printing the Element Where Used Report (step 108 of FIG. 2B) after change of the various names and elements.

On selection of the printing of the Element Where Used Report, the system prompts the user for a Change Element Definitions selection, FIG. 8K. A help screen is provided defining Element Definitions for the user. These consist as noted above of Name, length, and Type and in the case of workspace allocations, Format.

In this example, the user has been shown a data element "CA-DTL-PRINT-ASA" in the highlighted portion of the screen as shown in FIG. 8L. This data element name was found in file CRM-DETAIL-AGINGC. The user is prompted to indicate whether change of the name is desired or not. In this example, N for no was selected. In FIG. 8M, the screen shows that the name has been changed to CA-DTL-PRINT and the user is prompted for a length change of the same element. In this example, when the new name is entered, and the length is entered, the system then processes the changes and prompts the user for a print of the Where Used Report for the current Definitions, FIG. 8N. This is confirmed by the screen shown in FIG. 8N and the user is prompted again for a print of current definitions, i.e. an updated Where Used Report.

FIG. 8O, prompts the user for a selection of printout of working storage definitions. This is essentially another Where Used Report of working storage allocations and definitions. These include an identification of all of the common work areas according to physical size and value (i.e., profile). The user may decide to change or redefine any data definition and/or change the value and physical size of a specific work area. The report permits the user to evaluate what changes are required. On an affirmative selection, a Working Storage Definitions report is printed.

The user is then prompted to select whether a change in the working storage definitions is required, FIG. 8P. On an affirmative selection, the user is given the option to select only Parsing Table matches (ie., automatic changes on match) or by Program & Definition (manually step by step), FIG. 8Q. On an affirmative selection, the system automatically selects storage definitions. The progress of changes is monitored in the screen of FIG. 8R which shows a new Length, 0008, and a new Edit, in this case 9(08). (In COBOL PL1 the 9 is a field type code, i.e., "numeric" for a numeric field length of 08 bytes. The system automatically changes all definitions which occupy the same physical location.

If the user selects the negative, the system will provide a prompt for each definition where the user enters Program and Definition information which requires the user to enter the change information during the run. FIG. 8S illustrates the user screen with new length information entered and new edit information awaiting entry.

On completion of all Phase II changes, the user is prompted for additional options as shown in FIG. 8T. These are:
1. REPLACE Source Code Definitions with NEW STANDARD
2. REPAIR Source For Occurrence of SPECIFIC ELEMENTS
3. CREATE the system Specifications from SOURCE CODE
4. COST ANALYSIS of Source Code/System CORRECTION The user may escape to the main menu FIG. 8A or continue with one of the above options of FIG. 8T. At this point in the example, The source code has been processed through Phase I and Phase II. On selection of Option 1, the system enters Phase III and the user is prompted by the screen in FIG. 8U as to whether or not common functions are to be identified. The user is then presented with the screen of FIG. 8V to display the standardization default parameter used to calculate the benefit derived from the Optimization process. The screen of 8V allows the user to modify the default assumptions, before computation of the benefit. On an affirmative selection, the user is presented with the screen of FIG. 8W to indicate which programs are to be repaired and Phase III, Phase IV and Phase V are completed. The user is presented a status screen as shown in FIG. 8X which shows the system adding the common functions as described in the overview above. FIG. 8Y displays to the user that the common function building process is completed and provides the user an option to print the completed library. The user is advised by the screen of FIG. 8Z that the system is creating the function library. That is, saving all common functions to the system library.

Figure 19:
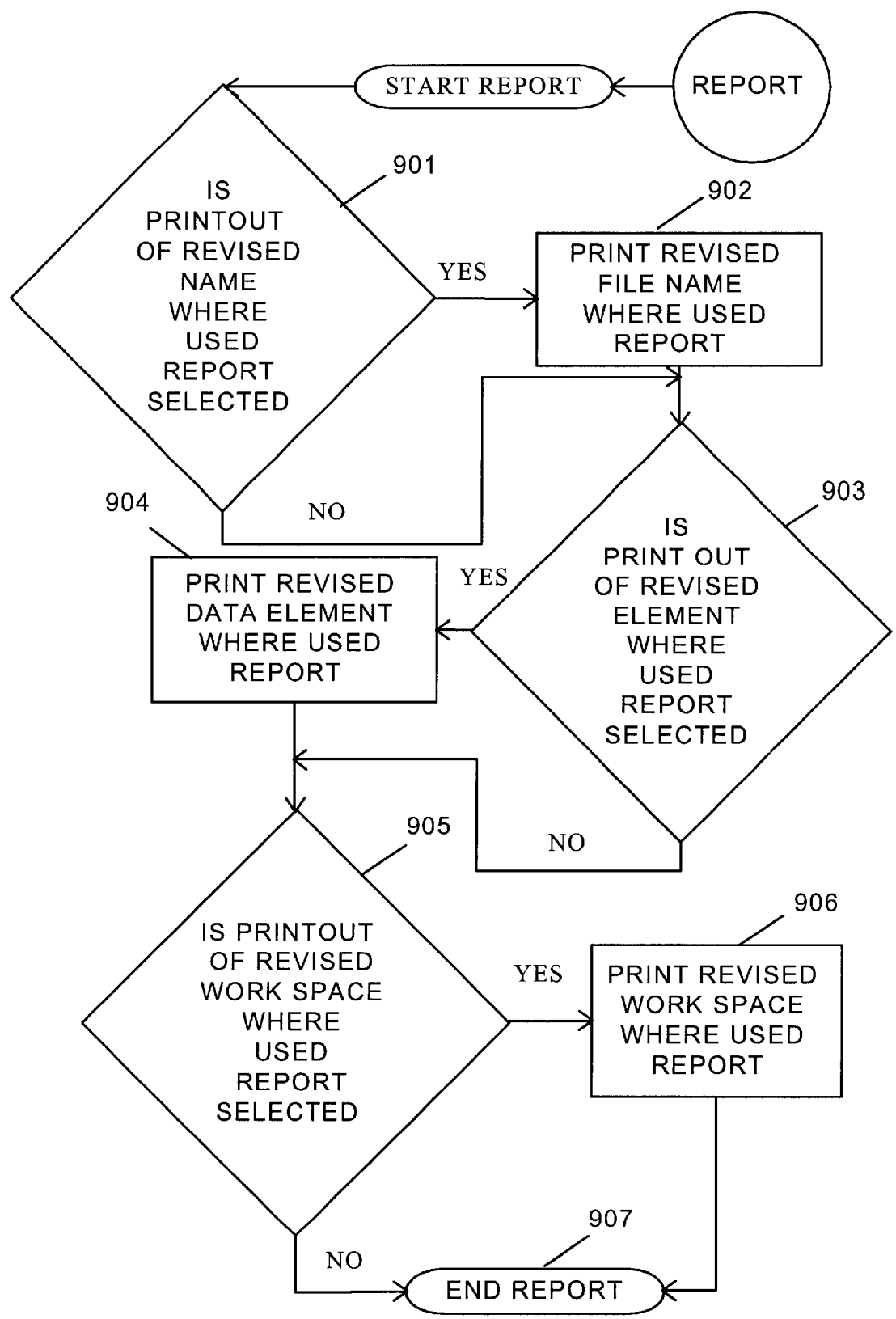
FIG. 19 is a flow chart of the print report option.

Other options are available as indicated in FIG. 8A these include a Review of Current File and Element Definitions (Option 2) which is essentially a printout of the various Where Used Report information as shown in FIG. 19.

In addition, in Option 3, a Convert, Scan or Repair Programs Analyzed Option is available. That is without entering the Analyzer process (Phase I through V) described above the user may directly access the program code in any of the program files and perform certain changes. Selection of this option places the user at the screen of FIG. 8T.

Figure 9A:
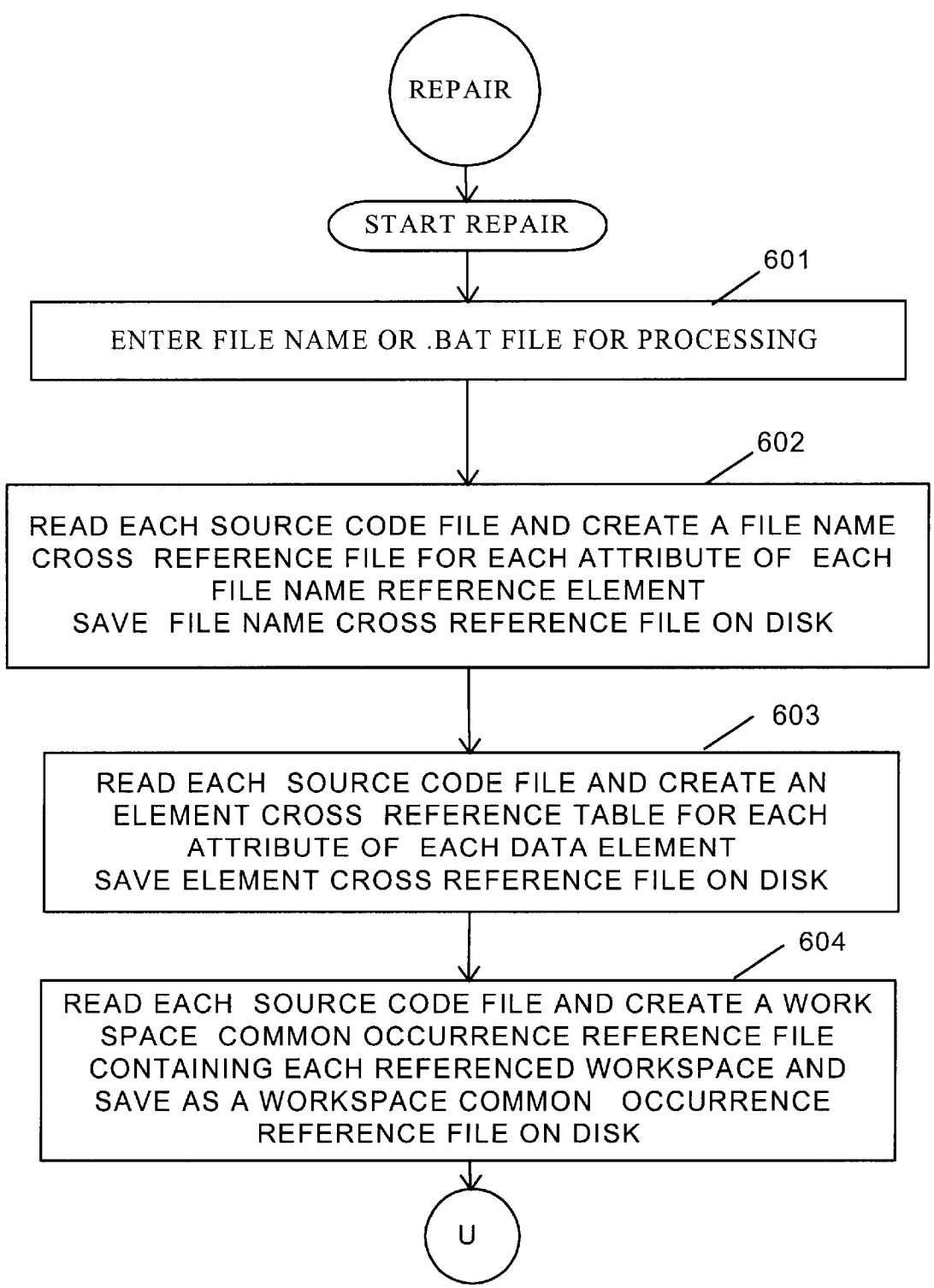
Figure 9B:
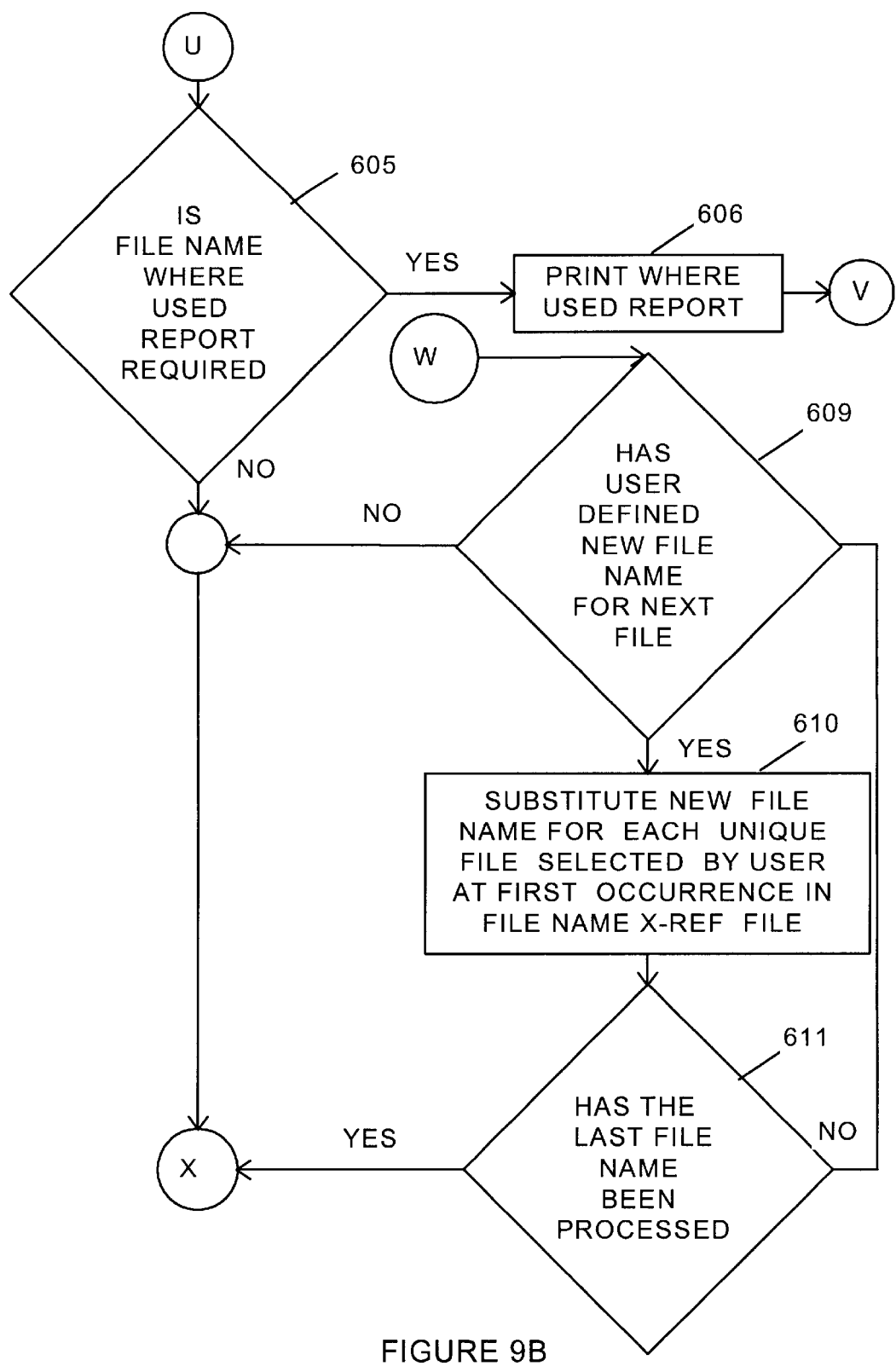

With reference to FIG. 9A, the user may initiate a Repair Option, step 600 by selecting Option 3 of the screen of FIG. 8A and commencing the Repair Function as shown in FIG. 9A. The user enters the file name or .BAT file containing all of the program files which are to be repaired, step 601, and the system commences reading the interim source code files, steps 600–604. Referring to FIG. 9B, the system reads the source code files and determines the logical file name used to access each file and creates a File Name Cross Reference File of logical names and related physical file names, step 602. The File Name Cross Reference File is stored on disk, step 602.

Each instruction in each source code file or module is again read from the interim source code files and its type determined. Those instructions which operate on a data element are analyzed and the data element identified. The name and other attributes of the data element are determined and an Element Cross Reference File containing each data element by name and its associated attributes is created, step 603. The Element Cross Reference File is stored on disk as in automatic processing:

Each instruction in each source code file or module is again read from the interim source code file and its type determined. Those instructions, which define work space allocations are analyzed and the work space identified. The workspace is analyzed by structure and a Work Space Common Occurrence File for workspace definitions is created, step 110. The Work Space Common Occurrence File contains the same information as in automatic processing.

The system provides for interactive communication with a user, who may indicate that a Where Used Report is or is not to be generated.

With reference to FIG. 9B, a File Where Used Report for logical file names, may be selected for display or print by the user. A File Where Used Report is a report of the contents of the File Name Cross Reference File with information sorted by physical location. This permits the user to evaluate which of the various logical file name references refer to the same physical file. If the user indicates that such a report is required, step 610, the system prints out a report, step 611. The user may then examine the report and define new logical names for selected physical files. On review of the File Name Where Used Report the user may enter search information in a Parse Table, FIG. 9C. If such information is entered, step 612, the system searches for files matching the Parse Table, step 613. The system does not search for files by name for those files which are not selected by the Parse Table. If the user defines a new logical name, step 614, the new name is substituted for the first occurrence of each unique file in the File Name Cross Reference File, step 615. Uniqueness is determined by the actual name of the file referred to by the logical file name. Multiple unique logical file names may be selected by the user for change and the user is given the opportunity to change the next physical file name step 616. On processing the last file name, the system goes to the next stage, step 616.

Figure 9D:
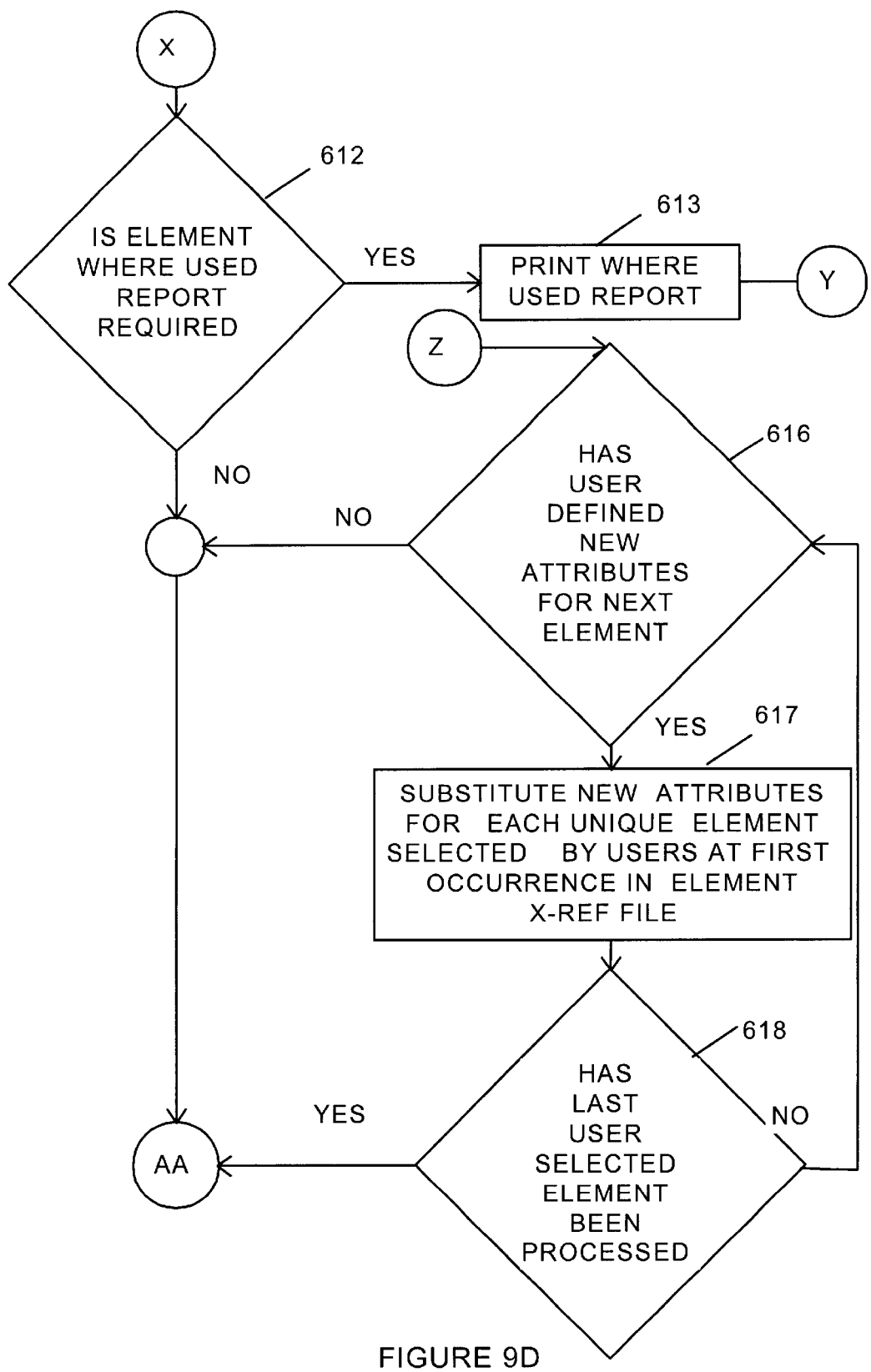
Figure 9E:
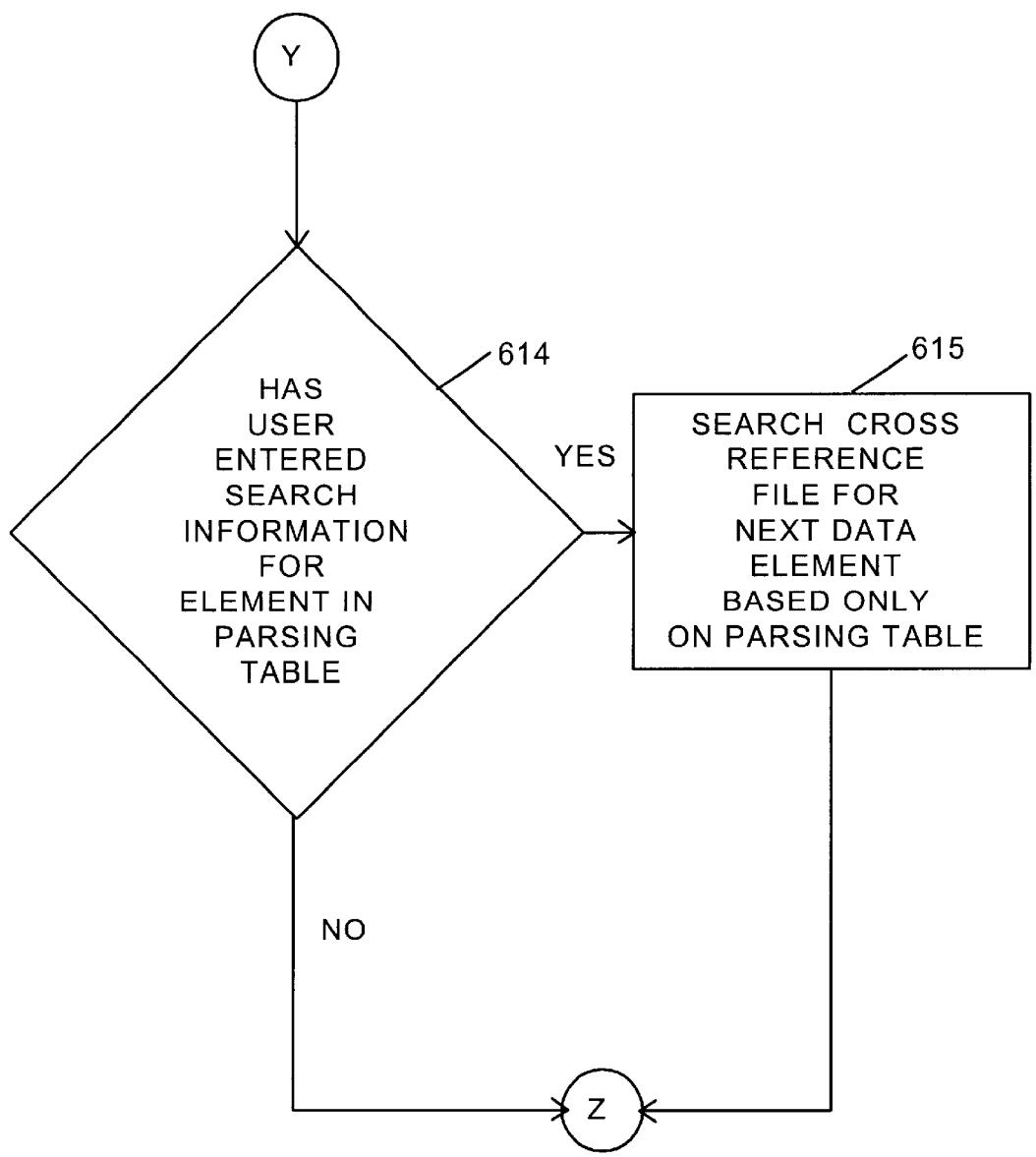

An Element Where Used Report, FIG. 9D, may be selected for print by the user, step 612. An Element Where Used Report is a report of the contents of the Element Cross Reference File with information sorted by physical location. This permits the user to evaluate which of the various data elements are stored in the same physical location. If the user indicates that such a report is required, the system prints out a report, step 613. The user may then examine the report and define new attributes for selected variables. On review of the Element Where Used Report the user may enter search information in Parse Table, step 614, as shown in FIG. 9E. If such information is entered, the system searches the Element Cross Reference File for the data elements which match the Parse Table, step 615. The system does not search for any data elements for which no selection was made by the user. These element definitions may be a change by the name, type or length or any other attribute of the data element. In the case of a six byte date, for example, the user may wish to change the length to eight bytes in order to accommodate a four byte year such as the year 2000. If the user defines a new name or new attributes, step 621, the new data is substituted for the first occurrence of each unique data element in the Element Cross Reference File, step 622. Uniqueness is determined by the physical location of the data element in the virtual memory. Multiple unique data elements may be selected by the user for change and the user is given the opportunity to change the next element name or attributes, step 623. On processing the last file name, the system goes to the next stage, step 623.

Figure 9F:
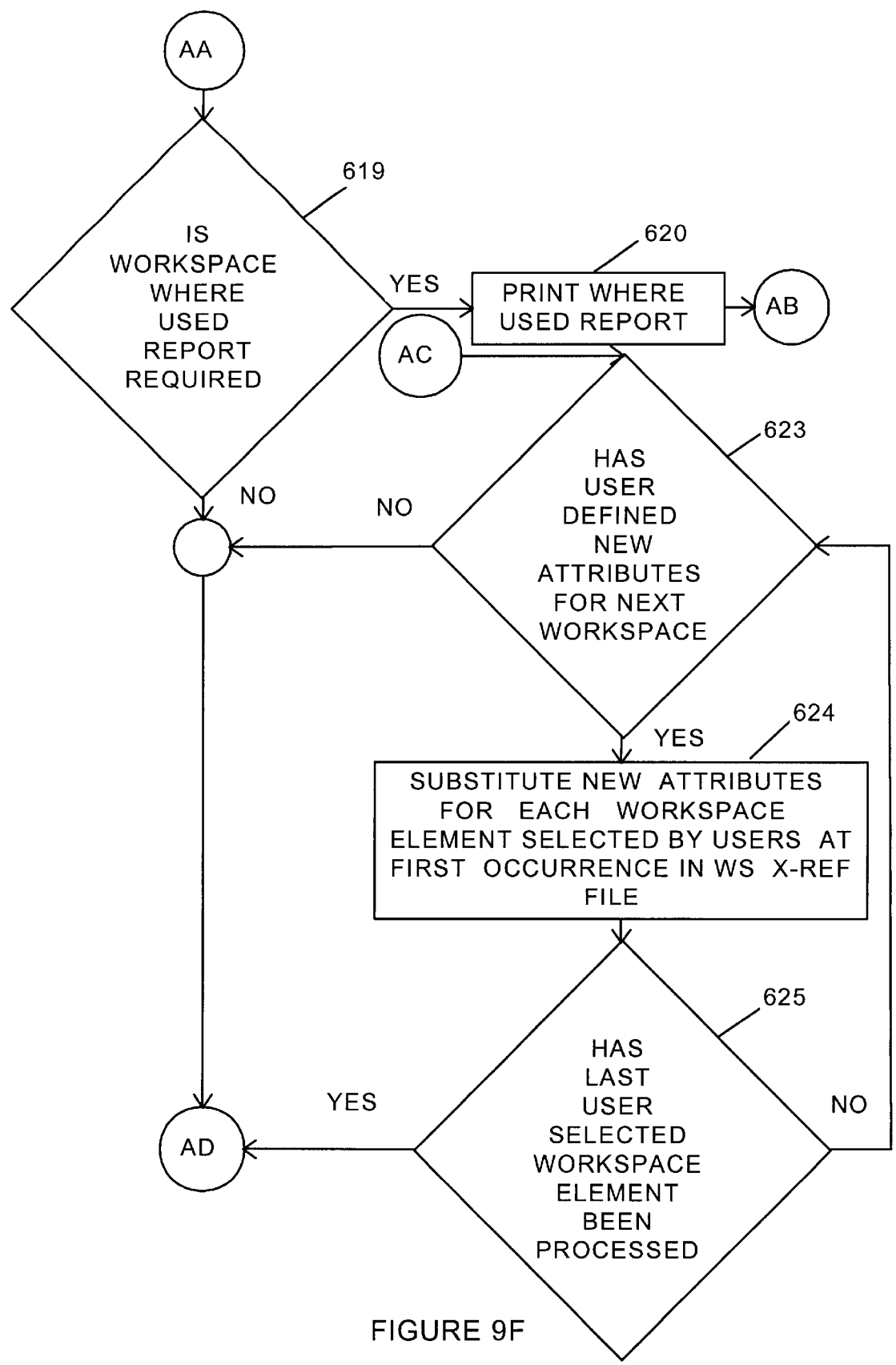

As shown in FIG. 9F, a Work Space Where Used Report for work space information, may be selected for display or print by the user, step 624. A Work Space Where Used Report is a report of the contents of the Work Space Common Occurrence File with information sorted by physical location. This permits the user to evaluate which of the various work space allocation parameters require change. For example, if a data element size is changed, the corresponding size of a work space may also require change.

Figure 9G:
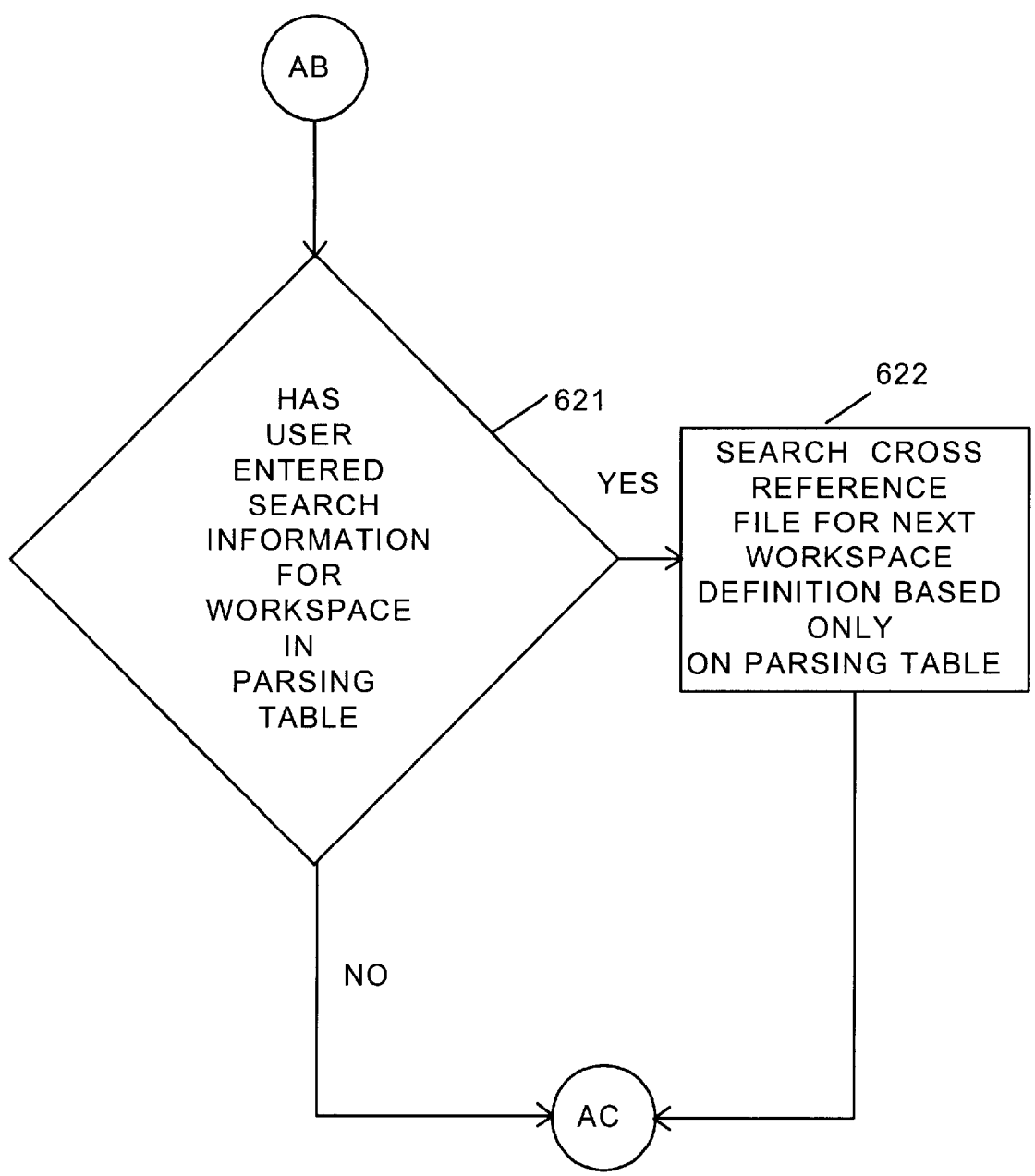

If the user indicates that such a report is required, step 624, the system prints out a report, step 625. The user may then examine the report and define new attributes for selected workspace parameters. On review of the Work Space Where Used Report the user may enter search information in a Parse Table, step 626, as shown in FIG. 9G. If such information is entered, the system searches the Work Space Common Occurrence file for common work spaces which match the Parse Table, step 627. The system does not search for any other Common workspace definitions for any workspace allocations for which no selection was made by the user. The essential difference between searches is that work space is searched by its profile file by names and elements by name or attribute. These new definitions may be a change in the format, type or length or any other attribute of the workspace parameters. If the user defines a new name or new attributes, step 627, the new data is substituted for the first occurrence of each unique work space in the Work Space Common Occurrence File, step 628. Uniqueness is determined by the form of the workspace allocation. Multiple unique workspace definitions may be selected by the user for change and the user is given the opportunity to change the next work space definition, step 629. On processing the last work space definition, the system goes to the next stage, step 629.

Figure 9H:
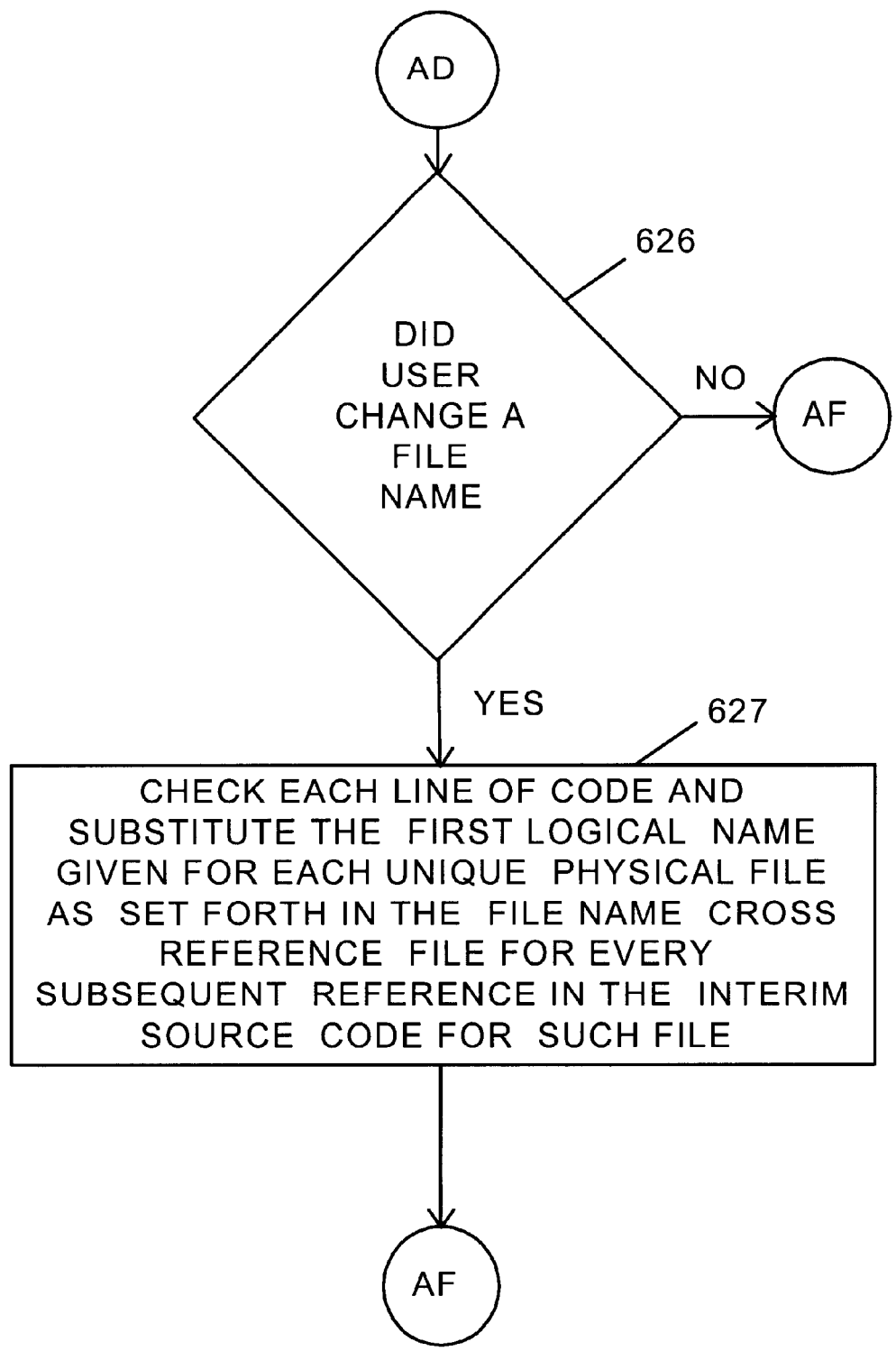
Figure 91:
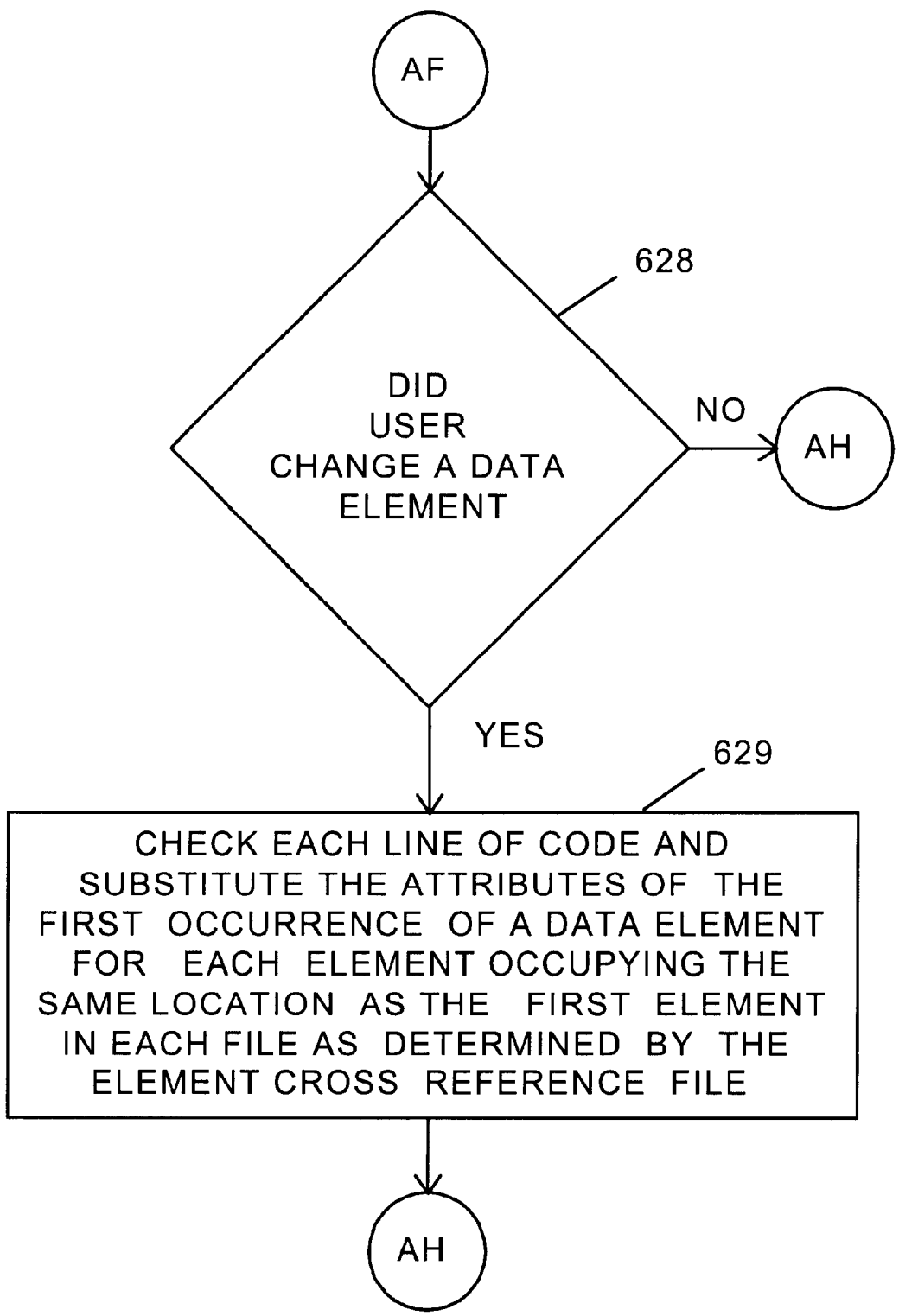

Referring to FIG. 9H, if the user changed a File Name, step 630, the interim source code is checked and each logical file name is compared with the File Name Cross Reference File. Each reference to the same physical file name is changed to the logical name of the first occurrence of the logical file name associated with the same physical file as set forth in the File Name Cross Reference File, step 631, as determined by the system or selected by the user.

If a data element was changed, step 632, the interim source code is again checked and each data element name is compared with the Element Cross Reference File. Each reference to the same element in the same physical location is changed to reference the name and attributes of the first occurrence of the data element as set forth in the Element Cross Reference File, step 633 as determined by the system or selected by the user as shown in FIG. 9I.

Figure 9J:
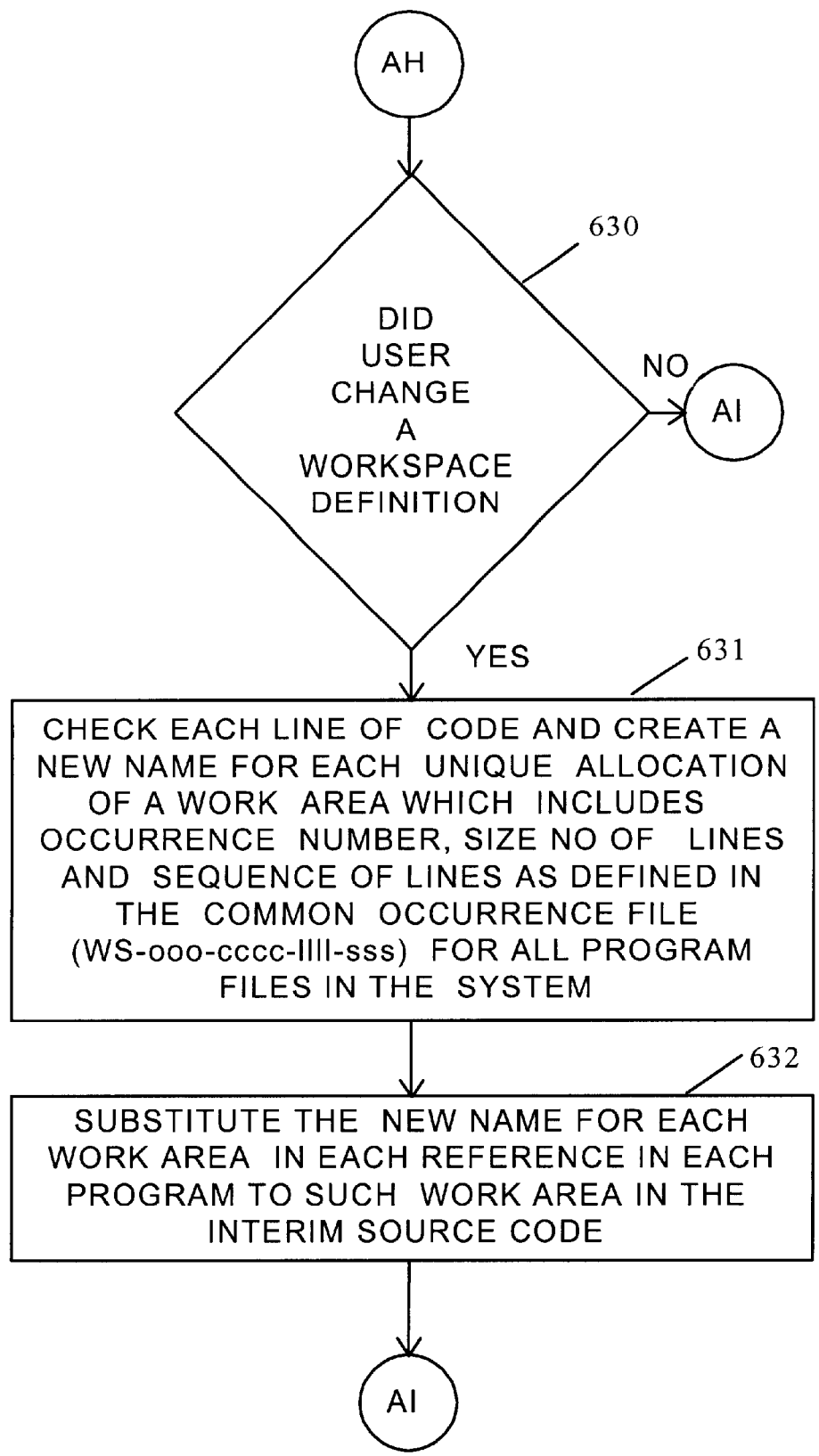

If work space was changed, step 634, the interim source code is again checked and each work space allocation is compared with the Work Space Occurrence File. Each reference to the same work space in the same format is changed to reference the parameters of the first occurrence of the work space definitions as set forth in the Work Space Occurrence File, step 635 as determined by the system or selected by the user, FIG. 9J.

However, the user cannot select a new workspace name. The system creates a new reference name for each unique Work Area, step 636, in the following format WS-ooo-cccc-llll-sss, where "ooo" is the occurrence number, i.e., the first occurrence of the same work space allocation (ooo=001 and so on), "cccc" is a four digit number representing the size of the work space in characters, "llll" is a four digit number representing the number of lines of work area, and "sss" is a three digit number representing the sequence of lines of workspace allocated. That is, the order of identical work space allocations defined in sequence. The information required regarding the format of the Work Area is derived from the Work Space Common Occurrence file which defines each such area The maximum sequence number is an indication of the largest number of work space allocations in any program sequence. Certain programs may overlap in all or part of the Work Area allocations. This means that if program 1 uses work space allocated in sequence 001 through 006, and program 2 uses workspace allocated in sequence 001 through 003, each program will utilize the same physical space in sequence 001 through 003. Program 1 of course uses additional space 004 through 006. Since the programs run at different times this use of the same work area does not create any conflict, but simplifies the code with standard definitions with equivalent work space used by different programs. The name created is substituted for each reference allocating the work area in sequence within each program step 138. This means that each work space name has the attributes of the work space built into the name and makes future maintenance less confusing.

Figure 9K:
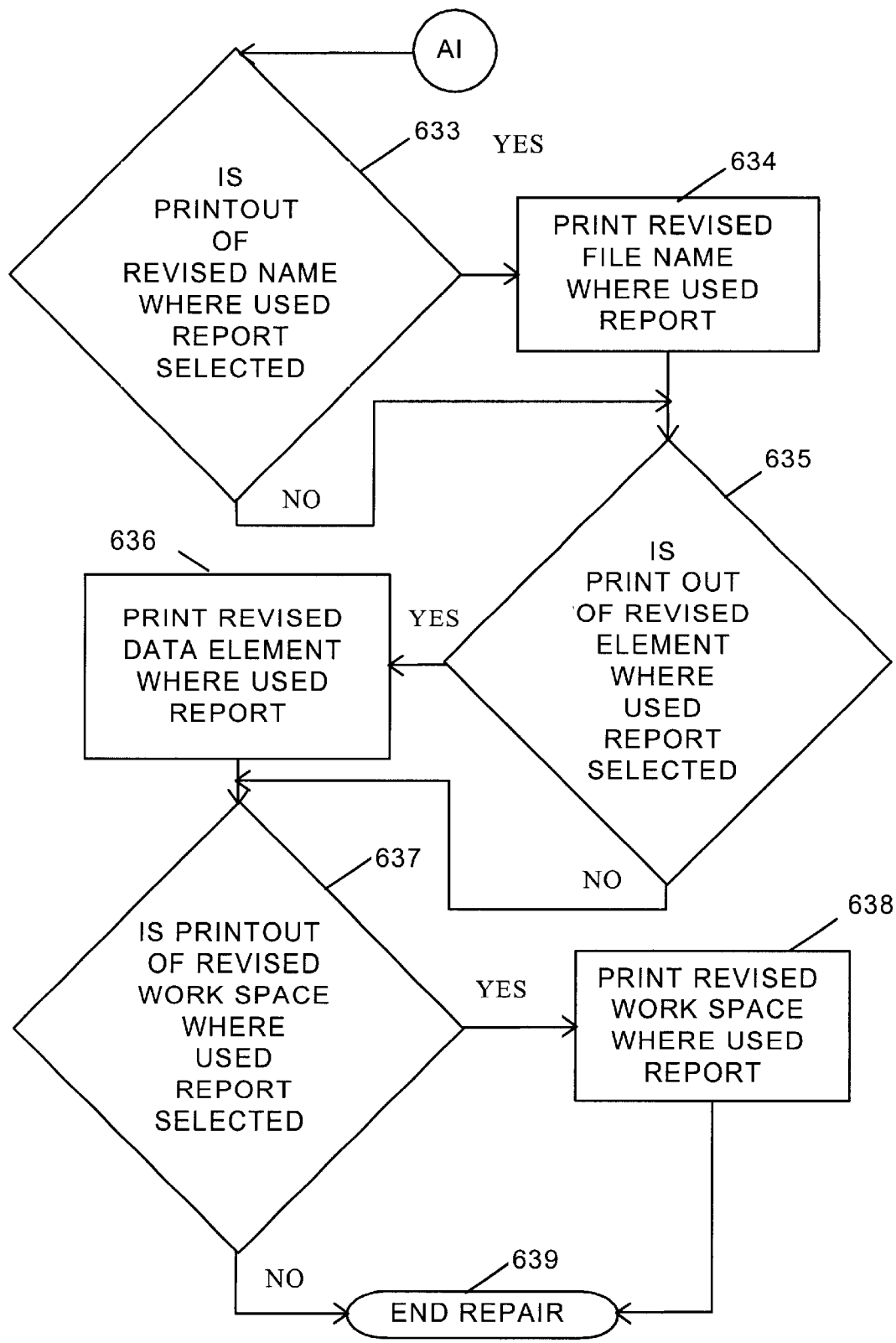

The user is provided an option to reprint the File Name Where Used Report for the revised file names, step 637, FIG. 9K. On an affirmative selection, the revised File Name Where Used Report is printed, step 638, as shown in FIG. 2L

In FIG. 2L, the user is then provided an option to reprint the Element Where Used Report for the revised data element names and attributes, step 639. On an affirmative selection, the revised Element Where Used Report is printed, step 640.

The user is also provided an option to reprint the Work Space Common Occurrence Report for the revised workspace allocations, step 641. On an affirmative selection, the revised Work Space Common Occurrence Report is printed, step 642, and Phase I ends, step 643.

Figure 10A:
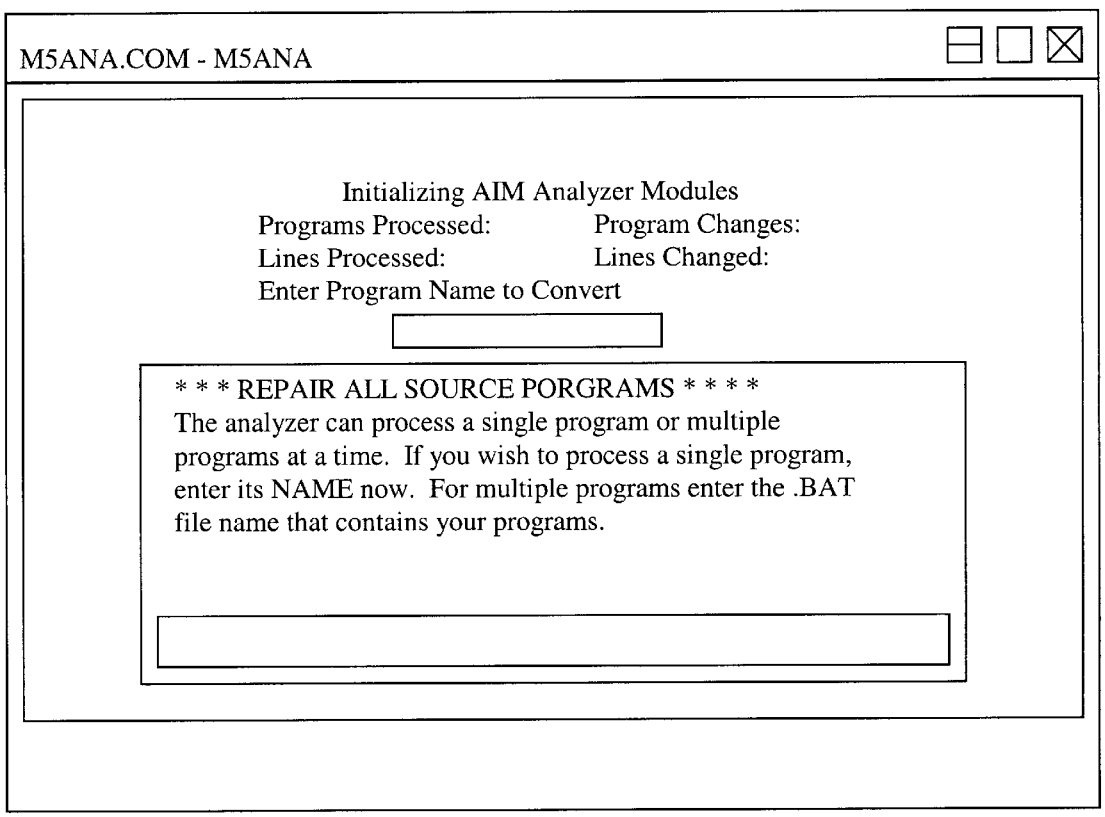
FIGS. 10A through 10C are user screens for the manual repair.
Figure 10B:
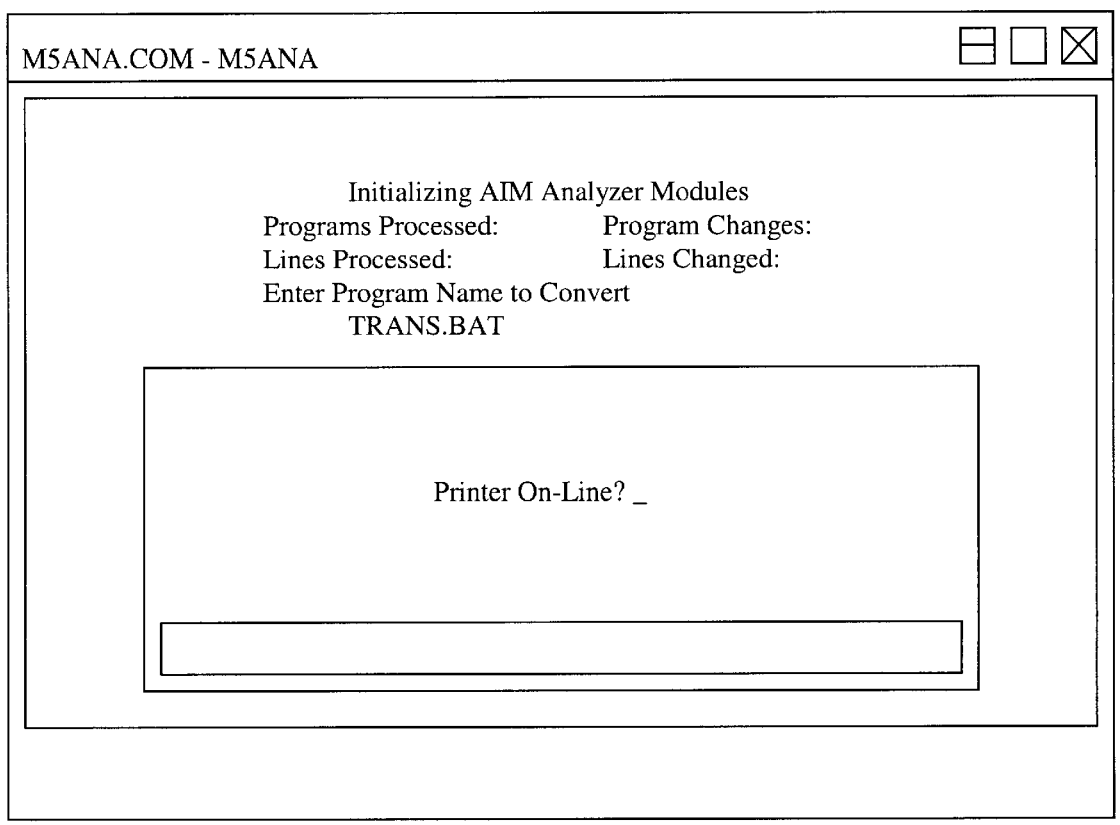

FIG. 10A illustrates the screen presented to the user when the Repair Option is selected in Option 3 and the user is prompted to enter the program name for conversion. As in the Analyzer, either a name or a .BAT file of names may be entered. The program ensures that the printer is on-line so that the various Where Used Reports may be generated, FIG.

Figure 10C:
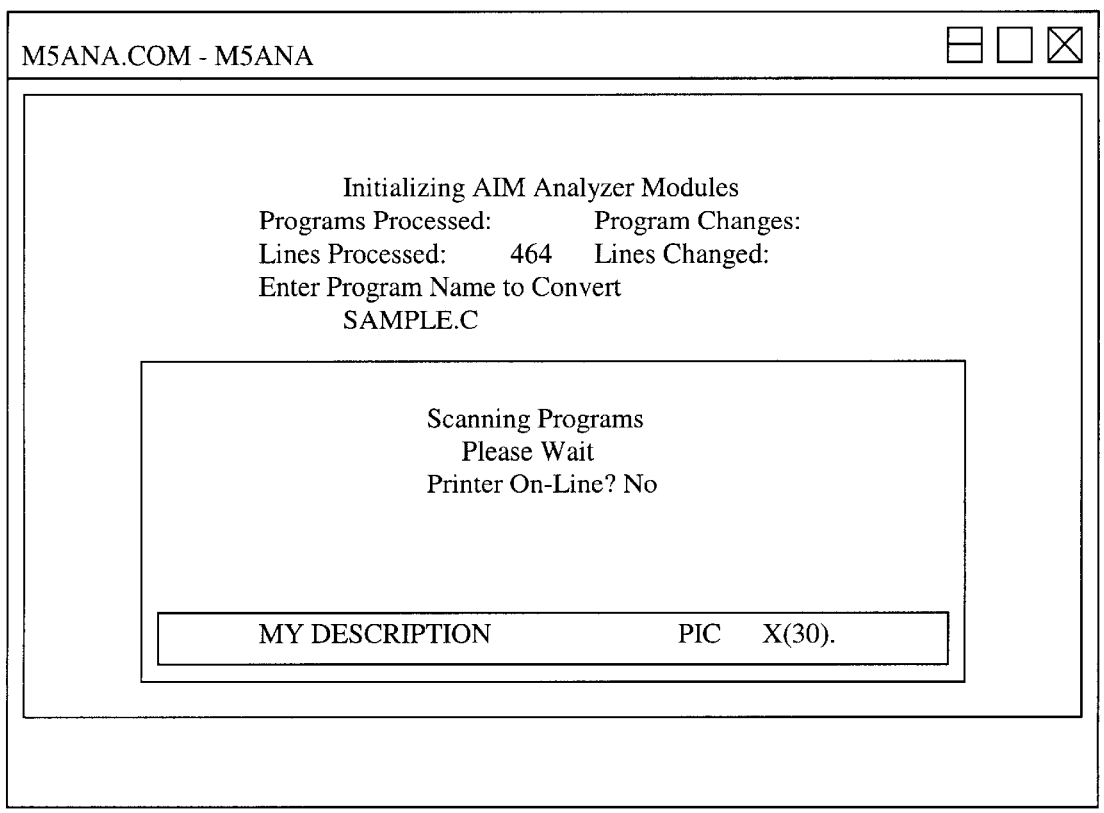

10B, and the system commences scanning the programs. A parse table, parses out the various file name and data elements selected by the user and to be individually changed by the user. The process is essentially the same as the Analyzer section but only selects for change those items entered by the user. The user is presented with a screen requesting the name of the program or the .BAT file of the programs to be repaired. The parse table may include a date definition because all the users wishes to do is expand the date field length. Screen 10B ensures that the printer is on line so that an audit trail of corrections may be printed. FIG. 10C shows the user that the system is scanning the various files for the parse table elements. In this particular example, the name of the element is MY DESCRIPTION and it is any character of length (30).

Figure 11:
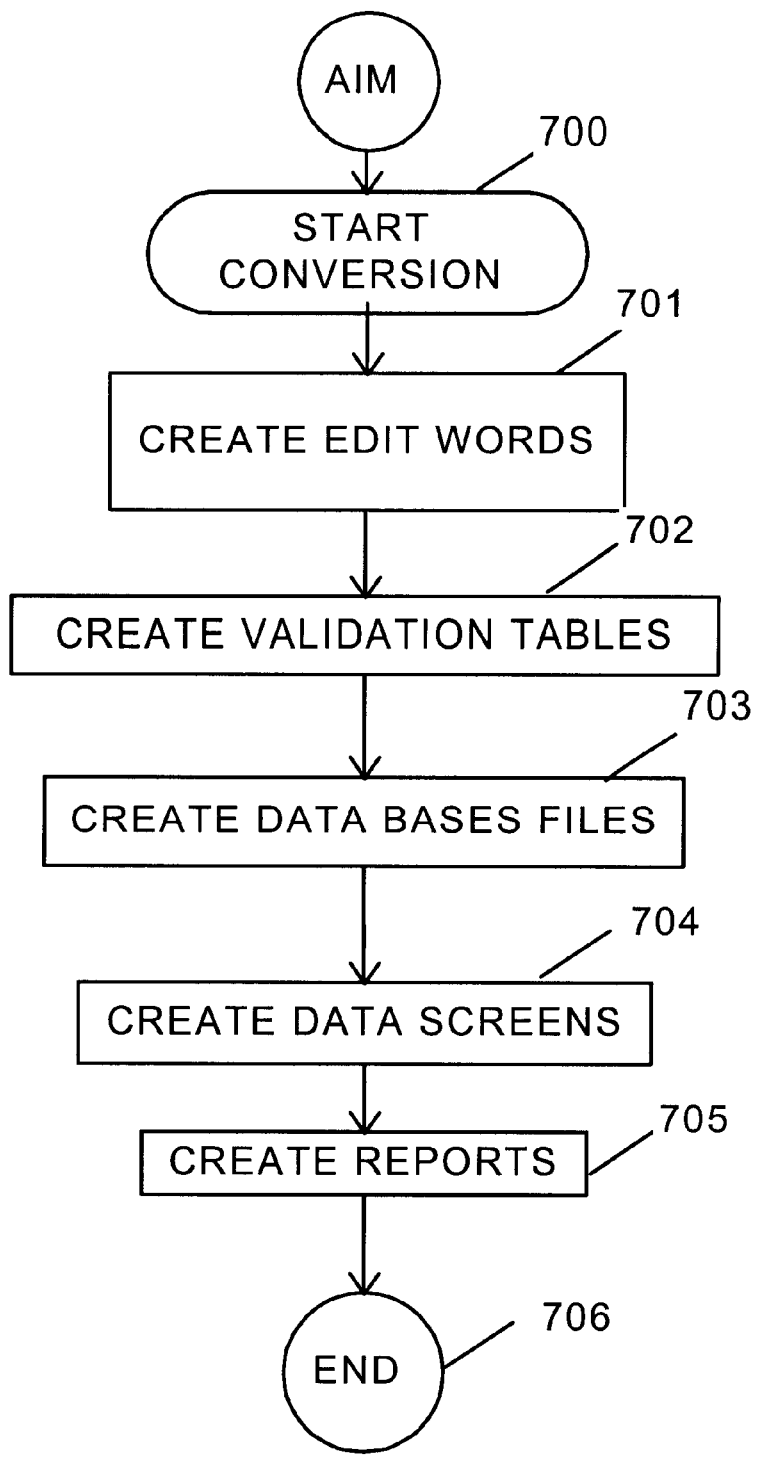
FIG. 11 is a flow chart of the Conversion option.

FIG. 11, illustrates the system conversion routine, step 700. The Conversion creates new edit words, step 701, a validation table, step 702, new data base files, step 703, new data screens, step 704 and report forms, step 705 and the conversion ends.

Figure 12A:
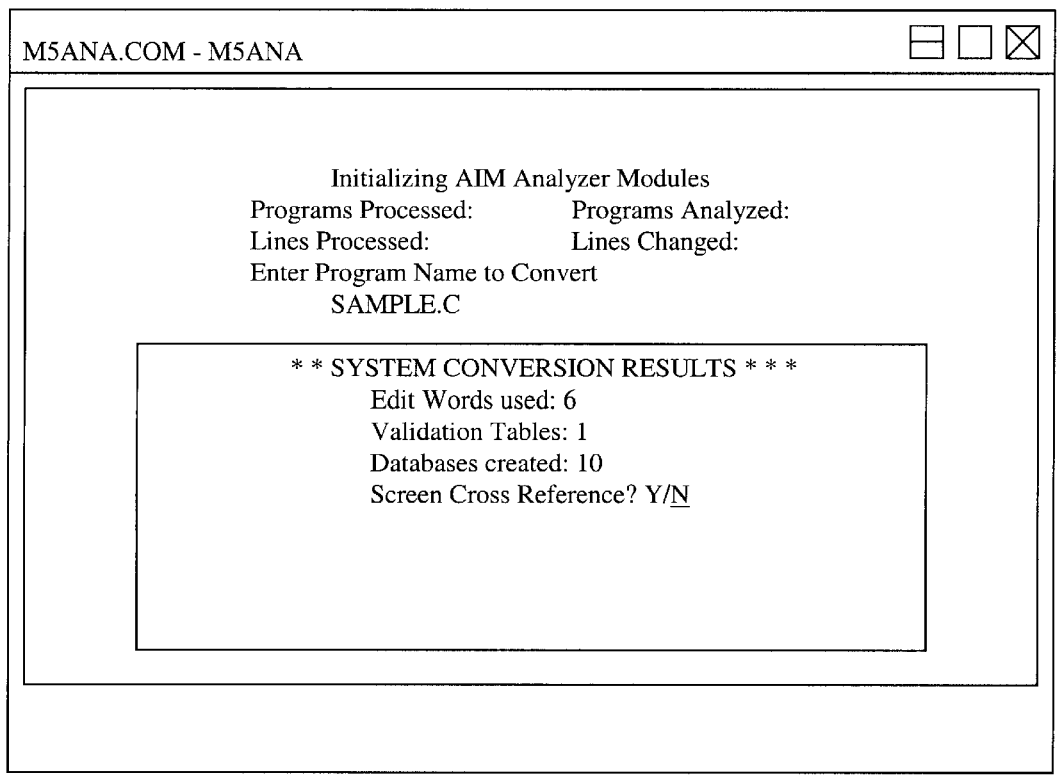
FIGS. 12A through 12B are user screens for the conversion option.
Figure 12B:
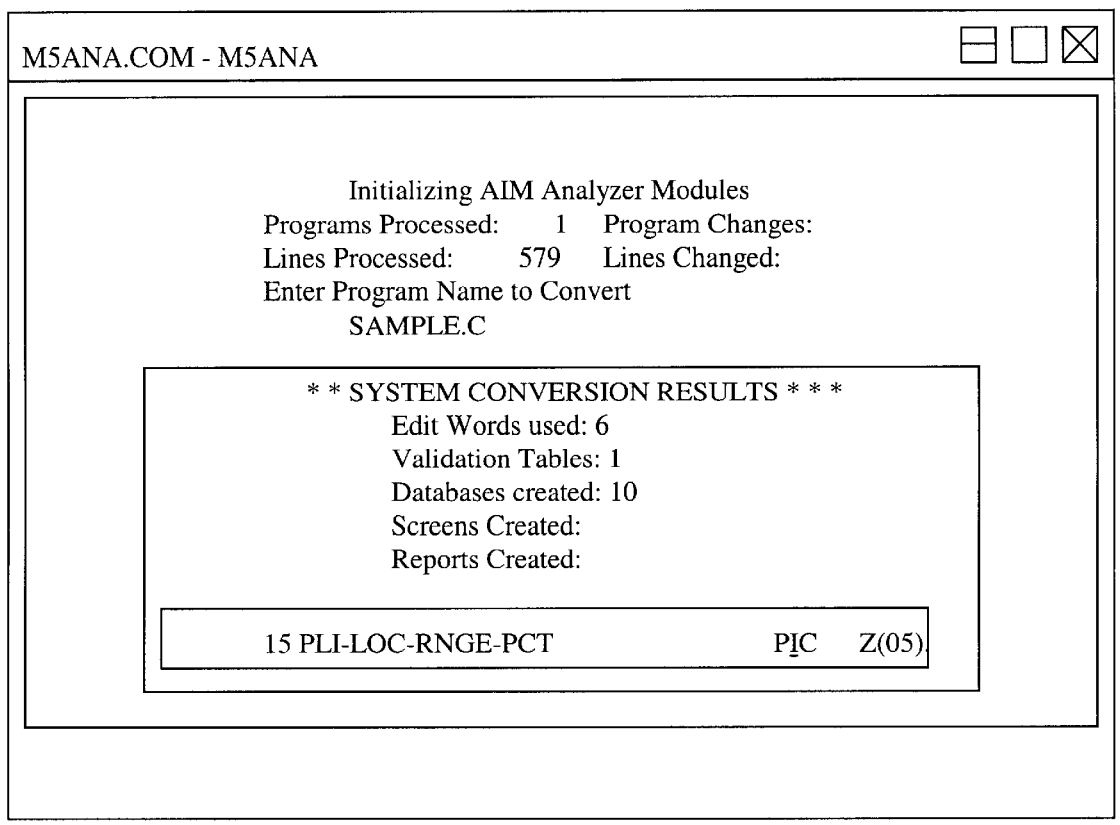

The screen of FIG. 12A demonstrates the conversion to the automated information management system specifications for a code-less environment. On completion of such conversion, FIG. 12B advises the user of the number of edit words used, validation tables required, data bases created, screens created and reports created.

Figure 13:
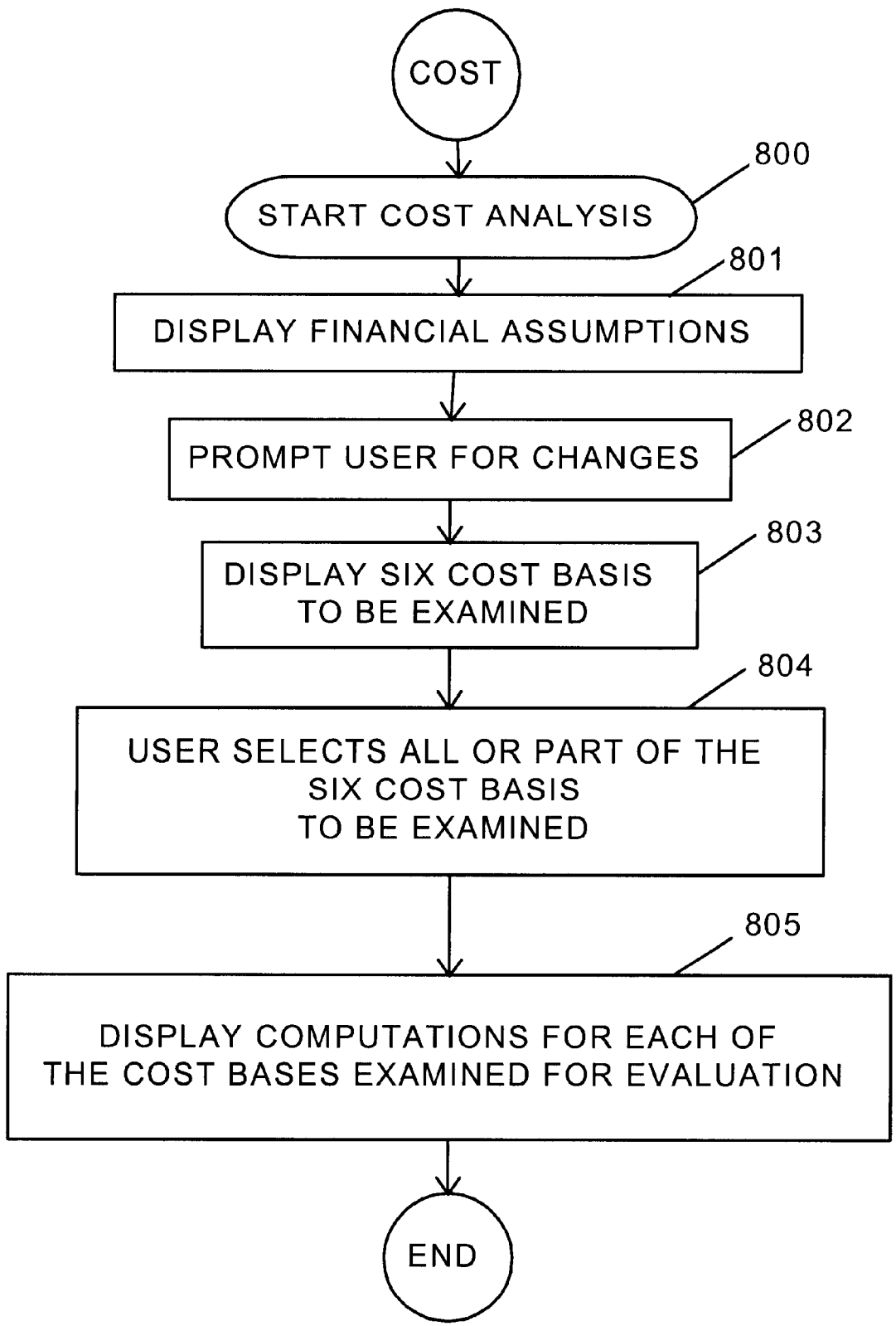
FIGS. 13 is a flow chart of the cost analysis function.

FIG. 13, illustrates the cost analysis option. The cost analysis option is initiated on selection by the user, step 800. The cost analysis option displays financial assumptions to the user for evaluation, step 801 and prompts the user for changes, step 802. The cost analysis option then displays six cost basis for examination, step 804, and the user may select all or any part thereof for analysis, step 804. The system then computes the various cost elements and displays the cost estimates for a variety of repair options, step 805.

Figure 14A:
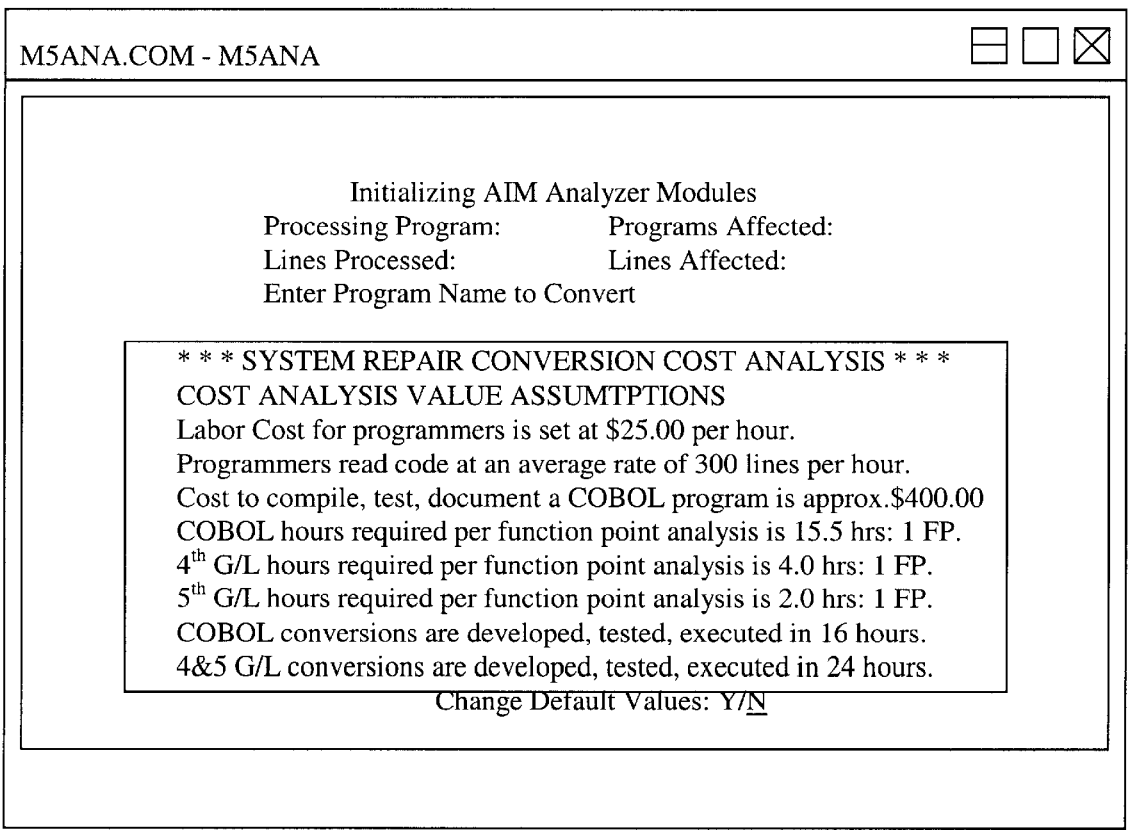
FIGS. 14A through 14C are user screens for the cost analysis function.
Figure 14B:
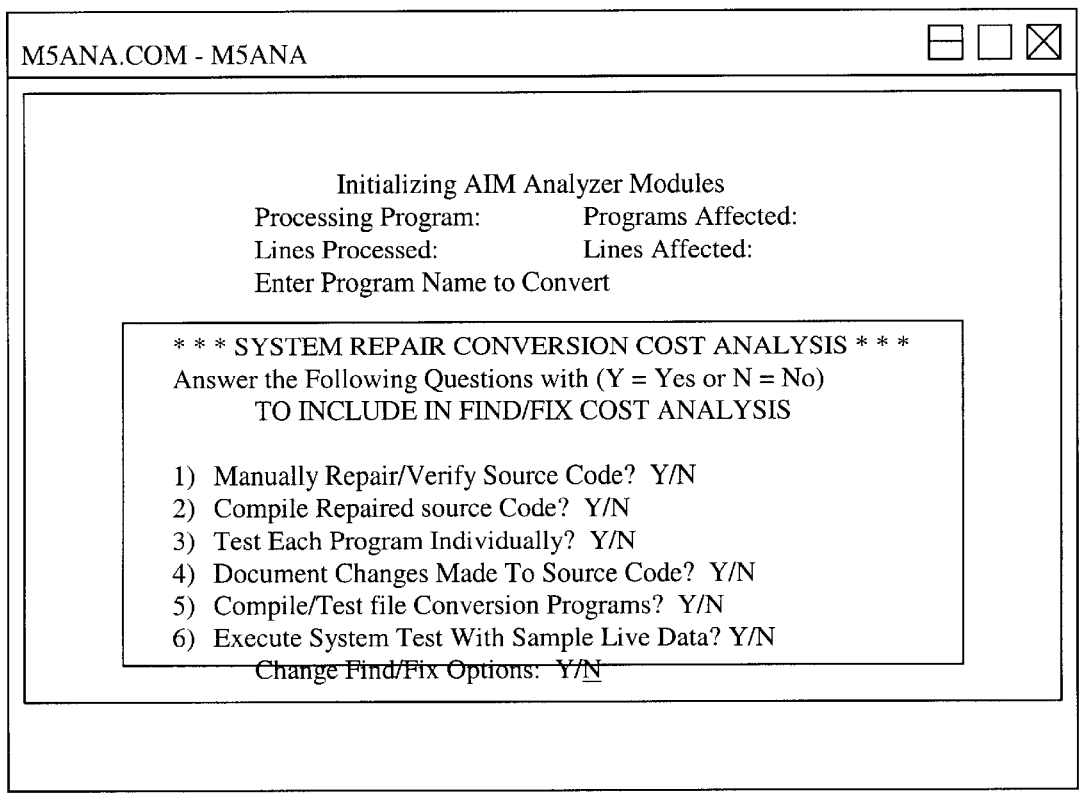
Figure 14C:
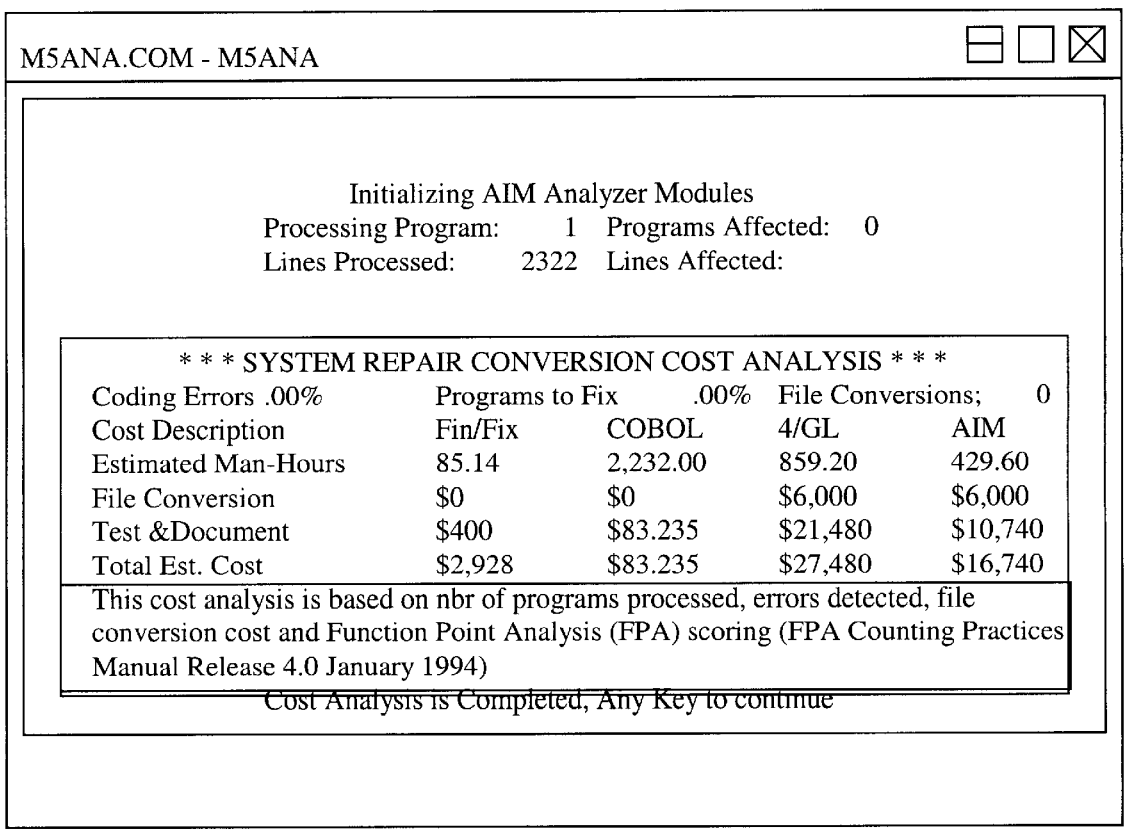

The screen of FIG. 14A presents the assumptions used on selection of the Cost Analysis option. The screen of FIG. 14B permits the user to elect which element of cost should be included in the cost analysis for examination. The user may select all or none of the six cost basis parameters. FIG. 14C is a screen which illustrates for the user the total cost for the parameters selected for four repair/conversion techniques. These are Manual Find and Fix options of the instant invention, COBOL reprogramming, or reprogramming in another 4th generation language, and using the instant invention. In this case, one (1) program was analyzed, and (2322) lines of code evaluated.

FIGS. 15A and B, show the data base structure for I/O elements and common I/O file structure used in the intervention. Most of these definitions will be readily apparent to those skilled in the art However, a few of these data base elements will be described in more detail.

For FIG. 15A the Data Base number is the sequential number of 'E' records. The element edit is the format of element for display. Parse Type is A(automatic) or P(pause) parseid is the position of a record in the Parse Table.

For FIG. 15B a system assignment is the physical location on disk where the file is stored. (The record name is the level 01, 05, 10, etc. Record size is in characters. The table type is either standard definition or omitted). The assigned data base number is the sequential number of 'D' records.

For FIG. 16A, W1 contains a record for every level of instruction. Value, if any, is a sub-profile picture and any default values.

For FIG. 16B, W2 is a summary record using W1. Occurrence is the number of occurrences of the code in a program. Sequential number is always 001 and is used to compare to 01 level. Sub level is the top level of the work area, i.e., 77, 01, etc. For FIGS. 16C and 16D the names of the fields illustrate the nature of the stored contents.

For FIGS. 17A through 17D, the names are descriptive of the contents. The term (Function Number) indicates a sequential number assigned to the common function. The (Sequential Number) is the number indicating the order of the instruction found in the block.

For FIG. 18, the term partial parse word is the sub-string to be searched in a string.

FIG. 19 is a flow chart of the REPORT OPTION of Option 2 of FIG. 8A.

The system tests if a File Name Where Used Report is selected, step 901. If so a Revised File name where used report is printed. Step 902. If not the system proceeds to the next test. In either case the system next tests if a printout of an Element Where Used Report was selected, step 903. If so, An Element Where Used Report is printed, Step 904. If not the system proceeds to the next test. In either case the system next tests if a printout of A Workspace Where Used Report was selected, step 905. If so a Workspace Where Used Report is printed, Step 906. In either case the report phase ends.

The initial phase described in detail above creates a number of detailed data bases which are used either to create optimized source code or a codeless environment.

Figure 20A:
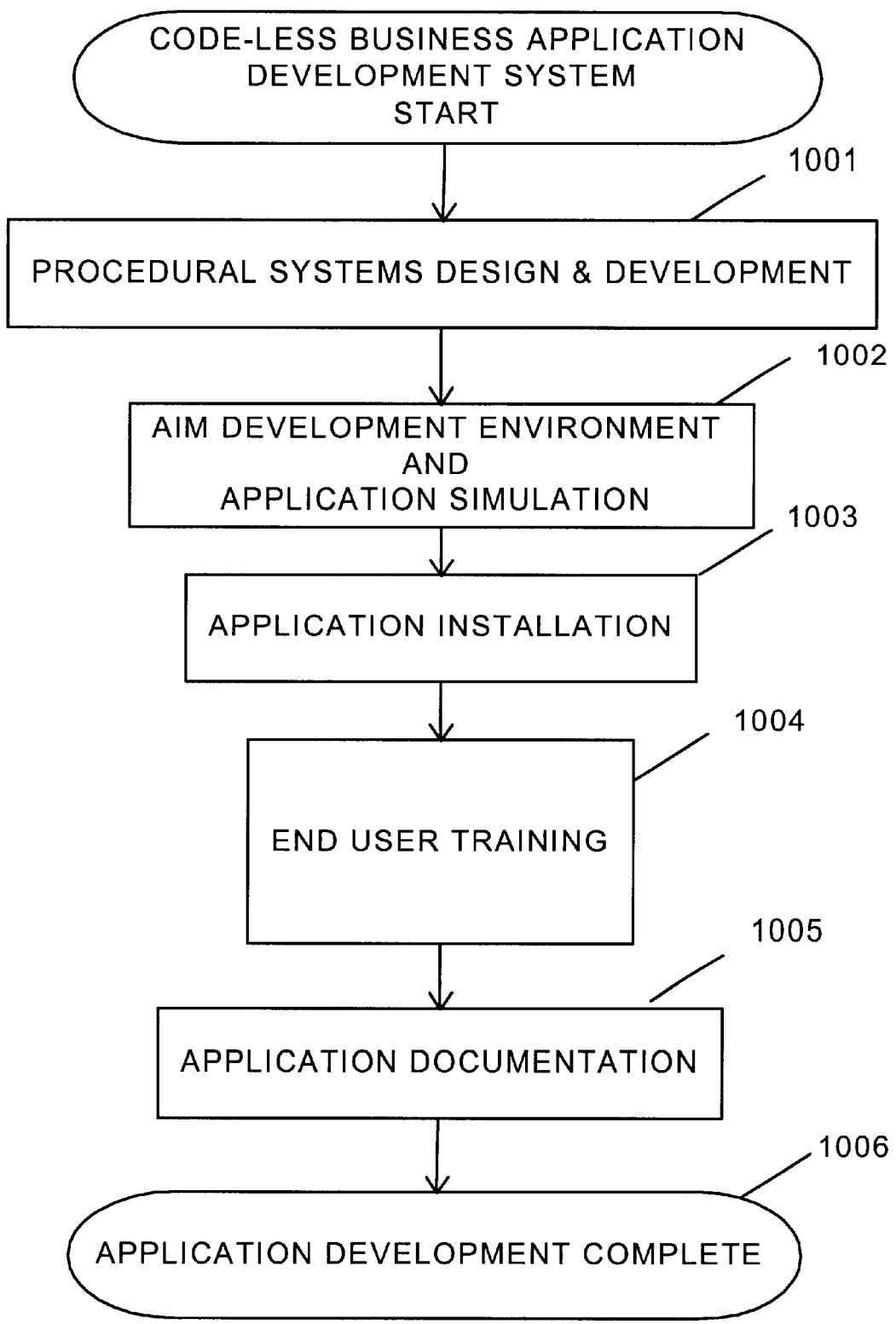
FIGS. 20A through 20F is a flow diagram of the Codeless Application development process Phase IB through IIB

The Development of a code-less business application using the code-less system is accomplished in three phases, an overview of which is shown in, step 1000 of FIG. 20A. This is initiated by a procedural systems design and development stage which includes an information flow analysis gather process, step 1001, the code-less development environment is tested by simulation of the application, step 1002. The application is then installed, step 1003 and end user training completed, step 1004. Application documentation is prepared, step 1005, and the codeless application is complete.

Figure 20B:
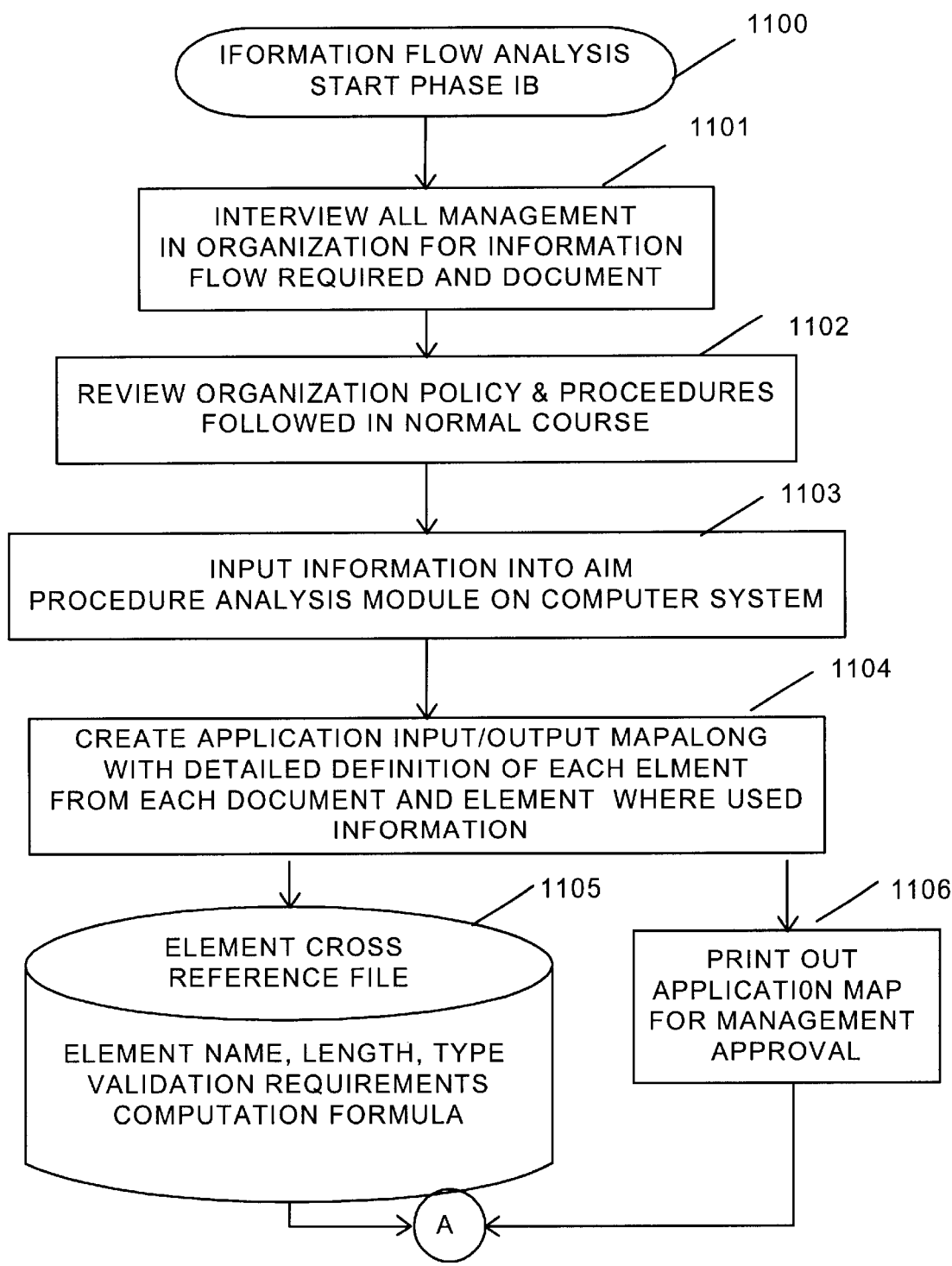

Referring to FIG. 20B, the first stage Phase IB commences with an interview of all management in the organization for information flow required by the organization and all results of input/output requirements are documented, step 1001.

A study of all of the policies and procedures followed during the normal course of business for that particular organization is also conducted and all results documented. During this process documents are gathered and an information flow diagram is prepared step 1102. The information flow diagram is input into the Procedure Analysis Module of the code-less system 1103 which may be in addition to that information obtained in Phases 1–V discussed above during the optimization (i.e. scanned).

At step 1104 Input/Output Application map or specification is prepared based on results of from step 1103 along with a detailed definition of each element (i.e. item of information) from each document used within the organizations routine operation. The application map identifies where an element of information enters into the system, where it is changed and where it is used by the organization. Also developed as part of the map is Element Where Used information. An element cross reference file is created and element information, such as element name, length, type, validation requirements, and computational formulae is created and stored to virtual memory. In addition, the various database structures are created based on the element information, file transfer specifications, screen specifications, print specifications, validation criteria, and communications all derived from the optimized code and the various elements therein, step 1105.

An application map or specification is also printed out for management review and approval, step 1106. This map provides an opportunity to verify that all pieces of information used by the system is accounted for before implementation of the application begins.

An application map review commences with each department manager to ensure completeness and provides an opportunity to include any additional request for information or elements in the application that they may require. Additionally, it provides management with an overview of how information flows through the organization.

Generation of Default specifications is then accomplished, step 1107 and final versions of the Database structure and file transfer requirements, step 1109 screen specifications and validation criteria, step 1110; and print specifications and communication requirements, step 1111 are copied to virtual memory, step 1108 after management has approved the application map. The system automatically generates all "default" database structures, screen formats, print layouts, file transfers, validation tables and communication specifications which contain the various elements to be displayed, printed, transferred and each of the communication elements as described above and Phase IB, step 1112, is complete, In Phase IIB a development environment is established which initiates a specification modification process by accessing the various element database structures, 1202, 1203, 1204, 1205, 1206, and 1207 recorded in virtual memory. The database structures are accessed as part of the application map, step 1201 where the map of all specifications created in Phase I are cosmetically modified according to management and user personal preferences, step 1202. Any additional elements left out in Phase I for any reason are added to the generated screens, reports, transfers, etc. as may be required, step 1208. When all specifications have been reviewed step 1210, application performance is simulated with test data step 1211. The test output is checked to ensure that the information flow satisfies the organization's business application requirements, step 1212.

Where the design effort goal is to replace an existing system transfer specifications are prepared where existing data files are converted to the database specifications developed during the initial scan step and tested, step 1213. Where a manual procedure is being replaced, step 1214 the data files are created and tested. In a manual case the transfer step includes, a parallel processing effort step 1215.

Such final testing, conducted in conjunction with the existing manual effort until department managers are confident with the performance of the automated process.

A review step 1216 is conducted after the completion of testing by with each manager within the organization required, to review and indicate individual approval. Each manager signs a copy of the final systems documentation.

End users are assigned system authority and authority to utilize selected functional capabilities step 1217 and Phase IIB ends.

Figure 21:
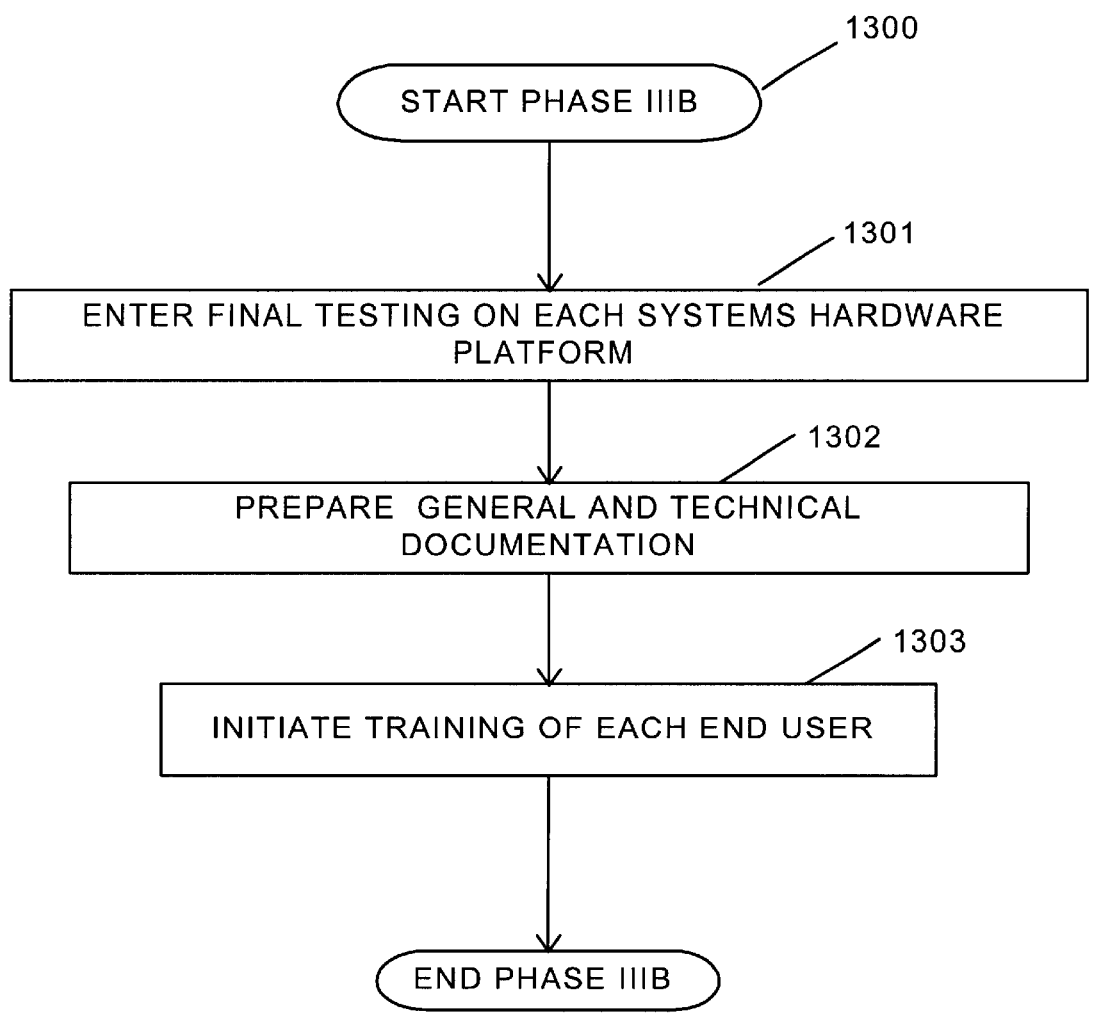
FIG. 21 is a flow diagram of Phase IIIB.

As shown in FIG. 21, Phase IIIB, step 1300, includes the system installation, documentation preparation and end user training. A final testing step 1301 is performed on the systems hardware platform that the end user has selected for their organization. The development platform always remains on a micro-computer which is continually used for ongoing modifications after the business application has been installed.

A Documentation step 1302 is initiated by commanding the system to generate general and technical documentation on demand. As the application is modified or expanded, all documentation is continually updated. The result is application documentation which is always current to what the system is actually doing and no modification can be made without a corresponding change to the documentation.

A customer training step 1303 is initiated and accomplished by training selected individuals within the organization to become System Administrators who are trained on the overall use of the entire business application installed. In addition, they are also trained on how to use the development environment when making modifications to the business application developed. Each end user receives a personal user manual detailing only the functions that they are authorized to perform within the business application and Phase IIIB ends.

Figure 22A:
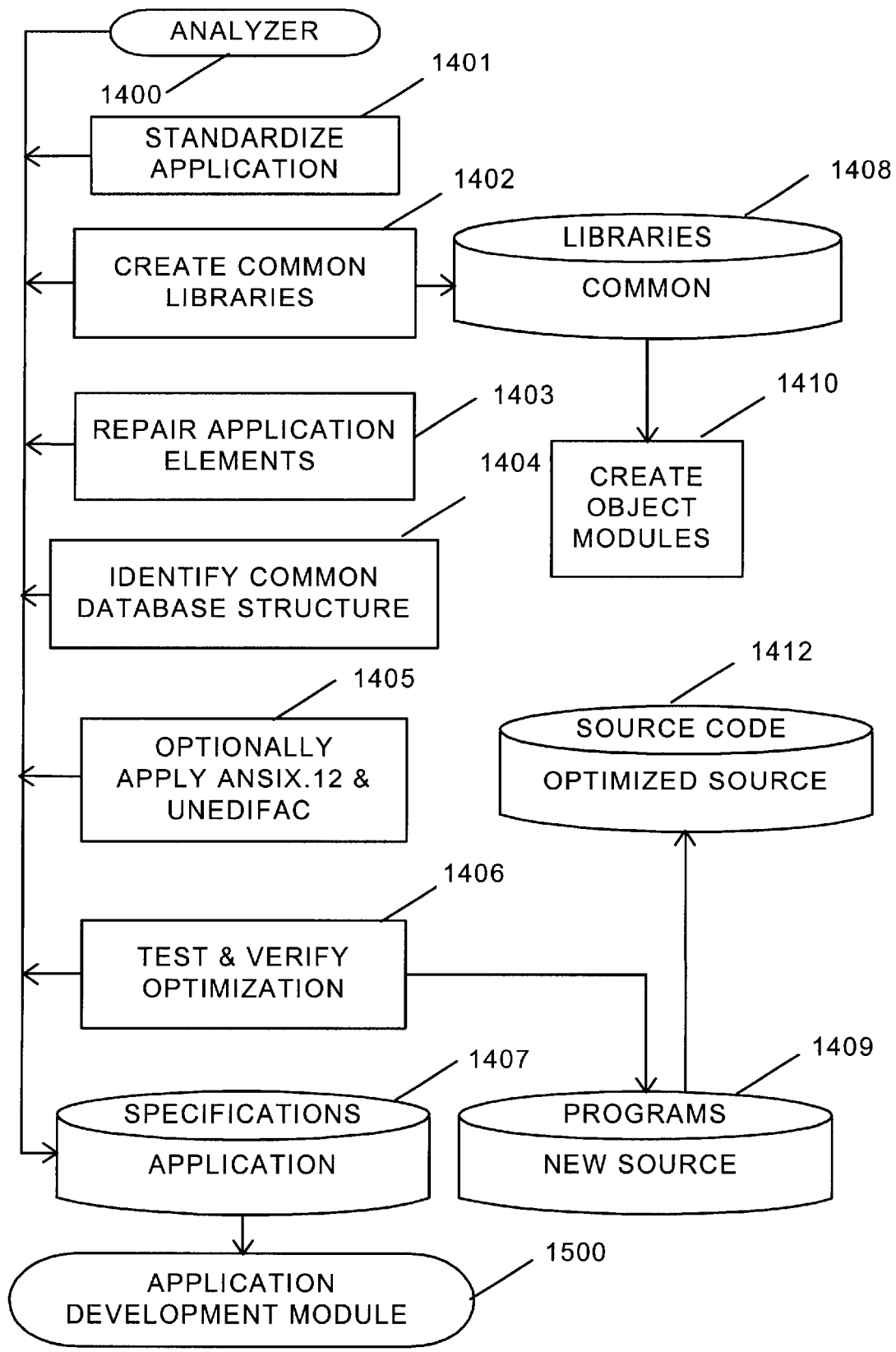
FIGS. 22A through 22C is an overall flow diagram of the Entire Software Re-Engineering Solution.
Figure 22B:
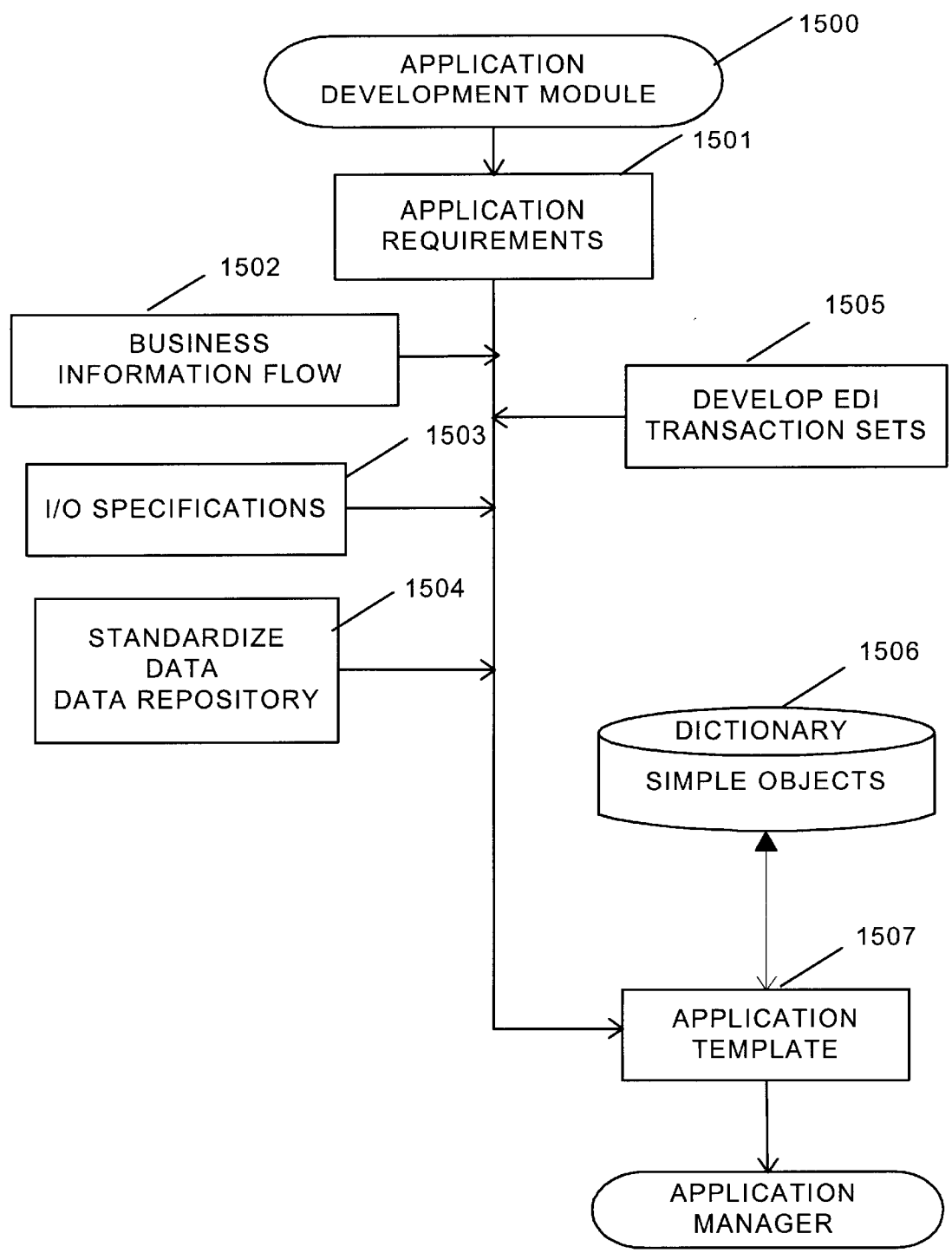
Figure 22C:
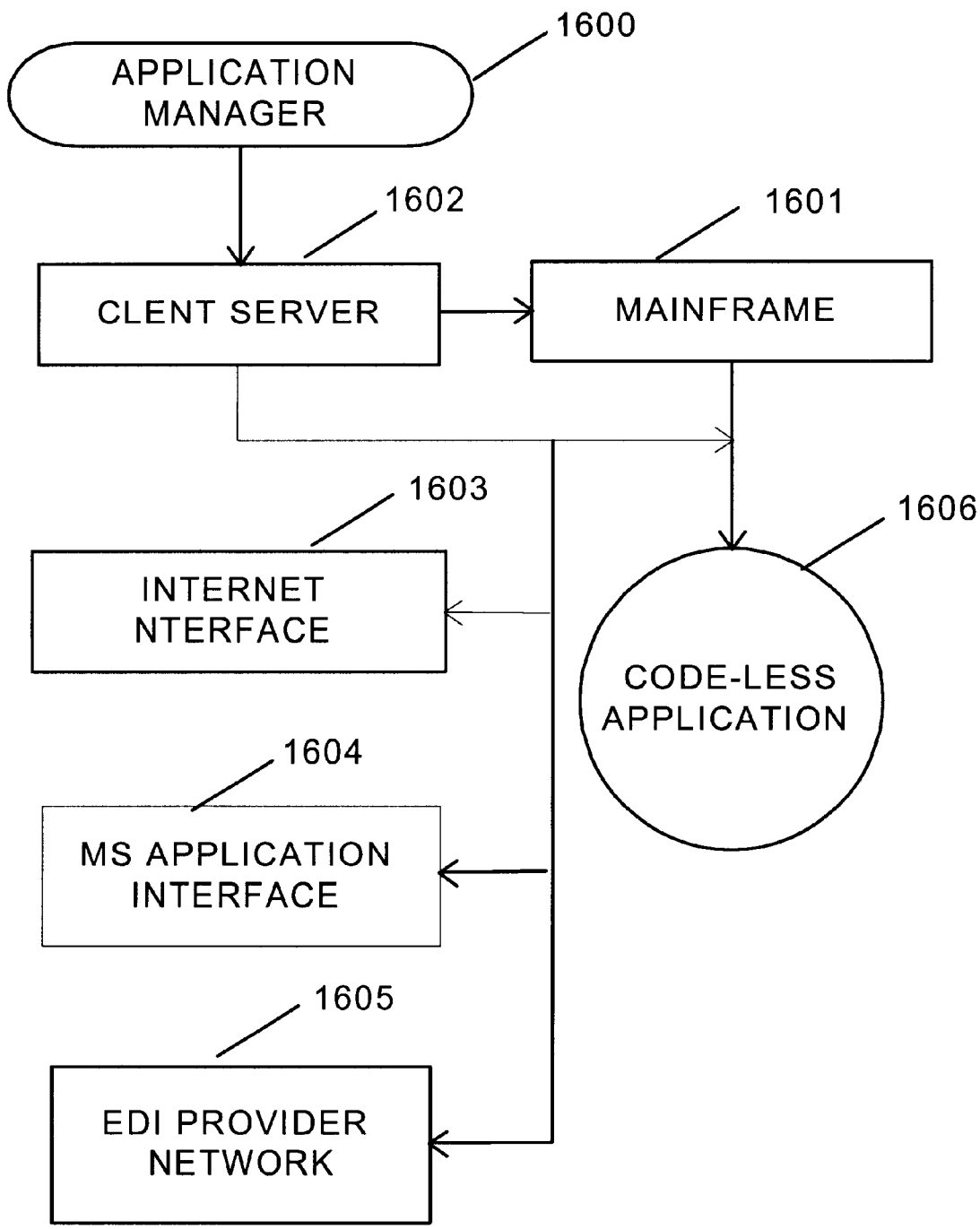

Referring to FIG. 22, the overall Software Re-Engineering System is illustrated. As can be noted, two independent paths are illustrated. One which results in the optimization code of a new system and the other which results in the creation of the code-less system. An analyzer section commences with step 1400 to standardize the application, step 1401. The system then creates the common libraries as discussed above, step 1402. The common library is stored in virtual memory (disk), step 1408. Object Modules are created which contain scanned or predeveloped functions from the Common Libraries, step 1410. Application elements are repaired, i.e., date correction, etc., step 1403. A common database structure is identified, step 1404. Optionally, the user may apply the ANSI X.12 or UNEDI-FAC data or format protocol, step 1405. The Analyzer system optimization is then tested and verified at step 1406. At this stage either the new source code is generated, step 1409 and Optimized source code is stored on disk, step 1412, or an application specification or map is created, step 1407. As shown in FIG. 22B, the application development module commences with a determination of the application requirements step 1501. Business flow, 1502, I/O specification 1503, and standardized data repository, 1504, information is evaluated along with the development of any Electronics Data Interface transaction sets, step 1505 to complete the application template, step 1507. A simple objects dictionary is created for all of the various application, information, I.O. and data specification elements, step 1506. An application manager is required to operate the code-less application developed pursuant to this system as demonstrated in FIG. 22C. The Application manager may be "ported" or made operational on the customer's client server, step 1602, or on a mainframe where required, step 1601. The application manager interfaces with various interfaces which include an Internet interface established 1603, a Microsoft Office System interface 1604 and an interface to the EDI provider network 1605. The application manager supports the operation of the code-less application 1606.

Once the application manager is created, the application runs through accessing the simple objects dictionary and the common library as well as the various databases containing applications I.O., data, screen, reports, and other files, all in the code-less application which further reduces maintenance, revitalizes the application and optimizes performance.

The ability to build the code-less system applications on cost effective personal computers keeps Designers from "trying out programs" on production systems which exposes the production system to unexpected corruption. The code-less system software applications can on the other hand be added to and/or changed "dynamically" (i.e., that is, the new software upgrade can replace the old version even while personnel use the computer) without danger of data corruption.

Figure 23:
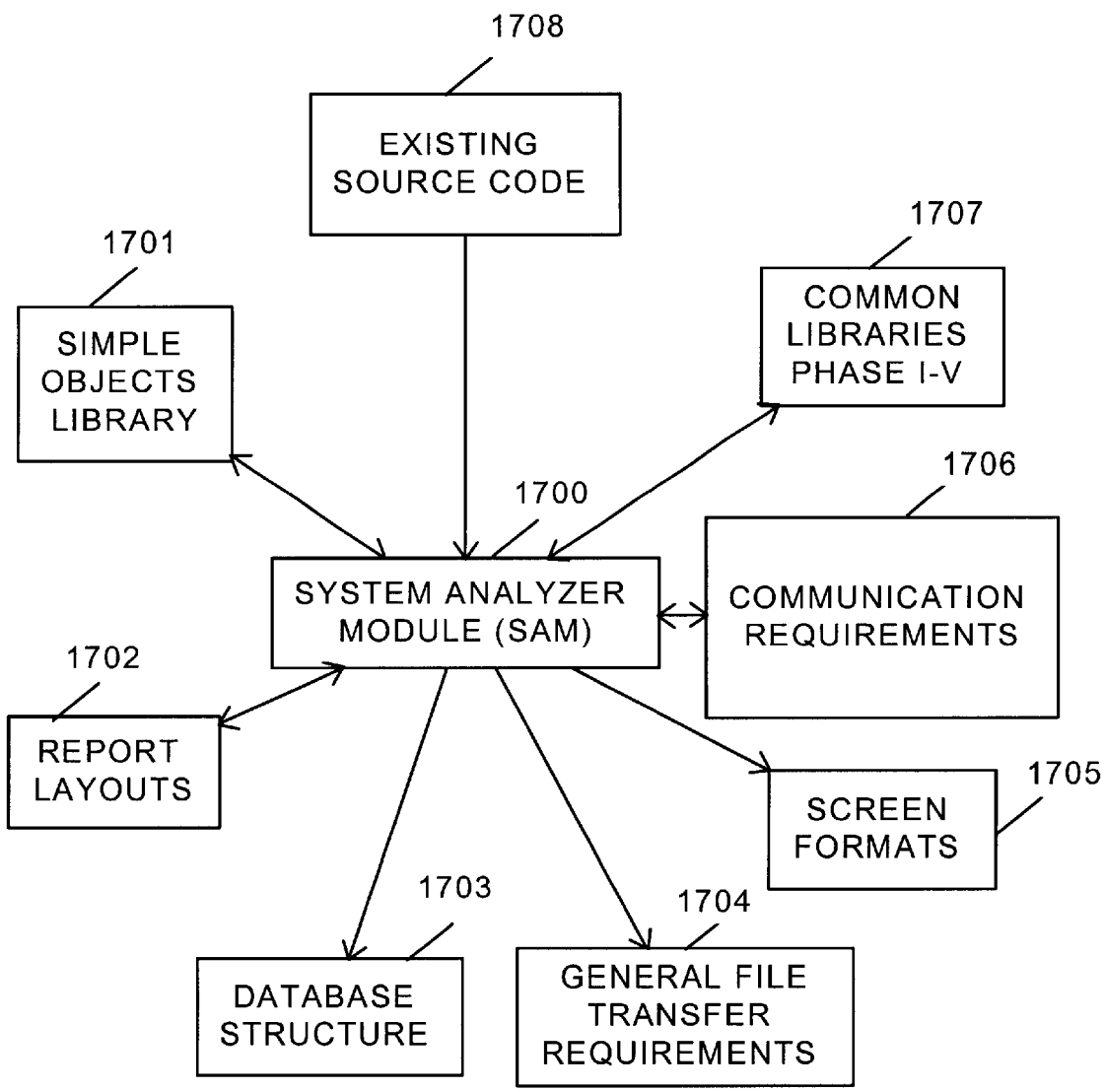
FIG. 23 is a block diagram of the SAM.

The specific code-less system modules implement the operation of the system. These are shown in FIG. 23 in the form of block diagrams.

Figure 20C:
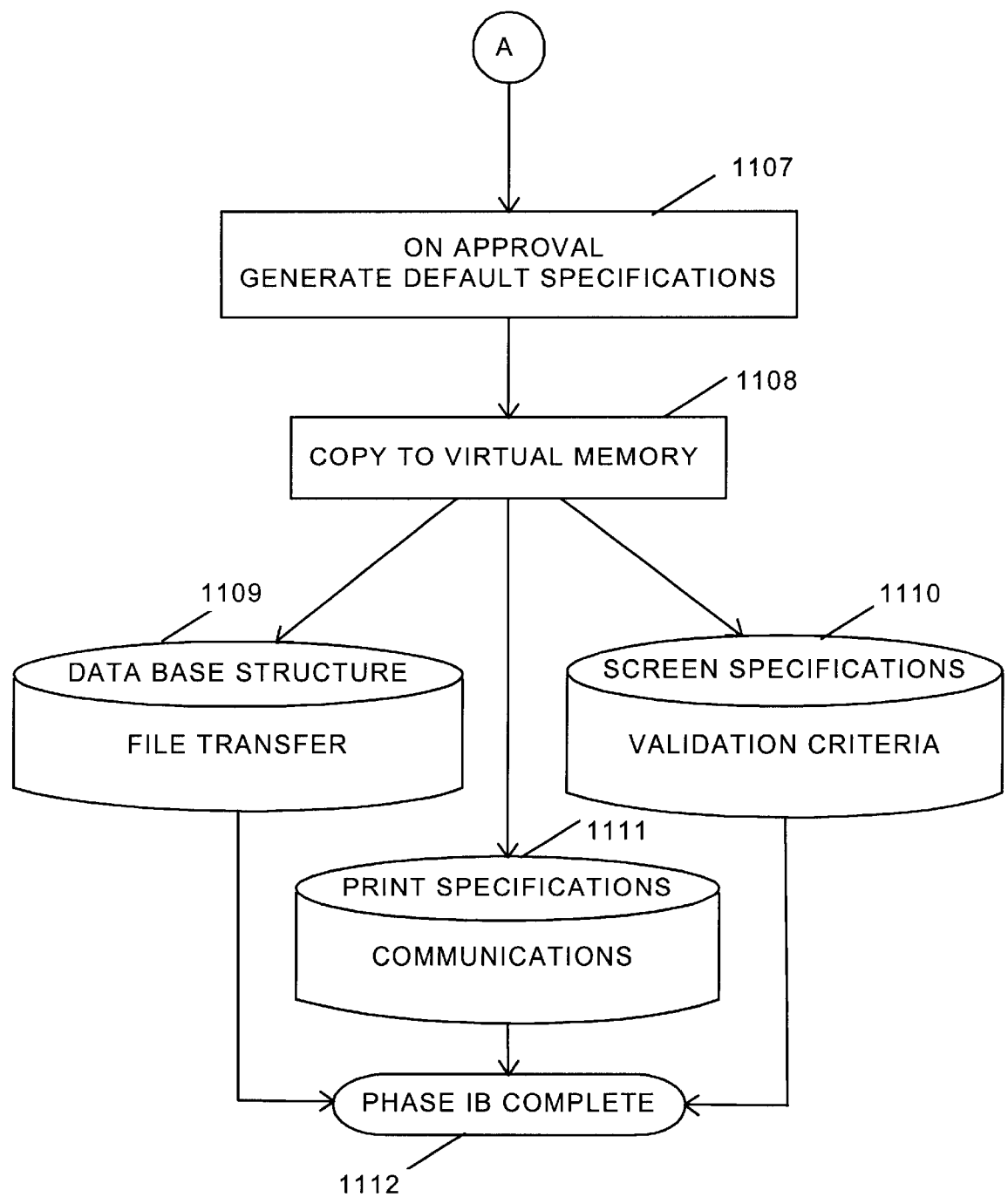
Figure 20D:
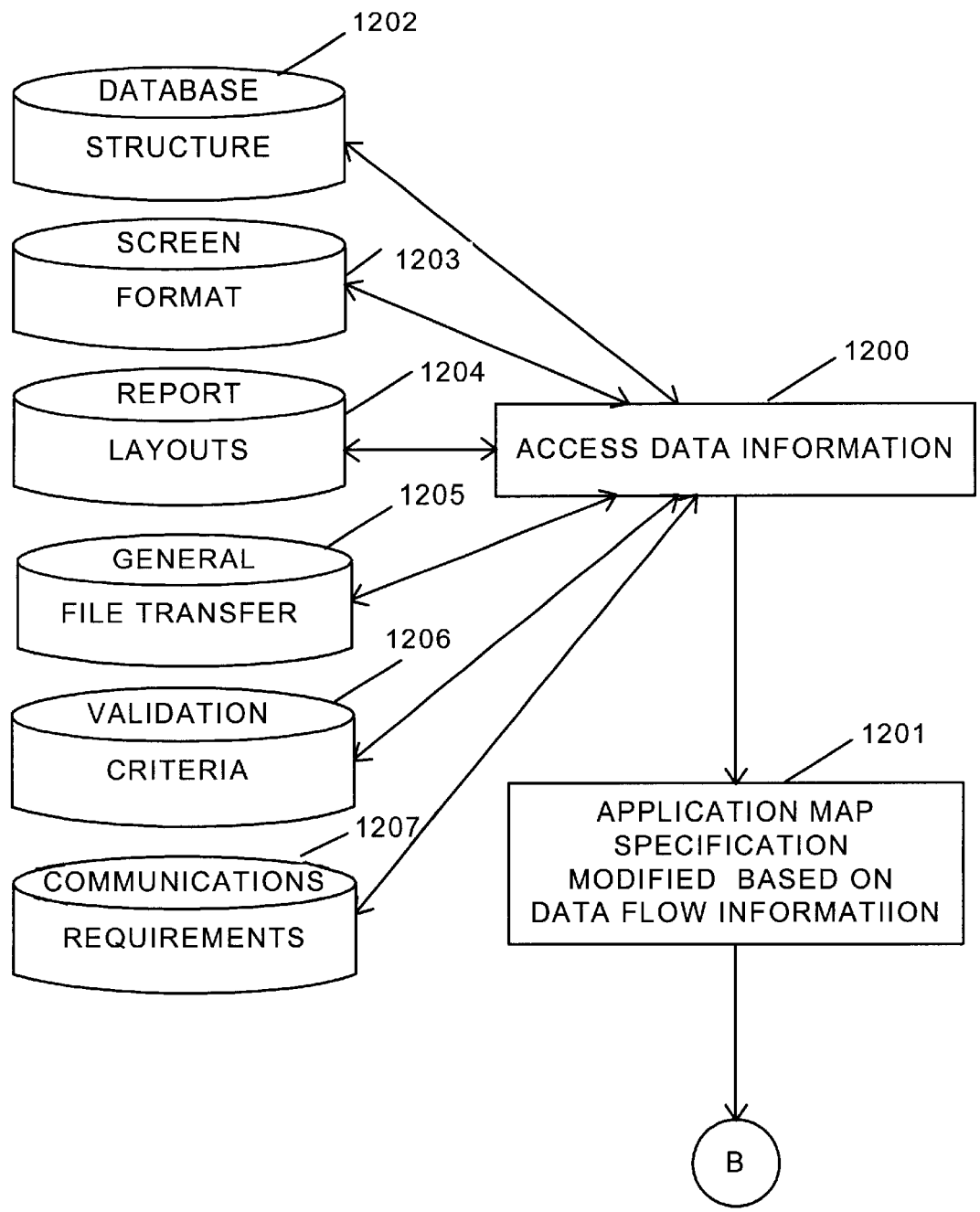
Figure 20E:
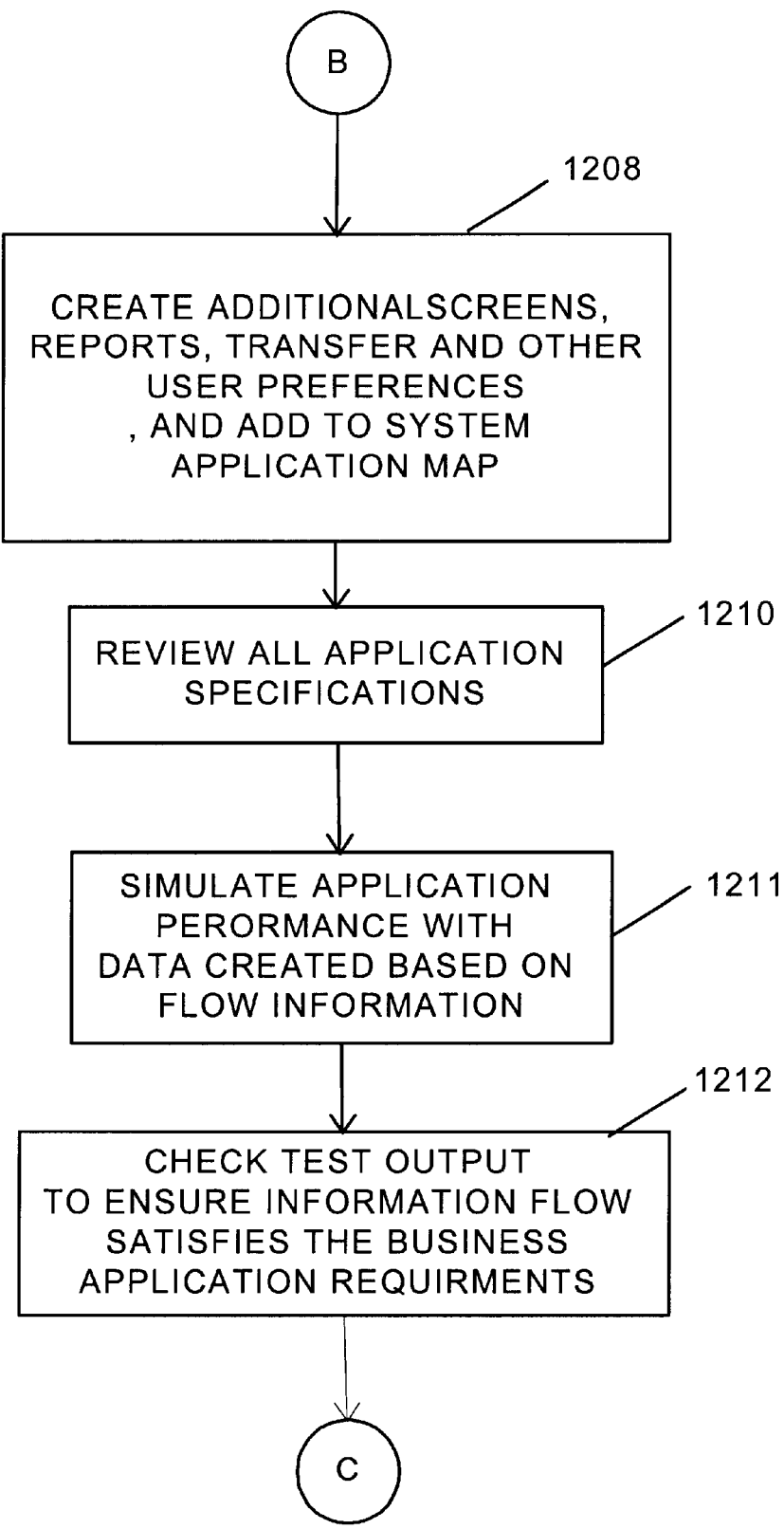
Figure 20F:
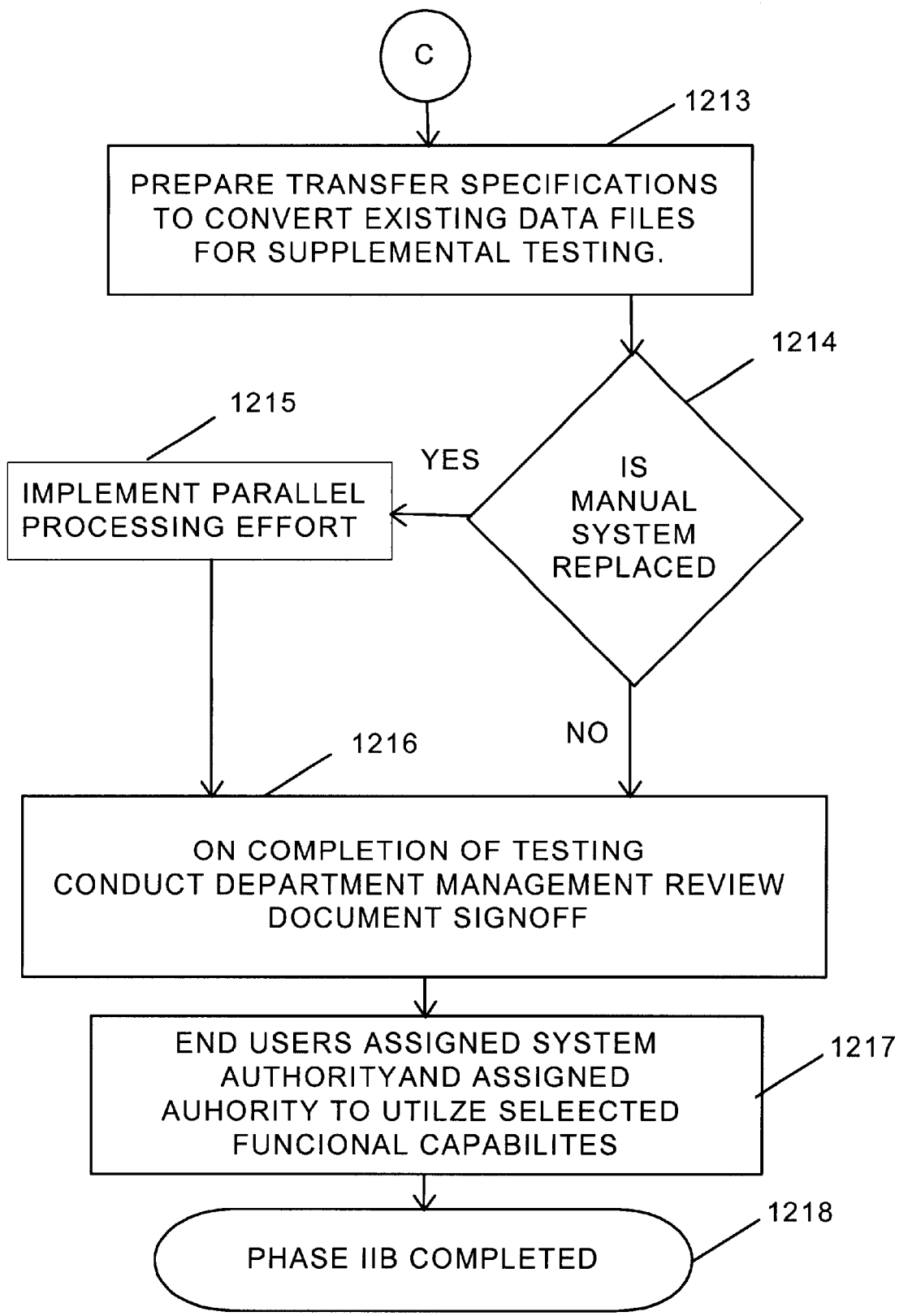

A System Analyzer Module (SAM) 1700 scans existing COBOL source programs, for example, (as well as other source languages, as required) to be converted to the code-less system and to correct the Millennium problem i.e., lack of a four digit year and faulty leap year computations by correcting the software obsolescence that initially caused the problem. The code-less system also provides accurate "on demand" documentation to system developers and users. As noted, in the various flow charts the SAM generates or permits the creation of a number of database structures 1703, screens formats 1705, report layouts, communication specifications 1706, file transfer specifications 1704, and, validation requirements as shown in FIG. 20C.

These are obtained on examination of the original source code which necessarily contains these various structures and defines their elements, including the name, location, length, type, validation requirements and computational formula, if any, and any other information associated with the element as shown in FIG. 20B.

If a new function is required it is merely written in the most effective language and added to the functional library. Once complete, the new module is available to every user of the code-less system. If a module fails to perform or has a "bug," the library version is corrected and the corrected version is immediately available for anyone using the function.

The SAM supplies the designer with an electronic "spreadsheet format," list. Input, output and format information is entered into the spreadsheet and an element conflict and redundancy analysis is conducted. The SAM also produces the information required to create all databases, screens, reports and file transfers.

Screens may contain graphic elements, text elements, field or data elements which are placed in specific locations on the screen. Screens may be used for input or modification of data elements and the code-less system provides a system for editing as noted below:

This information is maintained in a spreadsheet format list which permits easy modification of the Screen elements in the list, by changing the various attributes of the screen, or the graphic, text or field elements or the addition of new additional elements to the list or removal of an element from the list.

The code-less system uses a library/dictionary construct that structures all system functions as universal functions which are by design common to all computing environments, and which can therefore be changed or expanded as dictated by individual application requirements. The CSM operate a totally integrated software application that can include up to 99 other subsystems. The generation of a code-less system eliminates the necessity of learning any programming language because it does not generate program code. Since it does not generate program code, a compiler is not required.

Figure 24:
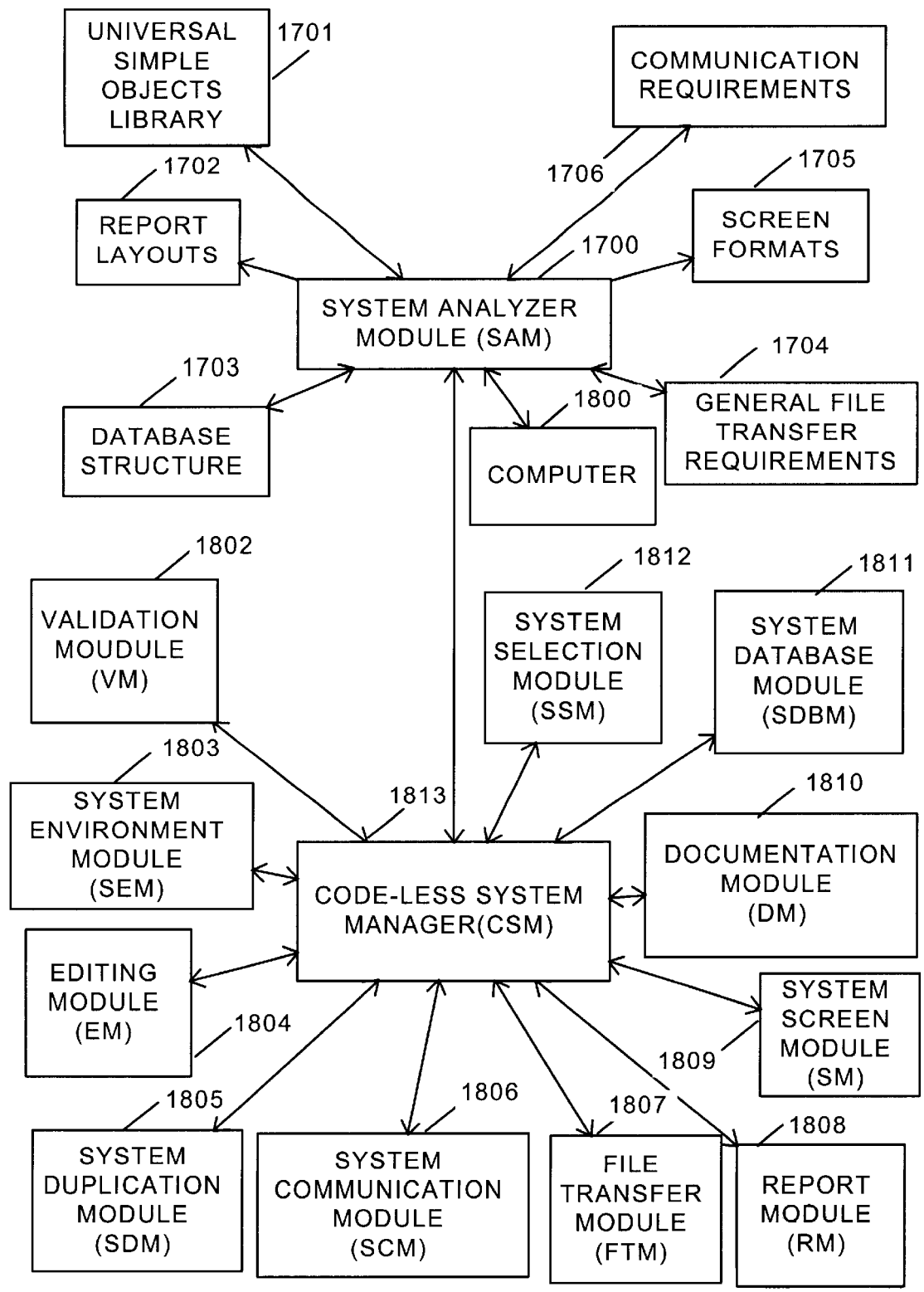
FIG. 24 is a block diagram of the CSM in operation with a SAM.

Referring To FIG. 24, only one copy of the CSM 1801 is required regardless of the number of users, customers, and/or applications that are sharing a computer. Limitations are dictated only by availability of disk storage and main memory. Disk storage is used only for storing significant information, all blanks and leading zeros are removed from data prior to being written to disk and returned only when the information is displayed, printed or transferred to another computer. This compression of data, along with disk space not being used to store programs, results in better utilization of available disk space.

Program and logic errors are eliminated using simple objects, Universal Simple Objects (USO) 1813. These are functions that have been tested through system design efforts with a view toward achieving optimum applications results. As each new application is built with the code-less system platform, new features are added to the USO library. Once a new feature is added to the USO library, it is immediately available to any existing application. Thus, any additions, changes and/or corrections to the code-less system platform do not affect existing applications making upgrade an easy task and making new functions available to the existing applications.

The code-less systems operates concurrently with and shares computing system with other applications whether created with the code-less system or not. The code-less system will process data from, or forward data to, other common programs such as word processing, spreadsheet, and database programs resident on the computing system 1800. This transferring of data can also be performed remotely with a modem to other computers operating with or without the code-less system.

All the code-less system developed software applications automatically include record and file lock where appropriate, permitting multiple users and/or printers to use an application at the same time and without corrupting the database. A computer terminal may be direct connected, or remotely connected through a modem. Printers used may be serial or parallel, direct connected, or through a modem, and shared by all users.

The ongoing obsolescence of the traditional software application is resolved by combining a library of commonly used routines as noted above with an application "specification." The specification, is the program and may be transferred to any computer on which there is a Code-less System Manager (CSM) operating. The specification as managed by the CSM will then perform the same computing functions as the original application whether it is on a mainframe, mini or microcomputer. In fact, new applications may be generated for use with the CSM and their specification or map may also run on any system which includes a CSM.

Code-less system applications can be modified while the software application is operating in a production mode. This feature permits designers to modify or enhance software applications at any given time on or off premises.

The code-less system is also self-documenting producing both user and technical documentation. The code-less system automatically documents all, or part of, the software application it creates at any time. Automatic documentation production ensures that the content is always current. Documentation can also be used for presentations, and the creation of user manuals, and proposals.

The code-less system offers enhanced system performance because the "program" is always loaded into the computer's main memory.

The CSM includes both "real-time" and sophisticated "batch" processing modules. The "real-time" processing module allows multiple interactive terminals to be connected either directly or remotely. The terminals operate in a true multi-user, multi-tasking environment with file and record locking (i.e., credit authorization terminals).

The CSM "batch" processing module allows multiple events to be put on "autopilot." Batch processing tasks occur interactively or as a series of scheduled events.

For example, a computer operator can select a particular time of day, such as 5:00 p.m. for the computer to commence collection of all of the transactions processed between 8:00 a.m. and 4:30 p.m. that day; sort and accumulate such transactions; print a report: update various customer account files; communicate with one or more host computers; and download or upload the information as required.

The task list illustrated above would take place automatically at the designated time with no operator interaction; all of this batch work can be accomplished utilizing an IBM Personal Computer ("PC") or any other platform.

The code-less system comprises over 950 separate functional modules. Each module performs a separate task (i.e., adding, changing and/or deleting a record from the database).

A System Environment Module (SEM) 1803 provides the code-less system platform with basic system information such as location of required files, number of printers, accounting/activities such as number of transactions occurring, etc.

A System Database Module (SDM) 1811 provides for the creation and maintenance of databases and their elements. The SDM incorporates the ability to define database elements, special functions such as mathematical formulas (in a LOTUS like spreadsheet structure), operating system defaults (such as date, time, user defined and application user information) and other default values, if these have not already been created by scanning the source program, as in the case of new automation of a manual system.

An Editing Module (EM) 1804 provides system wide formatting for both user screen and report output (i.e., dollar signs, commas and periods).

A System Selection Module (SSM) 1812 defines universally available selection criteria for reports, file transfers and communications transfers.

A Validation Module (VM) 1802 checks data entry and includes the ability to supply validation comparisons through a validation list to insure the information input correct.

A System Screen Module (SM) 1809 provides the tools required to create, edit, and link user screen and windows. The SM is where a user defines the screen and user interaction interface.

The Report Module (RM) 1808 supplies the tools necessary to create both "real-time" and "batch" reports. Reports may be fixed or selected by the user. The Report Module allows the following report types: page print (read one record and print one page), summary print (read many records and print a summary) or detail print (read one record, print one line). Other specialized Reports may also be created where one to one, one to many, many to one, or many to many relationships exist. An example of one to many is for example a report which includes a Customer Name (one) and a list of all items ordered (many).

A File Transfer Module (FTM) 1807 permits import or export, of information databases in any format that the designer selects. Both "real-time" and "batch" modes are supported in the File Transfer Module.

A System Communications Module (SCM) 1806 permits information exchange utilizing "dialup" or "direct" connection as appropriate. The SCM allows exchange of information to take place via any "real-time" or "batch" mode function. In addition, the SCM allows interactive communication with other remote, networked or foreign computers.

Because most systems evolve or require modification, a System Duplication Module (SDM) 1805 allows designers to copy all or part of any other the code-less system application. The SDM gives designers the ability to copy and edit one of the existing code-less system applications, and save as a new file, thus creating an entirely application.

A Documentation Module (DM) 1810 provides both user and/or technical written information regarding any the code-less system software application. Documentation is available at any time during, or after, the code-less system application is created and/or modified.

Once the code-less system software applications are functional, they are immediately operational upon whatever computer hardware is desirable via a CSM. Should a client need to upgrade to another computer hardware system, the code-less system's modular structure permits a transfer of the code-less system application from a personal computer, for example, to a mainframe. This requires rewriting the CSM for use on the mainframe, if no previously existing CSM is on the mainframe. Once the CSM is implemented on or ported to on the mainframe, the code-less applications created on the personal computer will operate on the mainframe hardware without modification.

The CSM operates in "real-time" utilizing the code-less system software specification/application. The CSM incorporates all of the USO routines necessary to run the code-less system application in a multi-user, multi-tasking environment.

Batch processing options are incorporated into the (CSM) module to perform "batch" jobs as is required by the application specification created by the code-less system. The CSM incorporates when needed all the library/dictionary routines necessary to run the code-less system applications that require "background" processing or delayed processing.

In summary, the code-less system provides non-technical personnel (designers) with the ability to quickly and accurately analyze, design, modify, document and implement high quality, custom software application. The code-less system also provides critical Millennium project analysis, cost, and resource estimation. Additionally, the code-less system can manually or automatically correct the Millennium problem. The code-less system has the following unique features:

The code-less system performs a detailed analysis of the organization's functional requirements prior to implementing the design. The functional analysis is printed and reviewed with all managers prior to design implementation. Detailed analysis and review ensures that the code-less system will be complete, of high quality, and authorized by management prior to its development and implementation.

There is no program language in the code-less system to restrict portability or salability.

The code-less system applications are non-hardware dependent because they do not generate programs. Code-less System Module (CSM), is a generic program that can be made operational on any hardware platform or network environment that is suitable to the business.

Since only one copy of the CSM is required regardless of the number of users, any number of CSM applications or other applications may run together sharing a computer. Limitations are dictated only by hardware configuration, network requirements and respective capacities.

Disk space is used by the code-less system databases for storing information. Automatic compression of data combined with no application programs results in approximately 30 percent (on average) better utilization of available disk space by the code-less system applications.

Code-less specifications can operate concurrently and share a computer with other code-less and non-code-less system applications that utilize generative (compiled) or interpretive programs.

The code-less system will process data from, or forward data to, other common programs such as word processing, spreadsheet and/or database programs. This transferring of data can also be performed remotely via modem to other computers operating with or without the code-less system.

Specifications created by the code-less system are "Smart Applications" that automatically monitor and assign tasks to be performed in the application and reports any pre-specified conditions to management.

Specifications developed by the code-less system allow concurrent users and/or printers. The code-less system users are connected via a PC, terminal or modem.

As there is no generative process, the code-less system applications are modifiable while operating by modification of the spreadsheet form.

The code-less system automatically produces general, technical and user specific documentation on demand which supplies management and users with information regarding all functions and features of the application including its manner of use.

Optional the code-less system includes security features such as an on demand audit trail of any information update that is performed, on any file, by any user of the code-less system. All code-less system security audit trail reports can be printed in their entirely, or on a selective basis at any time.

Finally, the code-less system software applications incorporate phone messaging, electronic mail, personal calendar, appointment scheduling, task management and computer initiated warning capabilities which are available to all users at all times. These functions can be custom applications or of-the-shelf programs, for example, MICROSOFT OUTLOOK.

Conceptually, all business systems created regardless of the industry, application, volume of data, all programs have an input, an output and at least one data base. Further, any business system must be flexible, that is, its design will need to be changed in the future for reasons of oversight during development, or functional obsolescence caused by expansion, or changing of application requirements. The Code-less environment meets these requirements.

Further advantages and uses for this invention will be recognized by those skilled in the arts. The instant invention is contemplated to embrace such other uses and features and is not intended to be limited strictly to the preferred embodiment disclosed.

Having thus described the invention what is claimed is:

1. A software system for creating an application elements cross reference file which includes lists of information elements which do not contain source code instructions, stored on a computer readable medium, said lists of information elements used for running an application on a computer comprising:
   a. an editing module for creating and editing a plurality of said lists of said information elements, and for including input and output specifications utilizing said information elements in said lists;
   b. means for storing said lists of information elements on computer readable medium in said application elements cross reference file;
   c. a plurality of functional modules for accessing said information elements in said application elements cross reference file and generating input and output information based on said stored information elements in said lists; and
   d. at least one system manager routine for interfacing said lists of information elements to said functional modules.

2. A software system as described in claim 1 wherein said system manager routine may be modified to run on selected computers and provides links between the functional modules, and the computer to permit said functional modules to operate on said lists of information elements without modification when the management routine is modified to run on said selected computer.

3. A software system as described in claim 1 wherein said lists of information elements which do not contain source code instructions further comprise lists of information elements for database structures, screen formats and report layouts.

4. A software system as described in claim 1 wherein said lists of information elements further comprise lists of information elements related to general file transfer requirements and communication requirements.

5. A software system as described in claim 1 which further comprises a scanning routine for locating and designating information elements in program source code files for automatic inclusion in said lists of information elements.

6. A software system as described in claim 5 wherein said scanning routine classifies said information elements into functional categories and stores said information elements into said lists of information elements related to such functional categories.

7. A software system as described in claim 1 wherein said file lists of information elements further comprise the name of information elements, and at least the information element location and size.

8. A software system for creating and running an application on a computer comprising:
   a. an application elements cross reference file, containing lists of information elements, which do not include source code instructions, stored on a computer readable medium, said lists of information elements used for running said application on said computer;
   b. an editing module for creating and editing a plurality of said lists said information elements in said application elements cross reference file, and for including input and output specifications utilizing said information elements in said lists;
   c. means for storing said lists of information elements on computer readable medium in said application elements cross reference file;
   d. a plurality of functional modules for accessing said information elements in said application elements cross reference file and generating input and output information based on said stored information elements in said lists;
   e. at least one system manager routine for interfacing said lists of information elements to said functional modules.
   f. a scanning routine for locating and designating information elements in program source code files for automatic inclusion in into said lists of information elements, wherein said scanning routine classifies said information elements into functional categories and stores said information elements into said lists of elements related to such functional categories wherein said functional categories are selected from the group consisting of the following:
      i. database functions;
      ii. screen functions;
      iii. report functions;
      iv. file transfer functions;
      v. communication functions; and
      vi. any combination of i through v.

9. A software system for creating and running an application on a computer comprising:

a. an application elements cross reference file, containing lists of information elements, which do not include source code instructions, stored on a computer readable medium, said lists of information elements used for running said application on said computer;
b. an editing module for creating and editing a plurality of said lists of said information elements in said application elements cross reference file, and for including input and output specifications utilizing said information elements in said lists;
c. means for storing said lists of information elements on computer readable medium in said application elements cross reference file;
d. a plurality of functional modules for accessing said information elements in said application elements cross reference file and generating input and output information based on said stored information elements in said lists; and
e. at least one system manager routine for interfacing said lists of information elements to said functional modules.
f. a scanning routine for locating and designating information elements in program source code files for automatic inclusion in into said lists of program elements, wherein said scanning routine classifies said information elements into functional categories and stores said information elements into said lists of elements related to such functional categories wherein said functional categories are selected from the group consisting of the following:
  i a validation module;
  ii a system environment module;
  iii an editing module;
  iv a system duplication module;
  v a system communications module;
  vi a file transfer module;
  vii a report module;
  viii a system screen module;
  ix a documentation module;
  x a system database module;
  xi system selection module; and
  xi any combination of i through xi.

10. A software system as described in claim 9 wherein said lists of information elements include the input and output specifications for each of the information elements in the list.

11. A method for operating a software system for creating and running an application on a computer from lists of non-source code information elements to process data comprising the following steps:
a. preparing a plurality of lists of said information elements which includes the following steps:
  i. preparing a detailed definition of each item of said information elements on each of said lists, including at least the name of the information elements, the length of the information elements, the location of the information elements and the format of the information elements; and
  ii. identifying on each of said lists where each individual item of said information elements is received by said computer system, how each individual item of said information elements is manipulated by said computer system; and where each individual item of said information elements is output by said computer system; and
d. storing said lists of information elements on computer readable medium in an application elements cross reference file.

12. The method of operating a software system as described in claim 11 further comprising the additional steps of:
a. reading said information elements from the where received location identified in said lists;
b. manipulating said information elements in accordance with how each individual item of said information elements is to be manipulated by said computer system in accordance with said lists; and
c. outputting said information elements to the output location identified in said lists.

13. The method of operating a software system as described in claim 11 further comprising the additional steps of:
a. scanning source code for information elements in the form of database structure information related to database data;
b. storing said database structure information in a list of information elements for database structures;
c. generating default database structures based on said list of information elements for data base structures for storage of said database data;
d. scanning said source code for information elements in the form of screen formatting information related to screen data;
e. storing said screen formatting information in a list of information elements for screens;
f. generating screen formats for display of said screen data on said screen, based on said list of information elements for screens;
g. scanning said source code for information elements in the form of report layout information related to report data;
h. storing said report layout information in a list of information elements for reports;
i. generating report layouts from said list of information elements for reports for use when printing said report data, in said reports;
j. scanning said source code for information elements in the form of file transfer protocol information associated with transfer data to be transferred;
k. storing said transfer protocols in a list of information elements for transfer data transfer protocols;
l. generating file transfer protocols for transfer of said transfer data to be transferred, from said list of information elements for data transfer protocols;
m. scanning said source code for information elements in the form of communication specification information for said communication data to be transferred;
n. storing said communication specification information in a list of information elements for communications specifications;
o. accessing said list of information elements for communications specifications when initiating communications operations to transfer said communication data;
p. scanning said source code for information elements in the form of data formatting information for input data;
q. storing said data formatting information for input data in a list of information elements for said input data;
r. accessing said list of information elements for formatting information for said input data;
s. scanning said source code for information elements in the form of validation information associated with data to be manipulated; and t. storing said validation information associated with data to be manipulated in a list of information elements for data to be manipulated; and u. generating validation information for validating said data for manipulation.

14. The method of operating a software system for creating and running an application as described in claim 11 further comprising the additional steps of:

a. scanning said source code for information elements related to database structure information related to said data;

b. storing said lists of information elements related to said database structure information on computer readable medium in an application elements cross reference file; and c. generating default database structures based on said lists of information elements stored in said database structure information application elements cross reference file.

15. The method of operating a software system for creating and running an application as described in claim 11 further comprising the additional steps of:

a. scanning said source code for information elements related to screen formatting information associated with said data;

b. storing said lists of information elements related to said screen formatting information on computer readable medium in an application elements cross reference file; and c. generating screen formats for display of said data based on said lists of information elements related to screen formatting information stored in said application elements cross reference file.

16. The method of operating a software system for creating and running an application as described in claim 11 further comprising the additional steps of:

a. scanning said source code for information elements related to report layout information;

b. storing said lists of information elements related to said report layout information on computer readable medium in an application elements cross reference file; and c. generating report layouts for said reports based on said lists of information elements related to said report layout information stored in said application elements cross reference file.

17. The method of operating a software system for creating and running an application as described in claim 11 further comprising the additional steps of:

a. scanning said source code for information elements related to file transfer protocol information associated with data to be transferred;

b. storing said lists of information elements related to file transfer protocol information on computer readable medium in an application elements cross reference file;

c. generating file transfer protocols for transfer of said data to be transferred based on said lists of information elements related to screen formatting information stored in said application elements cross reference file;

d. scanning said source code for communication specifications for information elements related to communication specification information for data to be transferred;

e. storing said lists of information elements related to said communication specification information on computer readable medium in an application elements cross reference file, and f. generating communication specifications for said data to be transferred based on said lists of information elements related to communication specification stored in said application elements cross reference file.

\* \* \* \* \*